United States Patent [19]

Yamahara et al.

[11] Patent Number: 5,579,140

[45] Date of Patent: Nov. 26, 1996

[54] MULTIPLE DOMAIN LIQUID CRYSTAL DISPLAY ELEMENT AND A MANUFACTURING METHOD OF THE SAME

[75] Inventors: Motohiro Yamahara, Osaka; Nobukazu Nagae; Masayuki Okamoto, both of Tenri; Toshiyuki Hirai, Kashihara; Teruyoshi Hara, Yamatokoriyama; Tokihiko Shinomiya, Nara; Nobuaki Yamada, Higashiosaka; Shuichi Kozaki, Nara; Wataru Horie, Hashimoto, all of Japan

[73] Assignee: Sharp Kabushiki Kaisha, Japan

[21] Appl. No.: 229,320

[22] Filed: Apr. 18, 1994

[30] Foreign Application Priority Data

| Apr. 22, 1993 | [JP] | Japan | 5-96289 |
| Aug. 31, 1993 | [JP] | Japan | 5-216695 |
| Sep. 16, 1993 | [JP] | Japan | 5-230580 |
| Oct. 25, 1993 | [JP] | Japan | 5-266634 |
| Feb. 23, 1994 | [JP] | Japan | 6-25486 |

[51] Int. Cl.$^6$ .................................................. G02F 1/1337
[52] U.S. Cl. .................................................. 359/75; 359/76
[58] Field of Search ............................................ 359/75, 76

[56] References Cited

U.S. PATENT DOCUMENTS

| 4,295,712 | 10/1981 | Ishiwatari | 359/81 |
| 4,852,978 | 8/1989 | Davey et al. | 359/100 |
| 5,379,139 | 1/1995 | Sato et al. | 359/81 |
| 5,434,687 | 7/1995 | Kawata et al. | 359/76 |

FOREIGN PATENT DOCUMENTS

| 0041184 | 12/1981 | European Pat. Off. | 359/75 |
| 0278721 | 8/1988 | European Pat. Off. | 359/51 |
| 0589264 | 3/1994 | European Pat. Off. | |
| 57-79913 | 5/1982 | Japan | 359/75 |
| 4-338923 | 11/1982 | Japan | |
| 57-186735 | 11/1982 | Japan | |
| 61-144627 | 7/1986 | Japan | 359/75 |
| 3-14162 | 2/1991 | Japan | |
| 3-158825 | 8/1991 | Japan | |
| 4-57028 | 2/1992 | Japan | |
| 4-181922 | 6/1992 | Japan | |
| 4-212928 | 8/1992 | Japan | |
| 4-221935 | 8/1992 | Japan | |
| 4-324426 | 11/1992 | Japan | |
| 5-27242 | 2/1993 | Japan | |
| 5-203951 | 8/1993 | Japan | |

OTHER PUBLICATIONS

Patent abstracts of Japan, vol. 010, No. 072 (P–438) 22 Mar. 1986 & JP–A–60 211 424 (Masushita Denki Sangyo KK) 23 Oct. 1985 *abstract*.

Patent abstracts of Japan, vol. 010, No. 072 (P–438) 22 Mar. 1986 & JP–A–60 211 421 (Masushita Denki Sangyo KK) 23 Oct. 1985 *abstract*.

Patent abstracts of Japan, vol. 011, No. 256 (P–607) 20 Aug. 1987 & JP–A–62 061 026 (Sharp Corp) 17 Mar. 1987 *abstract*.

*Primary Examiner*—William L. Sikes
*Assistant Examiner*—Charles Miller
*Attorney, Agent, or Firm*—Nixon & Vanderhye

[57] ABSTRACT

A liquid crystal display element which includes two opposing electrodes, and a liquid crystal layer disposed between said electrodes, wherein an alignment film for aligning a liquid crystal of said liquid crystal layer in at least three different directions is disposed above a side of said liquid crystal layer of at least one of said electrodes is disclosed.

50 Claims, 40 Drawing Sheets

(×80)

(×80)

23

UV rays

MULTIPLE DOMAIN LIQUID CRYSTAL DISPLAY ELEMENT AND A MANUFACTURING METHOD OF THE SAME

BACKGROUND OF THE INVENTION

1. Field of the Invention:

The present invention is related to a liquid crystal display device and a method of manufacturing the same, and particularly to a liquid crystal display element having a wide viewing angle characteristic and a method manufacturing it.

2. Description of the Related Art:

Conventionally, a liquid crystal display device using a nematic liquid crystal display element is widely employed in a segmented-figure display element such as a watch, or an electronic calculator. On transparent substrates of such a liquid crystal display device, active elements such as thin film transistors are formed as switching means for selectively driving pixel electrodes which applies a voltage to a liquid crystal, and color filter layers such as red, green and blue are formed so as to display color images. On the basis of the twist angle of a liquid crystal, liquid crystal display systems are classified as follows: (a) an active drive twisted nematic (hereinafter, abbreviated as "TN") liquid crystal display system in which nematic liquid crystal molecules are aligned by being twisted by 90°, and (b) a multiplex drive super twisted nematic (hereinafter, abbreviated as "STN") liquid crystal display system in which the twist angle of the nematic liquid crystal molecules is set to be 90° or more to utilize the sharpness of the transmittance-applied voltage characteristic.

In the latter multiplex drive STN liquid crystal display system, there is a peculiar color phenomenon. In the case where a monochrome display is to be conducted, therefore, the multiplex drive STN liquid crystal display system is further classified roughly as follows on the basis of the kind of optical phase difference element: Namely, the multiplex drive STN liquid crystal display system includes (b-1) a two-layered double super twisted nematic liquid crystal display system which uses a display liquid crystal cell and a liquid crystal cell wherein molecules are twist aligned by a twist angle opposite to that of the display liquid crystal cell, and (b-2) a film-addition type liquid crystal display system in which a film having an optical anisotropy is disposed. It is considered that the film-addition type liquid crystal display system of (b-2) is advantageous from the view points of the reduction of weight and cost.

On the other hand, the former active drive TN liquid crystal display system of (a) is classified roughly into (a-1) a normally black system in which a pair of polarizing plates are arranged in such a manner that their polarizing directions are parallel to each other and black is displayed when no voltage is applied to the liquid crystal layer ( the off state ), and ( a-2 ) a normally white system in which a pair of polarizing plates are arranged in such a manner that their polarizing directions are perpendicular to each other and white is displayed during the off state. It is considered that the normally white system of (a-2) is advantageous from the view points of the display contrast, color reproduction, and viewing angle dependence of the display.

In a conventional TN or STN type liquid crystal display device, liquid crystal molecules are aligned in one direction on an alignment film. As typical methods of aligning the directions of liquid crystal molecules in one direction, a rubbing process in which a formed thin film is rubbed with a cloth or the like (Japanese Laid-Open Patent Publication No. 4-57028), a deposition polymerization method in which a raw monomer is deposited on the surface of an electrode to form a polymer film, and an LB film method for forming an LB film (Japanese Laid-Open Patent Publication No. 4-181922) are known.

In a conventional TN type liquid crystal display device or the like, the display characteristic has a viewing angle dependence in which, for example, the contrast of a display image varies depending on the viewing angle. Particularly, it is well known that, when the viewing angle is increased from the normal direction of a display screen in the direction of increasing the display contrast (usually, toward the observer's side) to exceed a certain angle, a phenomenon takes place in which the black and white display is inverted (hereinafter, this phenomenon is referred to as merely "inversion"). These phenomena are caused by the fact that liquid crystal molecules having an anisotropy of refractive index are aligned in one direction with respect to the substrate.

FIGS. 51(*a*), 51(*b*), and 51(*c*) are section views of a conventional TN type liquid crystal display element 201. As shown in FIGS. 51(*a*), 51(*b*), and 51(*c*), for example, the TN type liquid crystal display element is configured so that a liquid crystal layer 204 is sandwiched between a pair of substrates 202 and 203. The liquid crystal molecules 205 of the liquid crystal layer 204 have a configuration in which the initial alignment is twisted by 90° and the liquid crystal molecules are tilted in one direction by a certain angle (pretilt angle). Therefore, an alignment process is conducted so that, when a driving voltage from a power source 206 is applied, the liquid crystal molecules 205 are raised in the same direction as shown in FIG. 51(*c*). When the liquid crystal molecules 205 are raised during a display of a half tone, therefore, the liquid crystal molecules are tilted in the same direction as shown in FIG. 51(*b*). When the liquid crystal molecules 205 are viewed in the directions respectively indicated by arrows A and B in the figure which are separated from each other by a relatively wide angle, accordingly, the apparent refractive indices are different from each other. As a result, the contrast of an image as viewed from the direction A is largely different from that as viewed from the direction B, and in an extreme case there arises an abnormal display phenomenon such as the inversion.

In order to improve such viewing angle dependence, an attempt to compensate for the phase difference between an ordinary ray and an extraordinary ray by interposing a phase difference plate (film) in which the direction of one principal index of refraction of the index ellipsoid is parallel to the normal direction of the display screen, between a substrate and a polarizing plate. However, the use of such a phase difference plate exerts only a limited effect on the improvement of the above-mentioned inversion of the black and white display.

Other proposed methods include the pixel split method (Japanese Laid-Open Patent Publications Nos. 57-186735, and 5-203951), the rubbing angle optimization method (Japanese Laid-Open Patent Publication No. 4-221935), and the nonrubbing method (Japanese Patent Publication No. 3-14162). In the pixel split method, a pixel electrode for conducting a display is split into two portions, and the two split pixel electrodes are set so as to have different independent viewing angle characteristics. In the rubbing angle optimization method, two polarizing plates are opposed to each other across a liquid crystal display element, and the angle formed by the polarizing direction of one of the two polarizing plates and the alignment direction of liquid crystal molecules, and the twist angle are set within a predetermined range, thereby preventing the inversion from occurring. In the nonrubbing method, an alignment film which is disposed on one of two opposing substrates through a liquid crystal layer is rubbed, and an alignment film which is disposed on the other substrate is not rubbed, so that liquid crystal molecules are caused to be different in alignment direction by the nonrubbed alignment film.

In a conventional liquid crystal display element, the pixel split method can eliminate the inversion in the vertical direction and viewing angle dependence, but has disadvantages that the contrast is lowered, that black is changed to gray when the viewing angle is increased, and that the display characteristics in the lateral directions are different from those in the vertical directions. A method in which one rubbing process is conducted in each of opposite directions with using a resist so that portions which have undergone two rubbing processes and those which have undergone one rubbing process are produced (Japanese Laid-Open Patent Publication No. 5-203951) has problems that the number of process steps is increased, and that the alignment film is deteriorated when the resist is peeled off and the alignment is disturbed, resulting in lowered display quality by causing disclination lines or the like. The display image shows uneven brightness. The rubbing angle optimization method can eliminate the inversion, but has disadvantages that the viewing angle in the direction opposite to that of the inversion is narrowed, and that the contrast in the normal direction is lowered. The nonrubbing method has a disadvantage that, as shown in FIGS. 5(a) and 5(b), disclination lines DL constituted by the discontinuity of the liquid crystal alignment are conspicuous.

As a display element which does not require a polarizing plate and conducts a display utilizing the light scattering by liquid crystals, a display element using the dynamic scattering (DS) effect or the phase transition (PC) effect is known. Recently, a display element which does not require a polarizing plate nor an alignment process has been proposed. In the proposed display element, using the birefringence of a liquid crystal, the transparency and opaquicity are electrically controlled. According to this display method, basically, the ordinary ray refractive index of liquid crystal molecules is made coincident with the refractive index of the supporting medium. When the liquid crystal molecules are aligned by applying a voltage, the transparent state is displayed, and, when no voltage is applied, the opaque state (light scattering state) due to the disturbance of the alignment of the liquid crystal molecules is displayed.

An example of the proposed methods is disclosed in Japanese National Patent Publication No. 61-502128. In the method, a liquid crystal is mixed with a photocurable or thermosetting resin and the resin is cured so that the liquid crystal phase-separates between a pair of substrates, thereby forming liquid crystal regions in the resin. A liquid crystal element formed by this method is called a polymer dispersed liquid crystal element. As an element in which the viewing angle is improved by using a polarizing plate, Japanese Laid-Open Patent Publications Nos. 4-338923, and 4-212928 disclose display elements in which the above-mentioned polymer dispersed liquid crystal element is sandwiched between crossed polarizing plates. In the display elements, the viewing angle characteristics can largely be improved, but their operating principle is based on depolarization due to scattering and therefore the brightness of the image is about one-half of that of a TN mode liquid crystal display element, thereby producing a problem that the image is not bright enough. Hence, the display elements are of less utility. Japanese Laid-Open Patent Publication No. 5-27242 discloses a method in which the alignment state of a liquid crystal is disturbed by walls and projections of a polymer to produce random liquid crystal domains, thereby improving the viewing angle. In this method, liquid crystal domains are formed at random and the polymer material enters into pixels, and therefore there is a problem that the contrast is lowered to impair the display quality.

As shown in FIGS. 52(a), 52(b), and 52(c), a liquid crystal display element 201a in which the phase separation of a liquid crystal and a polymer material is regularly conducted by utilizing a photomask and which is provided with a polarizing plate includes polymer walls 207 made of the polymer material between substrates 202 and 203. A liquid crystal region 209 surrounded by the polymer walls 207 is formed. Each liquid crystal region 209 includes a plurality of liquid crystal domains 210, and a disclination line 208 is formed at each boundary of the liquid crystal domains 210. In the liquid crystal region 209, when a voltage is applied, liquid crystal molecules 205 are caused by the interaction between the liquid crystal molecules 205 and the polymer walls 207, to rise along the direction of the walls 207. Therefore, the apparent refractive indices of the liquid crystal molecules 205 as viewed in the directions respectively indicated by arrows A and B are substantially equal to each other so that the viewing angle characteristics are largely improved. On the other hand, in order that a radial alignment which is most effective in the improvement of the viewing angle characteristic is realized in a pixel, a wall or pillar made of a polymer must be formed at the center of the pixel so that the area of a liquid crystal area in each pixel is reduced. This produces a problem that the light transmittance in the off-period of a driving voltage is reduced, and hence the brightness of a display image and the contrast are lowered.

SUMMARY OF THE INVENTION

The liquid crystal display element of this invention includes: two opposing electrodes, and a liquid crystal layer disposed between the electrodes, wherein alignment means for aligning a liquid crystal of the liquid crystal layer in at least three different directions is disposed above a side of the liquid crystal layer of at least one of the electrodes.

In one embodiment of the invention, the element includes a plurality of pixels for a display, and each of the pixels has the alignment means.

In another embodiment of the invention, the alignment means radially aligns the liquid crystal.

In another embodiment of the invention, the alignment means concentrically aligns the liquid crystal.

In another embodiment of the invention, the alignment means randomly aligns the liquid crystal.

In another embodiment of the invention, the liquid crystal layer includes a plurality of liquid crystal domains, and a liquid crystal in each of the liquid crystal domains is aligned in at least three different directions.

In another embodiment of the invention, the plurality of liquid crystal domains are radially arranged.

In another embodiment of the invention, the plurality of liquid crystal domains are arranged in a grid formation.

In another embodiment of the invention, the plurality of liquid crystal domains are randomly arranged.

In another embodiment of the invention, the alignment means consists of an organic film having spherulites.

In another embodiment of the invention, the alignment means consists of a photosensitive polymer having a projection extending in at least three different directions.

In another embodiment of the invention, the alignment means consists of a liquid crystalline polymer aligned in at least three different directions.

In another embodiment of the invention, the alignment means consist of an organic film having a projection extending in at least three different directions formed by pushing a projection against the organic film.

In another embodiment of the invention, the spherulites have a diameter in a range of 1 to 200 μm.

In another embodiment of the invention, the organic film having a rugged surface on a side of the electrode above which the organic film is formed, whereby the spherulites have a diameter in a range of 1 to 200 μm.

In another embodiment of the invention, a foundation layer having a rugged surface is disposed above at least one of the electrodes, and the organic film is formed on the foundation layer, whereby the rugged surface of the organic film is obtained.

In another embodiment of the invention, at least one of the electrodes have a rugged surface, and the organic film is formed on the electrode, whereby the rugged surface of the organic film is obtained.

In another embodiment of the invention, a roughness of the rugged surface is within a range of 1.48 to 2.8 nm.

In another embodiment of the invention, the organic film contains particles of a diameter of 1 μm or less, whereby the spherulites have a diameter in a range of 1 to 200 μm.

In another embodiment of the invention, the particles are selected from a group consisting of polymer particles and inorganic particles.

In another embodiment of the invention, the organic film contains crystalline polyamide.

In another embodiment of the invention, the crystalline polyamide has a glass transition temperature which is equal to or lower than 200° C.

In another embodiment of the invention, the liquid crystal layer includes for each pixel a liquid crystal region surrounded by polymer walls, the liquid crystal region consisting of the plurality of liquid crystal domains.

In another embodiment of the invention, the alignment means includes a projection extending in a grid formation, and the liquid crystal domains are arranged in a grid by the alignment means.

In another embodiment of the invention, the alignment means includes a projection which radially extends from a center of the pixel, and the liquid crystal domains are radially arranged by the alignment means.

In another embodiment of the invention, the alignment means for arranging the liquid crystal domains consists of materials which include polycrystals.

In another embodiment of the invention, the element further includes at least one polarizing plate, and angles formed by disclination lines formed at boundaries of the plurality of liquid crystal domains and a polarization axis of the polarizing plate are equal to or smaller than 30 deg.

In another embodiment of the invention, the element further includes at least one polarizing plate, and angles formed by the projection which radially extends from a center of the pixel and disclination lines formed at boundaries of the plurality of liquid crystal domains are equal to or smaller than 30 deg.

In another embodiment of the invention, the element further includes at least two polarizing plates, polarization axes of the polarizing plates perpendicularly crossing each other, the two opposing electrodes are disposed between the two polarizing plates, the liquid crystal layer consists of a nematic liquid crystal containing a chiral dopant, and a twist angle of the liquid crystal layer, and a product of a refractive index anisotropy of the nematic liquid crystal and a thickness of the liquid crystal layer is set so that a light transmittance has a substantially maximal value.

In another embodiment of the invention, the twist angle is in a range of 45 to 150 deg., and the product of a refractive index anisotropy of the nematic liquid crystal and a thickness of the liquid crystal layer is in a range of 300 to 650 nm.

In another embodiment of the invention, the twist angle is in a range of 45 to 150 deg., and the product of a refractive index anisotropy of the nematic liquid crystal and a thickness of the liquid crystal layer is in a range of 1,000 to 1,400 nm.

In another embodiment of the invention, the twist angle is in a range of 240 to 300 deg., and the product of a refractive index anisotropy of the nematic liquid crystal and a thickness of the liquid crystal layer is in a range of 550 to 800 nm.

In another aspesct of the invention, the method of manufacturing a liquid crystal display element including two opposing electrodes, and a liquid crystal layer disposed between the electrodes, includes a step of forming alignment means for aligning a liquid crystal of the liquid crystal layer in at least three different directions, above at least one of the electrodes.

In one embodiment of the invention, the alignment means forming step is a step of forming an organic film having spherulites on the at least one electrode.

In another embodiment of the invention, the alignment means forming step includes a step of cooling the organic film from a melted state, and the cooling step includes a step of adjusting a cooling rate to control diameters of spherulites in the organic film within a range of 1 to 200 μm.

In another embodiment of the invention, the alignment means forming step includes a step of dispersing particles in the organic film to control diameters of spherulites in the organic film within a range of 1 to 200 μm.

In another embodiment of the invention, the method further includes a step of forming a foundation layer having a rugged surface above at least one of the electrodes, whereby adjusting a roughness of the rugged surface to control diameters of spherulites in the organic film in a range of 1 to 200 μm.

In another embodiment of the invention, the method further includes a step of depositing particles on at least one of the electrodes to obtain a rugged surface, whereby adjusting a roughness of the rugged surface to control diameters of spherulites in the organic film in a range of 1 to 200 μm.

In another embodiment of the invention, the alignment means forming step includes a step of forming a photosensitive polymer having a projection extending in at least three different directions by using a photolithograph technique.

In another embodiment of the invention, the alignment means forming step includes a step of forming an organic film having a projection extending in at least three different directions by pushing a projection against the organic film.

In another embodiment of the invention, the cooling rate is not lower than 0.1° C./min and not higher than 3.5° C./min.

In another embodiment of the invention, the organic film consists of a material including at least two kinds of polymers which have different melting points.

In another embodiment of the invention, the organic film consists of a material including crystalline polyamide which has a glass transition temperature equal to or lower than 200° C.

In another embodiment of the invention, the cooling step includes a step of adjusting the cooling rate so that a temperature of the organic film is lowered in accordance with a linear function with respect to time.

In another embodiment of the invention, an initial temperature of the organic film in the cooling step is equal to or higher than a temperature at which the highest crystallization rate of the organic film is obtained, and equal to or lower than a melting point of the organic film.

In another embodiment of the invention, a terminal temperature of the organic film in the cooling step is equal to or higher than a glass transition temperature of the organic film.

In another embodiment of the invention, the foundation layer forming step includes a step for etching a surface of the foundation layer.

In another embodiment of the invention, the liquid crystal display element further includes a plurality of pixels for a display, and the liquid crystal layer includes at least one liquid crystal domain for each pixel, and the alignment means forming step includes the steps of: supplying a mixture containing a liquid crystal, a photocurable resin, and a photo-initiator, between the two opposing electrodes; and irradiating the mixture with light having a regular intensity distribution.

In another embodiment of the invention, the alignment means includes at least one projection formed above at least one of the electrodes for each pixel.

In another embodiment of the invention, the crystal layer includes for each pixel a liquid crystal region surrounded by polymer walls, the liquid crystal region consisting of the plurality of liquid crystal domains.

In another embodiment of the invention, the alignment means forming step further includes a step of, before the mixture supplying step, forming an organic film above at least one of the electrodes.

In another embodiment of the invention, the liquid crystal domains are radially arranged by the organic film.

In another embodiment of the invention, the liquid crystal domains are arranged in a grid by the organic film.

In another embodiment of the invention, a content of the photocurable resin in the mixture of the liquid crystal and the photocurable .resin is in a range of 10 to 0.1 wt %.

Thus, the invention described herein makes possible the advantage of providing a liquid crystal display element in which the display characteristics have a reduced viewing angle dependence and a method of manufacturing the same.

This and other advantages of the present invention will become apparent to those skilled in the art upon reading and understanding the following detailed description with reference to the accompanying figures.

DESCRIPTION OF THE PREFERRED EMBODIMENTS

Hereinafter, examples of the invention will be described with reference to the drawings. However, the invention is not limited to these examples.

EXAMPLE 1

Figure 1:
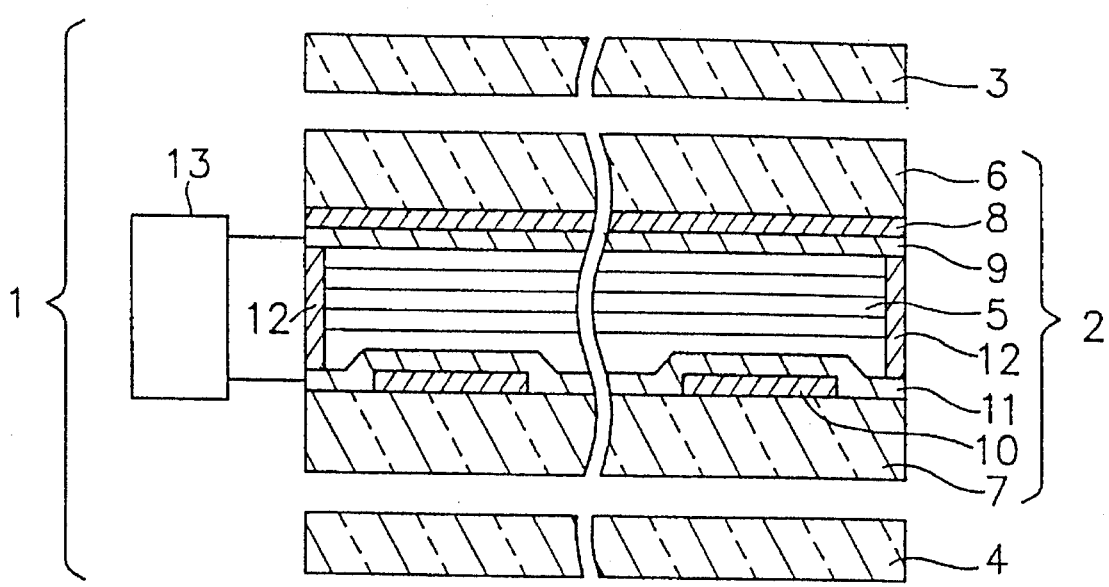
FIG. 1 is a section view of a liquid crystal display device using a liquid crystal display element of Example 1.

FIG. 1 is a section view of a liquid crystal display device 1 including a liquid crystal display element 2 according to the example. The liquid crystal display device 1 includes the liquid crystal display element 2, and a pair of polarizing plates 3 and 4 disposed on both sides of the element. In the liquid crystal display element 2, a liquid crystal layer 5 is sandwiched between substrates which are disposed on both sides thereof. Transparent electrodes 8 made of ITO (indium tin oxide) are formed on a surface of one glass substrate 6 (the upper one in the figure). This surface is on the side closest to the liquid crystal layer 5. An alignment film 9 is formed on the electrodes. Transparent electrodes 10 made of ITO are formed on a surface of the other glass substrate 7 (the lower one in the figure). This surface is also on the side closest to the liquid crystal layer 5, and an alignment film 11 is formed on the electrodes. The pixel electrodes 8 and 10 have a predetermined width and are arranged with fixed intervals so that the electrodes of the two kinds are perpendicular to each other as viewed in the normal direction of the glass substrate 6 or 7. The portions where the transparent electrodes 8 and 10 overlap each other function as pixels contributing to the display. Consequently, the pixels are arranged in a matrix form. The liquid crystal layer 5 is sealed with a sealing resin 12. A voltage of a desired level is supplied from a driving circuit 13 to the liquid crystal layer 5.

In the liquid crystal layer 5, a liquid crystal material which has a refractive index anisotropy $\Delta n$ of 0.081 and to which no chiral dopant is added was used, and the thickness of the liquid crystal layer 5 was set to be about 5.5 μm. The alignment films 9 and 11 are made of nylon 66 having a high crystallinity, and have not been rubbed. Nylon 66 is used because it has a high crystallinity and easily forms spherulites. As the method of forming spherulites in the alignment films, useful are methods such as that in which nylon in a melting or solution state is heated to a temperature higher than the Tg (glass transition temperature) to be crystallized. A spherulite means a spherical polycrystal in which many crystals (microcrystals) are radially arranged starting from one point. A spherulite of a polymer has a structure in which thin layers formed by folding a polymer chain stack with each other and project in a radial direction while twisting.

Figure 2:
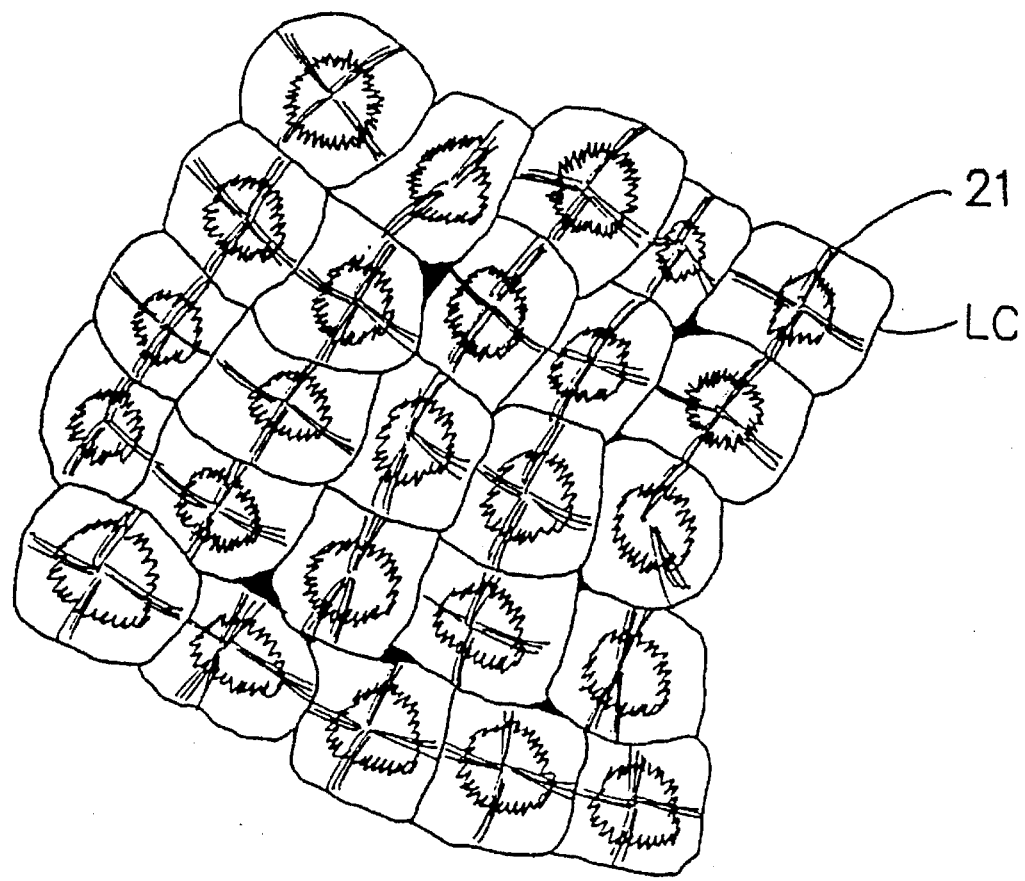
FIG. 2 is a view illustrating an alignment state of a liquid crystal on a substrate of the liquid crystal display element of Example 1.
Figure 3:
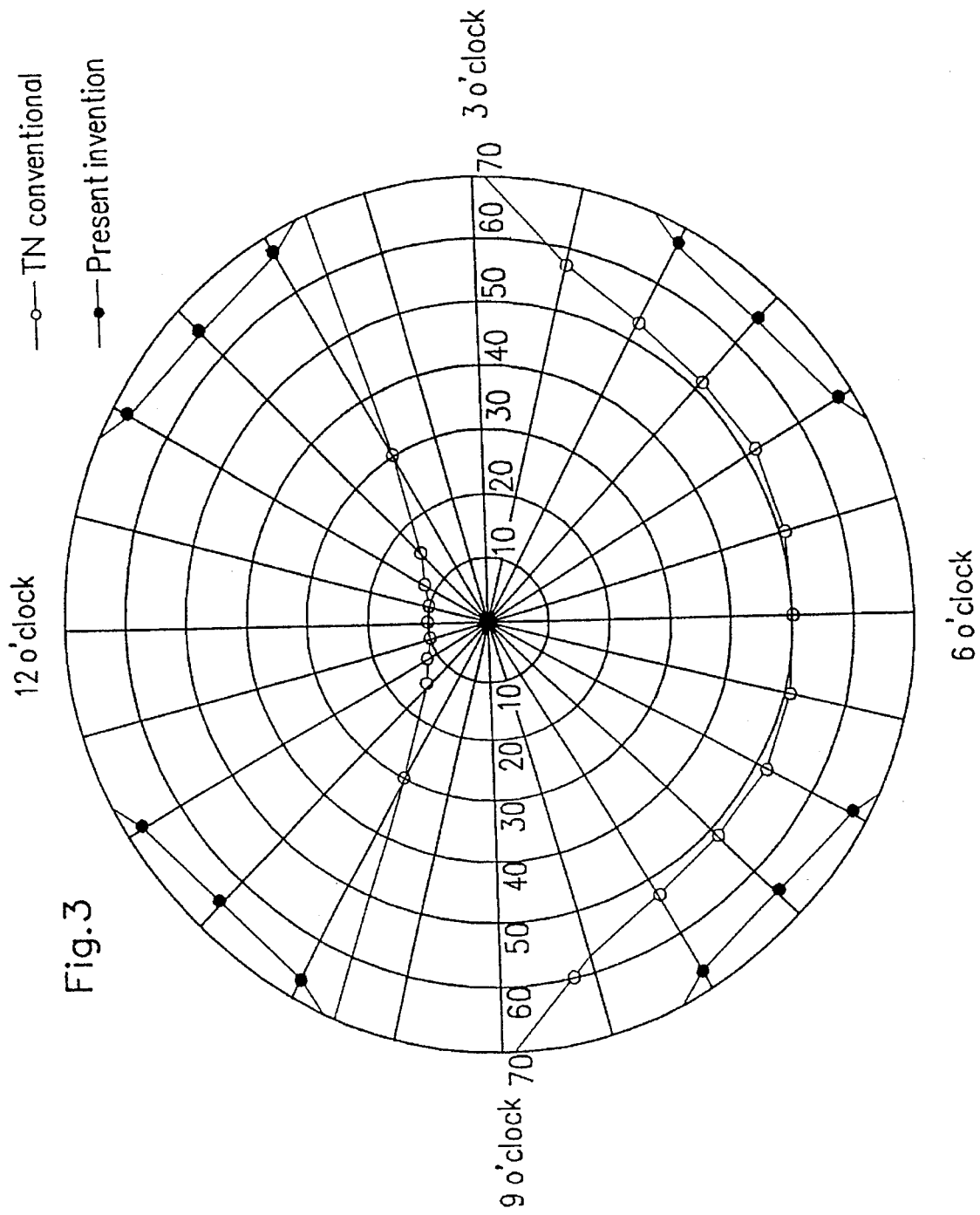
FIG. 3 is a radar chart showing an equicontrast line relating to the liquid crystal display element of Example 1.

In the liquid crystal display device 1 using the thus configured liquid crystal display element 2 of the invention, it was confirmed under a polarizing microscope that, as shown in FIG. 2, the liquid crystal is radially aligned in the portions of the liquid crystal layer 5 which contact with the spherulites formed in the alignment films 9 and 11. The numeral 21 in FIG. 2 indicates an extinction portion. The viewing angle characteristic was evaluated with the result that the element has a wide viewing angle characteristic or the range of contrast 10 or higher is ±65 deg. or more with respect to the whole direction as shown in FIG. 3. Furthermore, it was confirmed with the naked eye that, even when a voltage is applied, the inversion of a black and white display does not occur and display unevenness is not observed.

The alignment films 9 and 11 may be made of an organic material having a high crystallinity. In place of nylon 66 described above, any kind of nylon such as nylon 6, or nylon 77, polyethylene, polytetrafluoroethylene, polyester, polyvinyl alcohol, polypropylene, isotactic polystyrene, polyamide and polyimide resins which can easily be crystallized, or the like may be used as the material of the alignment films. As the alignment films, an alignment film made of a liquid crystalline polymer such as poly (γ-benzyl-L-glutamate) can be used. Also in this case, the same effects were attained.

The liquid crystal layer may be added with dichroic dye. Also, in this case, the same effects were attained. The use of the liquid crystal layer to which dichroic dye is added may also be applied in the same manner to examples described below.

Alternatively, the invention may be applied only to one of the alignment films, and a conventional alignment film which is slightly crystallized may be used as the other alignment film. Also in this alternative, the same effects were attained. The use of such alignment films may also be applied in the same manner to examples described below.

EXAMPLE 2

Figure 4:
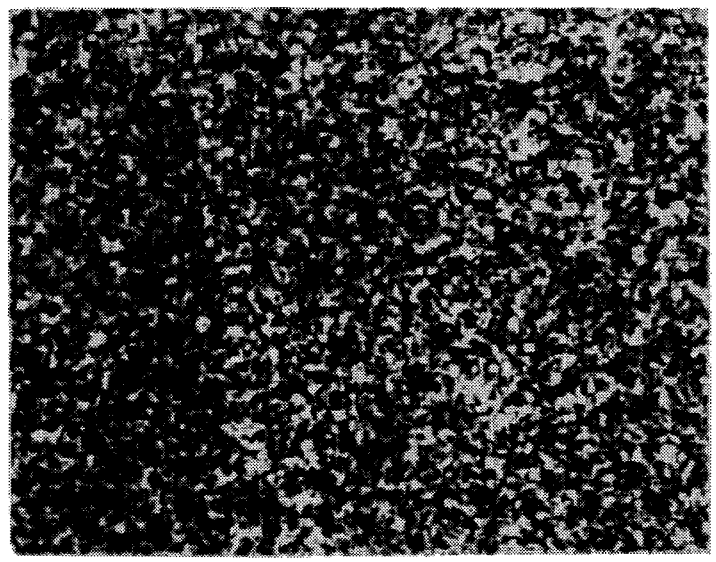
FIG. 4(a) is a photograph obtained by an optical microscope and showing the voltage-off state of a liquid crystal display element of Example 2.
FIG. 4(b) is a photograph obtained by an optical microscope and showing a half-tone state of a liquid crystal display element of Example 2.
Figure 4:
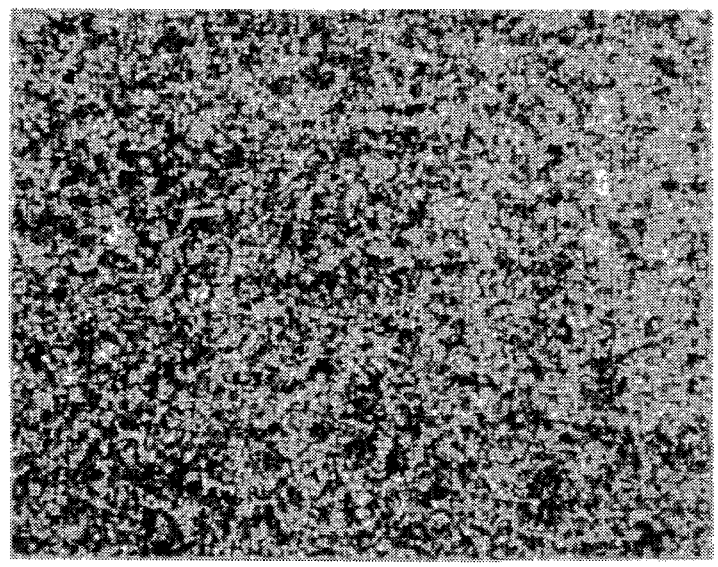

In Example 2, a liquid crystal material to which a chiral dopant is added is injected into the liquid crystal layer 5 of the liquid crystal display element 2 of FIG. 1. According to the liquid crystal display element of Example 2, in the voltage-off state, a disclination line does not appear thoroughly as shown in FIG. 4(*a*). Also in a half-tone state in which a voltage is applied, a disclination line does not appear as shown in FIG. 4(*b*). In this way, the display characteristics of the example are excellent, and the element of the example attained effects on the viewing angle characteristics which are remarkably improved in the same manner as Example 1.

Figure 5A:
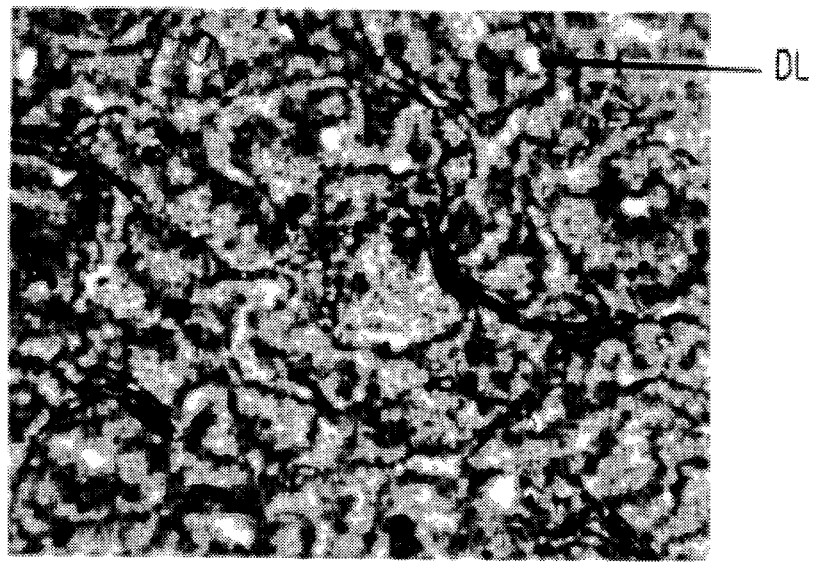
FIG. 5(a) is a photograph obtained by an optical microscope and showing a voltage-off state of a conventional liquid crystal display element.
Figure 5B:
FIG. 5(b) is a photograph obtained by an optical microscope and showing a half-tone state of a conventional liquid crystal display element.

In contrast, a comparative example was produced. In the comparative example, conventional polyimide which is hardly crystallized was used as the material of alignment films of a liquid crystal display element structured in the same manner as Examples 1 and 2, and a liquid crystal material to which a chiral dopant is added was injected into the liquid crystal layer. According to the comparative example, it is noted that, in the voltage-off state, a disclination line DL appears as shown in FIG. 5(*a*), and, in a half-tone state in which a voltage is applied, a disclination line DL appears more conspicuously as shown in FIG. 5(*b*).

Accordingly, it is noted that, unlike a conventional liquid crystal display element which is not rubbed, the liquid crystal display element of the invention can remarkably improve the display-characteristic and the viewing angle characteristic.

EXAMPLE 3

In Example 3, alignment films for radially aligning a liquid crystal are formed by using fine particles.

The alignment films of a liquid crystal display element structured in the same manner as Example 1 were crystallized by using an organic material in which plastic beads having a diameter of 1 μm were dispersed. The produced liquid crystal display element was observed under an optical microscope. The liquid crystal was radially aligned, and the size of this portion was not greater than 200 μm. The viewing angle characteristics remarkably improved in the same manner as Example 1 were obtained.

In contrast, a comparative example was produced. In the comparative example, plastic beads having a diameter of 2 μm were dispersed and then crystallized. When the produced comparative example was evaluated in the same manner, it was confirmed under an optical microscope that the size of the portion where the liquid crystal is radially aligned is equal to or greater than 200 μm. Furthermore, it was confirmed that the display image showed "unevenness" in which the display image is whitened and contrast ratio is lowered.

Therefore, it is preferable to use plastic beads having a diameter of 1 μm or less. In the invention, in place of plastic beads, beads made of another resin may be used. In the invention, the material of the beads is not limited to resins, but may be an inorganic material such as alumina, or calcium carbonate. Also in the case where alumina, calcium carbonate, or the like having a diameter of 1 μm or less was dispersed in alignment films, the same results were obtained.

A liquid crystal element that has a liquid crystal layer consisting of a liquid crystal material to which a chiral dopant was added and was produced in the same manner as Example 2 was used. Spherulites were produced by dispersing plastic beads of 1 μm in alignment films of the liquid crystal element. In this case, it was confirmed under an optical microscope that the spherulites have a size of 200 μm or less. The viewing angle characteristics remarkably improved in the same manner as Example 1. Also in the case where alumina particles of 1 μm or less were dispersed in alignment films, the same results were obtained.

In contrast, a liquid crystal display element in which plastic beads having a diameter of 2 μm were dispersed to form spherulites was produced. In this case., it was confirmed under an optical microscope that the size of the spherulites was equal to or greater than 200 μm. Furthermore, it was confirmed that the display image showed non-uniform brightness.

Also from the above, therefore, it is comprehended that the fine particles preferably have a diameter of 1 μm or less.

EXAMPLE 4

In Example 4, alignment films for radially aligning a liquid crystal are formed by irradiating photosensitive polymer films with light.

Figure 6:
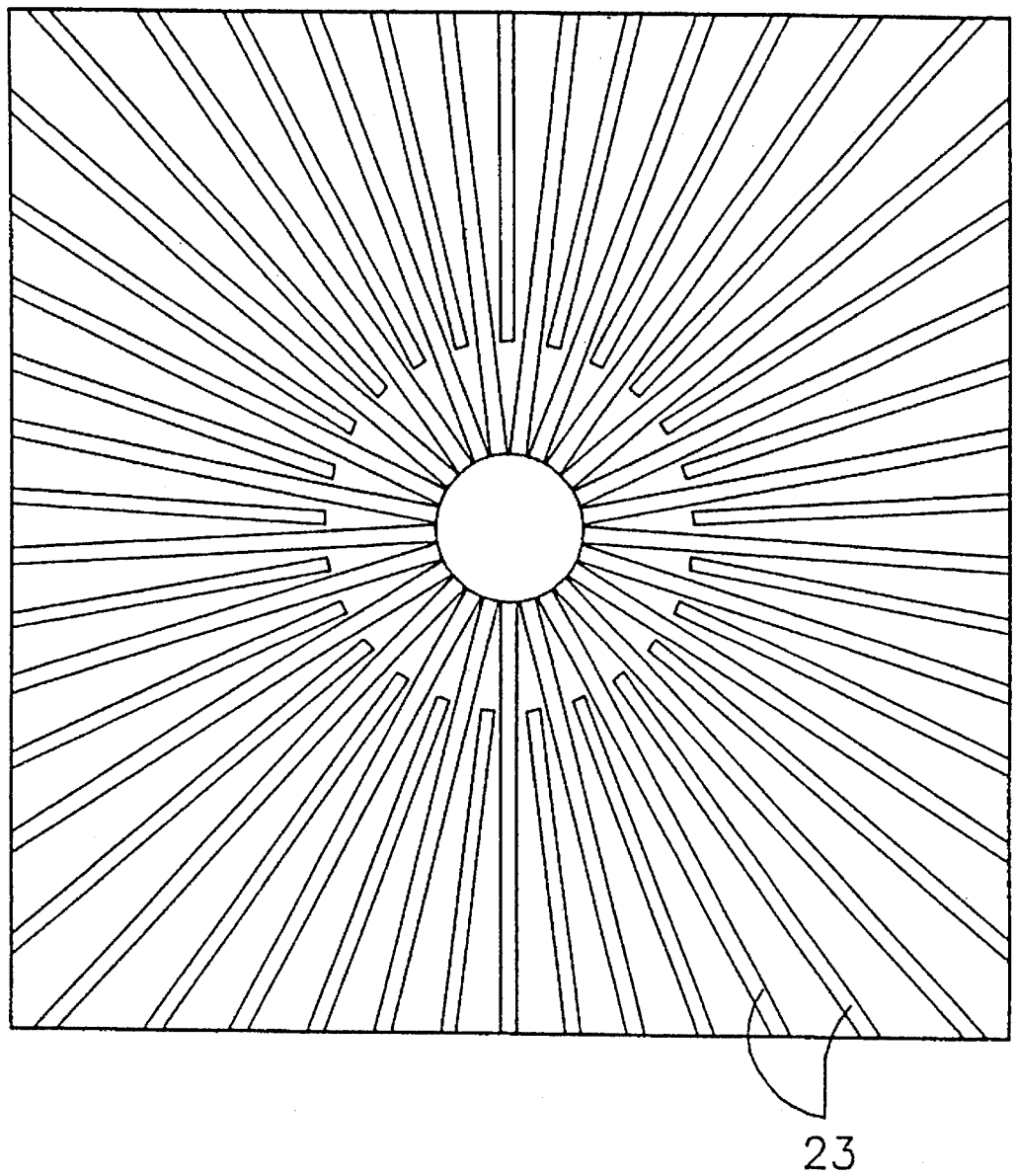
FIG. 6 is a view showing a portion corresponding to one pixel in a mask for producing a liquid crystal display element of Example 4.

The alignment films of a liquid crystal display element structured in the same manner as Example 1 were formed as photosensitive polymer films of (vinyl 4-methoxycinnamate), and the photosensitive polymer films were irradiated with ultraviolet rays while using a mask. In the mask used, portions to be located over pixels had the structure shown in FIG. 6 or had a radial transparent portion 23. Therefore, the pixel portions of the alignment films were formed into a radial shape, with the result that the liquid crystal in each pixel portion is radially aligned.

The viewing angle characteristic of the liquid crystal display device 2 using the thus produced liquid crystal display element 5 of the invention was evaluated. The viewing angle characteristic remarkably improved in the same manner as Example 1.

EXAMPLE 5

In Example 5, alignment films for radially aligning a liquid crystal are formed by a pressing process using radial projections.

Figure 7:
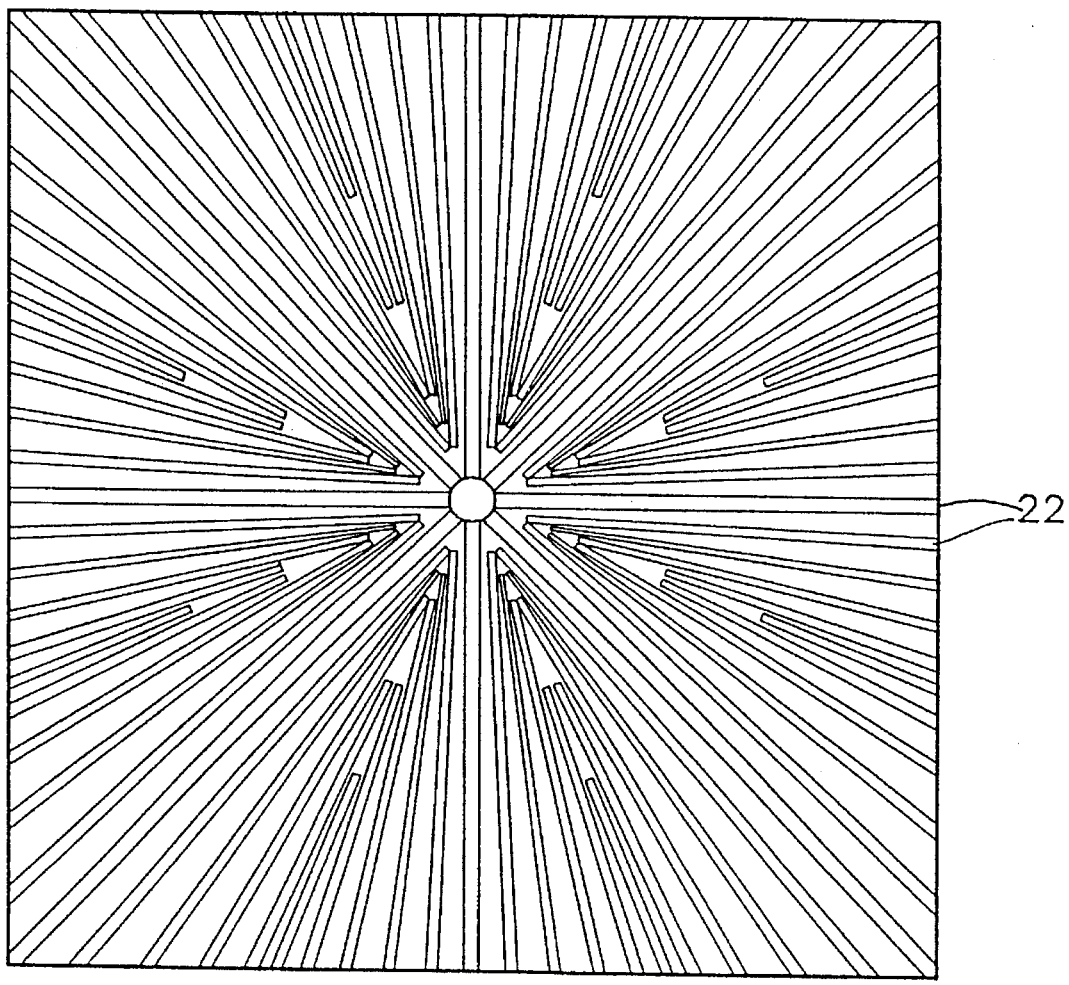
FIG. 7 is a view showing a portion corresponding to one pixel in a metal plate having projections, for producing the liquid crystal display element of Example 4.

The alignment films of a liquid crystal display element structured in the same manner as Example 1 were made of conventional polyimide. The alignment films were heated and then pressed by a metal plate. In the metal plate, portions corresponding to pixels had the structure shown in FIG. 7 or had radial projections 22. Therefore, pixel portions of the alignment films were formed into a radial shape, with the result that the liquid crystal in pixel portions were radially aligned.

The viewing angle characteristic of the liquid crystal display device 2 using the thus configured liquid crystal display element 5 of the invention was evaluated. The liquid crystal display element of the example is excellent in viewing angle characteristic in the same manner as Example 1.

EXAMPLE 6

Figure 8:
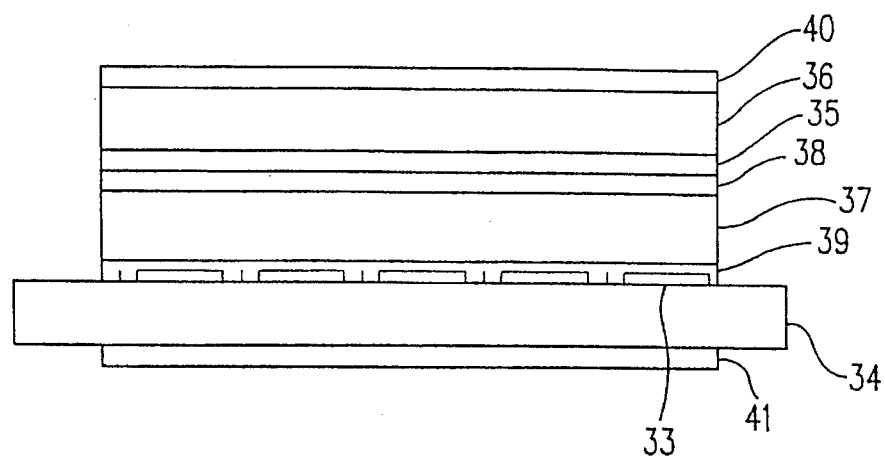
FIGS. 8(a) and 8(b) are configuration views showing an active matrix liquid crystal display element of Example 6.
Figure 8:
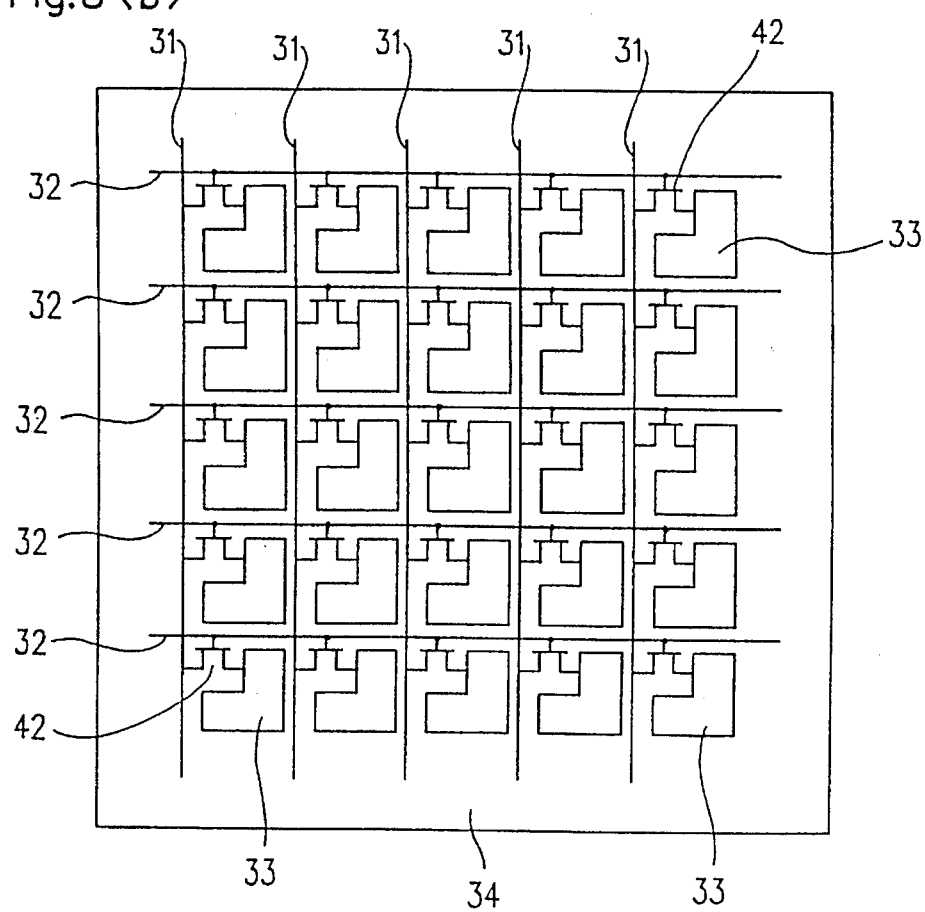

FIG. 8(a) shows a section configuration of an active matrix liquid crystal display device of the invention. FIG. 8(b) shows a plan view of the liquid crystal display device. The liquid crystal display device includes first and second substrates 34 and 36 which are disposed on both sides of a liquid crystal layer 37 so as to sandwich it. On the inside surface of the first substrate 34 made of a glass plate or the like which faces the liquid crystal layer 37, a plurality of signal electrodes 31 and a plurality of scanning electrodes 32 are formed so as to perpendicularly cross each other, and a switching transistor 42 is formed at each crossing. Each switching transistor 42 is connected to a respective one of the display pixel electrodes 33 which are formed in a matrix form, and electrically connected to one of the signal electrodes 31 and to one of the scanning electrodes 32. The switching transistors may be amorphous silicon TFTs, polysilicon TFTs, or the like. An alignment film 39 made of crystalline polyamide or the like is formed on the surface of the first substrate 34 on which the pixel electrodes 33 are formed. The second substrate 36 is made of a glass plate or the like. On the surface of the second substrate 36 which faces the liquid crystal layer 37, a counter electrode 35 and an alignment film 38 made of crystalline polyamide are formed in this order. The alignment films 38 and 39 have not undergone a rubbing process. The outer end portion of the liquid crystal layer 37 is sealed by a resin or the like which is not shown, and peripheral circuits, etc. (not shown) are mounted outside the outer end portion. On the outer faces of the first and second substrates 34 and 36 which are opposed to each other as described above, polarizing plates 40 and 41 are respectively disposed. The polarizing plates 40 and 41 may be omitted.

The alignment films were formed in the same manner as Example 1, and the thickness of the liquid crystal layer was set to be about 5.5 μm while using the liquid crystal material same as that used in Example 1. In this way, the active matrix liquid crystal display element of the example was produced.

Also in the thus configured active matrix liquid crystal display element, the viewing angle characteristic was remarkably improved in the same manner as Example 1. It is a matter of course that the techniques of the invention described in Examples 1 to 5 can be applied also to Example 6.

EXAMPLE 7

In the example, a liquid crystal material which has a refractive index anisotropy Δn of 0.081 and to which a chiral dopant is added was used as a material of the liquid crystal layer 37, and the thickness of the liquid crystal layer 37 was set to be about 4.5 μm. The liquid crystal molecules in the liquid crystal layer 37 are aligned with being twisted by 90° between the first and second substrates 34 and 36.

The alignment films 38 and 39 of the liquid crystal display device were formed in the following manner. At first, a solution in which 1.0 g of nylon 66 was dissolved in 100 g of m-cresol was prepared. Thereafter, the solution was applied to the surfaces of the first and second substrates 34 and 36 on which the electrodes were formed, and the substrates were then cured at about 170° C. which is higher than the glass transition temperature (Tg). As a result, the alignment films 38 and 39 in which spherulites were formed were obtained in a thickness of 600 angstroms. The liquid crystal layer 37 contacting with spherulites formed in the alignment films 38 and 39 is radially aligned by the spherulites.

In the liquid crystal display device of the example which was obtained as described above, it was confirmed that, when a voltage was applied to the liquid crystal layer 37, the liquid crystal molecules radially rise, the inversion of a black and white display did not occur, and less viewing angle dependence was observed. After the devices were allowed to stand for one week under the environments of 60° C. and 80° C., a driving test was conducted. The liquid crystal display devices showed no deterioration of the display characteristic and attained an excellent display State.

In the example, since crystalline polyimide having the glass transition temperature not higher than 200° C. was used, the alignment films are crystallized at a temperature not higher than 200° C. Consequently, the curing temperature of the alignment films can be set to be not higher than 200° C. Accordingly, color filters used for a color display, and thin film transistors used in an active matrix liquid crystal display device can be prevented from being thermally destroyed.

In the examples described above, spherulites are formed in the alignment films. The invention is not limited to utilizing spherulites. Alternatively, crystals which have similar structures to spherulites may be formed in the alignment films. Also in this case, the same effects can be attained.

As described above in detail, according to the invention, since a liquid crystal alignment means for radially aligning a liquid crystal is formed in an alignment film on at least one of substrates. The liquid crystal which contacts the spherulites formed in the alignment film is radially arranged, with the result that a liquid crystal display element which has a reduced viewing angle dependence and in which the reduction of contrast depending on the viewing angle is improved can be provided.

As the liquid crystal alignment means for radially aligning a liquid crystal, a polymer film having spherulites can be used. Since the alignment film has spherulites or crystals which have similar structures to spherulites, a portion in which a radial alignment is conducted in accordance with the surface state of the alignment film is formed in the liquid crystal layer. It is not required that section portions of the spherulites or crystals similar to the spherulites are located on the surface of the alignment film, but it is required that a portion in which a radial alignment is conducted is formed on the surface of the alignment film by the existence of the spherulites or the crystals similar to the spherulites. The diameters of spherulites can be controlled by dispersing fine particles in the alignment film. Such a radial alignment can be attained in the same manner also when a photosensitive polymer film which has a radial shape formed by irradiation of light is used as an alignment film, or when an alignment film formed by a pressing using radial projections is used. Therefore, the invention can attain the effect of a wide viewing angle characteristic and remarkably improve the display quality of a liquid crystal display element.

In Examples 8 to 12 described below, preferred sizes of spherulites functioning as the liquid crystal alignment means, and methods of controlling the size will be described. However, the invention is not limited to these examples.

EXAMPLE 8

In this example, a liquid crystal display device having a configuration shown in FIG. 1 was produced. According to the example, in order to control the size of spherulites contained in the alignment film 9, particles of ITO (indium tin oxide) were deposited on the surface of the glass substrate 6 which faces the liquid crystal layer 5, to form the transparent electrodes 8. The surface of the obtained transparent electrodes 8 was observed with the aid of an atomic force microscope (AFM) to evaluate the surface roughness of the transparent electrodes 8. The surface roughness of the transparent electrodes 8 in the example was 2.31 nm. As the value of the surface roughness is larger, the surface roughness is greater. The alignment films 9 and 11 were formed by applying nylon 66 having a high crystallinity by a spin coating method, holding it in an oven at 140° C. for 2 hours, and by slowly cooling it at a cooling rate of 0.4° C./min. A liquid crystal material which has a refractive index anisotropy Δn of 0.081 and to which 0.34 wt % of a chiral dopant is added was used as a material of the liquid crystal layer 5. The thickness of the liquid crystal layer 5 was set to be about 5.5 μm. In the example, only the transparent electrodes 8 were formed by the deposition of particles of ITO (indium tin oxide). Alternatively, both the transparent electrodes 8 and 9 may be formed by the above-mentioned method.

In an observation using a polarizing microscope, it was also confirmed that, in this example, the liquid crystal in the portions of the liquid crystal layer 5 which contact with the surfaces of portions of the alignment films 9 and 11 having spherulites is radially aligned as shown in FIG. 2. The numeral 21 in FIG. 2 indicates an extinction portion. The liquid crystal domains which are radially aligned have a small diameter of 3 to 4 μm and cannot be observed with the eye. The viewing angle characteristic was evaluated with the result that the device has a wide viewing angle or the range of contrast 10 or higher is ±65 deg. or more with respect to the whole number of directions as shown in FIG. 3. The ratio of the transmittance ($T_{off}$) from the front without an application of a voltage, to the transmittance ($T_{on}$) with an application of a saturation voltage is defined as a contrast ratio: $CR=T_{off}/T_{on}$, and is shown in Table 1 below.

TABLE 1

|  | Example 8 | Comparative Example 1 | Example 9 | Comparative Example 2 | Example 10 | Comparative Example 3 |
|---|---|---|---|---|---|---|
| Contrast ratio | 137 | 37 | 114 | 33 | 107 | 24 |

As is apparent from Table 1, the liquid crystal display device of the example has a high contrast ratio. Furthermore, it was confirmed that no so-called "unevenness" in which the display image is whitened and the contrast ratio is lowered occured. Also in the case where a nematic liquid crystal to which no chiral dopant was added, was used as a liquid crystal material of the liquid crystal layer 5, the same effects as those of the examples were attained.

Hereinafter, the principle of the control of the size of spherulites according to the examples will be described. A spherulite means a spherical polycrystal in which many microcrystals are radially arranged starting from one point. A spherulite is formed in a process wherein crystals grow in a spherically symmetric manner around a crystal nucleus generated from a solution of the critical concentration. The size of such a spherulite can be controlled by, for example, a method of:

(1) controlling the number of generated crystal nuclei in the crystal nucleation step; or (2) controlling the crystal growth rate in the crystal growth step.

The first method (1) above includes the following two techniques of:

(a) generating crystal nuclei in accordance with a difference in surface energy of the surface of a substrate; and (b) using one polymer component in polymer blends as crystal nuclei.

Figure 9:
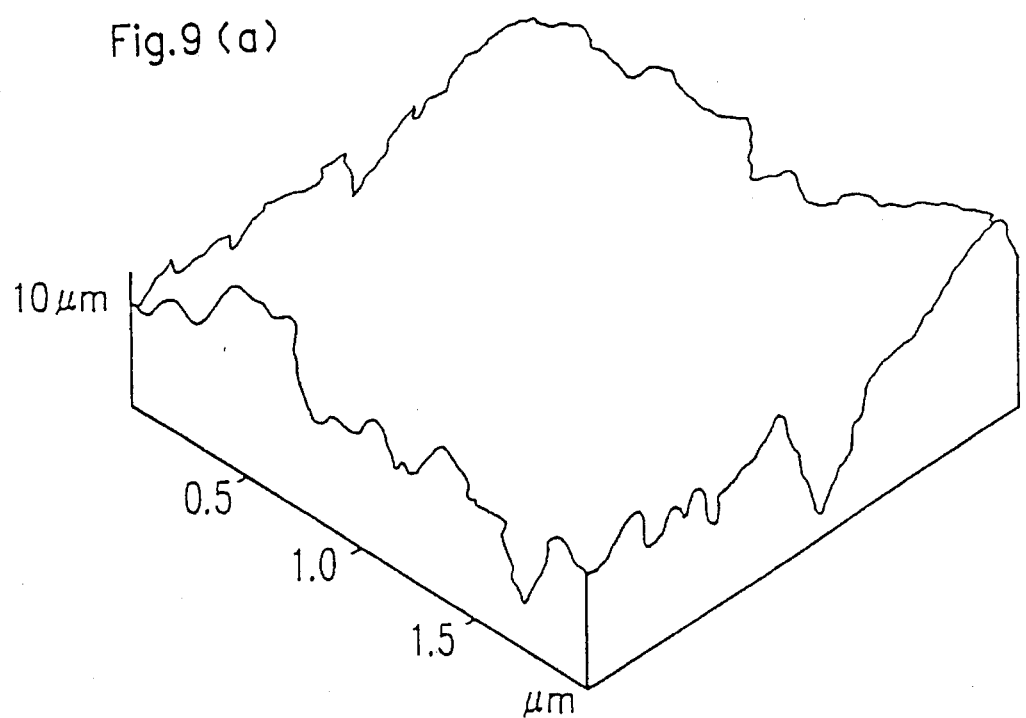
FIG. 9(a) is a perspective view of a foundation layer for an alignment film in the case where the foundation surface for the alignment film is formed as a rugged face.
FIG. 9(b) is a perspective view of a foundation layer for an alignment film in the case where the rugged shape of the foundation surface for the alignment film is flattened.
Figure 9:
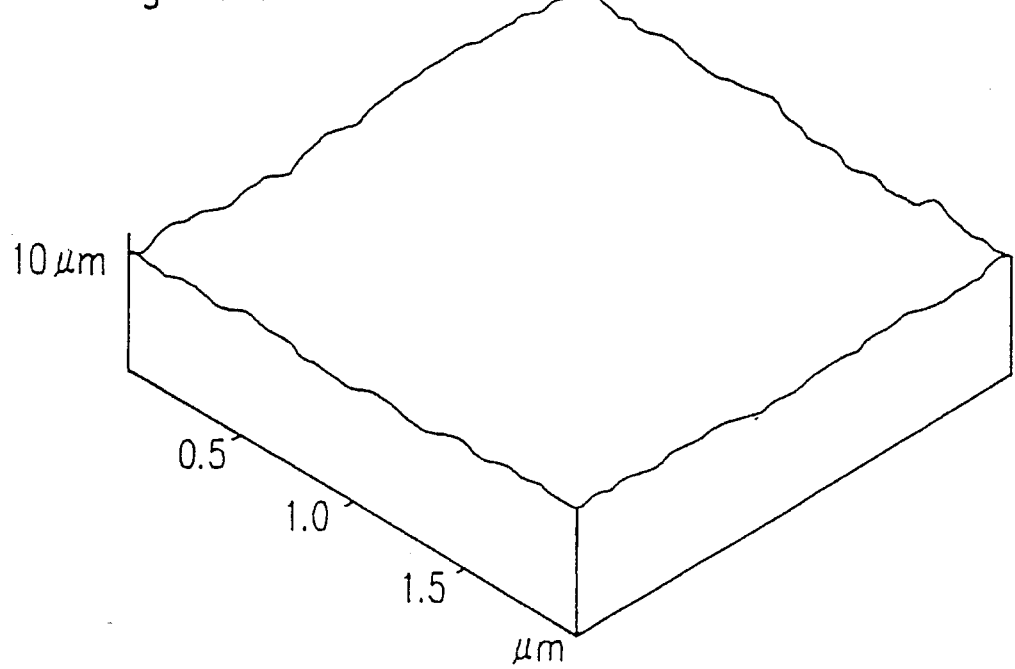

First, the technique above (a) in which the size of a spherulite is controlled by generating a crystal nucleus in accordance with a difference in the surface energy will be described. As shown in FIG. 9(a), the surface of a substrate to which a polymer solution is to be applied (such a surface is referred to as a "foundation surface") is rugged. When the surface is roughed in this way, there-appears a difference in surface energy of the foundation surface so that many crystal nuclei are generated, thereby increasing the quantity density of spherulites. Consequently, neighboring spherulites impinge on each other in a step of the spherulite growth process in which the size of spherulites is relatively small. As a result, individual spherulites have a relatively small size. In contrast, when the foundation surface is made flat as shown in FIG. 9(b) so as to decrease the surface energy difference, crystal nuclei are hardly generated and therefore the number of generated crystal nuclei is reduced. Therefore, spherulites are prevented from mutually restricting their growth until the spherulites are grown to a relatively large size, resulting in that relatively large spherulites can be obtained. In this way, the size of a spherulite can be controlled by adjusting the roughness of the foundation surface.

As a parameter indicating the surface roughness, used is a roughness (Ra) which is a parameter indicating the degree of the surface roughness obtained with the aid of an atomic force microscope (AFM). Roughness (Ra) is defined by the following Equation:

$$Ra = \frac{1}{L} \int_0^L |f(x)| dx \quad (1)$$

In the above equation, the function f(x) is a function indicating a roughness curve for a surface, and L is the length of the roughness curve. In the example, it is preferable to use an alignment film having a foundation surface which has a surface roughness of 1.4 to 2.8 nm. When the surface roughness is equal to or smaller than 1.4 nm, generated spherulites are excessively large (the spherulite diameter is greater than about 200 μm) so that disclination lines DL are generated in the liquid crystal layer 5, resulting in that "unevenness" becomes conspicuous in a display image. When the surface roughness is equal to or greater than 2.8 nm (the spherulite diameter is smaller than about 1 μm), spherulites are too small in size and therefore the liquid crystal is not aligned in the growth direction of the spherulites. Accordingly, the size of spherulites must be controlled so that the diameter of spherulites is not smaller than 1 μm and not greater than 200 μm.

As described above, in the example, the foundation surface for an alignment film is rugged by depositing particles on the foundation surface, and the size of spherulites functioning as the liquid crystal alignment means is controlled by adjusting the degree of the ruggedness of the foundation surface for the alignment film. The example can attain an effect that the viewing angle characteristic is improved by controlling the size of spherulites, and also has another effect in that the display screen is free from so-called "unevenness" which means that the display image is whitened and the contrast ratio is lowered.

COMPARATIVE EXAMPLE 1

A polyimide solution (RN739 (a product of Nissan Chemical Industries, Ltd.)) was applied by a spinner onto a glass substrate on which ITO electrodes were formed in the same manner as Example 8. The surface of the obtained polyimide film was observed with the aid of an AFM. FIG. 9(b) shows the results. As is apparent from FIG. 9(b), the ruggedness of the surface of ITO electrode is reduced by the application of polyimide. The surface roughness was 0.485 nm. An alignment film of nylon 66 was formed on the polyimide film in the same manner as Example 1. The diameter of spherulites in the obtained alignment film was about 350 μm. The subsequent steps were conducted in the same manner as Example 8 to produce a liquid crystal display device, and the contrast ratio of the device was measured. Results are shown in Table 1. As is apparent from Table 1, Comparative Example 1 has a low contrast ratio. It can be observed that "unevenness" occurs and the display quality is impaired.

EXAMPLE 9

In the example, the roughness of the foundation surface for an alignment film was adjusted by the etching method. In this example, a foundation layer whose surface functions as a foundation surface was provided under the alignment film. A polyimide solution was applied to a pair of glass substrates having ITO electrodes, and the substrates were then cured at 250° C. The glass substrates were then immersed in 1% hydrofluoric acid for 20 seconds to be subjected to the etching, thereby roughing the surfaces. The obtained surfaces were evaluated with the aid of an AFM with the result that the roughness of the surfaces was 1.94 nm.

Onto the substrates, a 1 wt % m-cresol solution of nylon 66 was applied by a spinner. Thereafter, the substrates were held in an oven at 140° C. for 2 hours, and then slowly cooled to obtain alignment films. In the obtained alignment films, the diameter of spherulites was about 4 to 5 μm. The subsequent steps were conducted in the same manner as Example 8 to produce a liquid crystal display device, and the contrast ratio of the device was measured. Evaluation results are shown in Table 1. As is apparent from Table 1, the liquid crystal display device of the example has a high contrast ratio. It was confirmed that the device was free from so-called "unevenness" in which the display image is whitened and the contrast ratio is lowered.

When the foundation surface for an alignment film is etched in the manner of Example 9, the roughness of the foundation surface can be adjusted and spherulites of an adequate size can be generated. As a result, it is possible to obtain a display image which is free from "unevenness".

A method of forming a surface having the roughness required for generating spherulites of an adequate size is not limited to the methods of Examples 8 and 9. In the invention, any method can be used as far as the size of spherulites can be controlled within an adequate range by producing the surface energy difference in the foundation surface for an alignment film, and adjusting the number of crystal nuclei generated in the alignment film.

COMPARATIVE EXAMPLE 2

A polyimide solution was applied by a spinner onto a substrate which was obtained in the same manner as Example 9 and had a rough surface. The surface of the obtained polyimide film was observed with the aid of an AFM. The surface roughness of the polyimide film was 0.294 nm. An alignment film made of nylon 66 was formed on the polyimide film in the same manner as Example 9. The diameter of spherulites in the alignment film was about 600 μm. The subsequent steps were conducted in the same manner as Example 8 to produce a liquid crystal display device, and the contrast ratio of the device was measured. Results are shown in Table 1. As is apparent from Table 1, the contrast ratio of Comparative Example 2 is low. It can be observed that "unevenness" occurs and the display quality is impaired.

EXAMPLE 10

This example is an example in which, as a method of controlling the size of spherulites in an alignment film, the method (b) of using one polymer component in polymer blends as crystal nuclei is conducted in the above-mentioned method (1) of controlling the number of generated crystal nuclei in the crystal nucleation step.

When a polymer melt of a polymer blend which contains two or more kinds polymers having different melting points is cooled, a higher melting point polymer is first crystallized in a melt of a lower melting point polymer, and functions as nuclei for the crystal growth in the lower melting point polymer. When the melt is further cooled, crystals of the lower melting point polymer are grown. In such a polymer blend, crystal nuclei can be generated in a greater number than those generated in the case of a single polymer. Therefore, in a stage in which the size of spherulites is relatively small, spherulites mutually restrict their growth, causing the size of the spherulites to be small.

In this example, alignment films were formed using a mixture of 20 wt % of nylon 66 having a high melting point and 80 wt % of polypropylene having a low melting point. The mixture was applied to a pair of glass substrates (thickness: 1.1 mm) on which transparent electrodes were formed, and then melted at 270° C. The substrates were slowly cooled at a cooling rate of 0.3° C./min to obtain alignment films. The diameter of spherulites in the obtained alignment films was 4 to 8 μm. The subsequent steps were conducted in the same manner as Example 8 to produce a liquid crystal display device, and the contrast ratio of the device was measured. Evaluation results are shown in Table 1. As is apparent from Table 1, the liquid crystal display device of the example has a high contrast ratio. It was confirmed that the device is free from so-called "unevenness".

COMPARATIVE EXAMPLE 3

A solution of nylon 66 was applied to a pair of glass substrates (thickness: 1.1 mm) on which transparent electrodes were formed, and the nylon 66 film was then melted at 270° C. The substrates were slowly cooled at a cooling rate of 0.3° C./min to obtain alignment films. The diameter of spherulites in the obtained alignment films was 210 μm. The subsequent steps were conducted in the same manner as Example 8 to produce a liquid crystal display device, and the contrast ratio of the device was measured. Results are shown in Table 1. As is apparent from Table 1, the contrast ratio of Comparative Example 3 is low. It was observed that "unevenness" occured and the display quality is impaired.

According to Examples 8 to 10 described above, the size of spherulites is controlled so as to be an adequate value not smaller than 1 μm and not greater than 200 μm, whereby liquid crystal molecules are radially aligned along the spherulites to improve the viewing angle dependence, and "unevenness" which appears on the basis of a bright and dark extinction pattern caused by large spherulites on an alignment film can be prevented from occurring. In other words, the size of spherulites is controlled so as to be reduced to a level at which such a bright and dark extinction pattern cannot be observed with the eye, whereby an excellent display quality free from "unevenness" can be obtained.

EXAMPLE 11

This example is an example in which the temperature of the process of forming alignment films is controlled in order to control the size of the spherulites. In the example, the alignment films 9 and 11 of the liquid crystal display device 1 shown in FIG. 1 were formed in the following manner. An m-cresol solution of nylon 66 was applied by a spinner onto the glass substrates 6 and 7 on which the transparent electrodes 8 and 10 were formed. The obtained substrates were held at 140° C. for 2 hours. Thereafter, while the cooling rate a was set to be 0.1° C./min, 0.4° C./min, 1.7° C./min, 2.2° C./min, and 3.5° C./min, the cooling was conducted so that the temperature reduction proceeded in accordance with a linear function until the temperature reached room temperature, thereby forming the alignment films 9 and 11. The alignment films 9 and 11 were not subjected to a rubbing process. A liquid crystal material which has a refractive index anisotropy Δn of 0.081 and to which a chiral dopant is added was used as a material of the liquid crystal layer 5. The thickness of the liquid crystal layer 5 was set to be about 5.5 μm.

The alignment films 9 and 11 formed in the example were observed under a polarizing microscope. The sizes (diameters) of spherulites obtained as the result of the observation under the polarizing microscope are listed in Table 2. Also evaluation results of the display characteristic of the thus formed liquid crystal display devices 1 are listed in Table 2. As is apparent from Table 2, it was confirmed that the liquid crystal display device of the example is excellent in the viewing angle characteristic and has display characteristics which are free from display "unevenness".

TABLE 2

| Initial temperature in cooling step $Y_0$ (°C.) | 140 | | | | | | 100 | |
|---|---|---|---|---|---|---|---|---|
| Cooling rate a (°C./minute) | 0.05 | 0.10 | 0.40 | 1.7 | 2.2 | 3.5 | 3.8 | 0.40 |
| Size of spherulite (μm) | 300 | 200 | 45.0 | 8.0 | 3.0 | 1.0 | X | X |
| Display characteristic | X | O | O | O | O | O | X | X |

The principle of controlling the size of spherulites which was used in the example will be described. As mentioned above, methods of controlling the size of spherulites include:

(1) controlling the number of generated crystal nuclei in crystal nucleation step; and (2) controlling the crystal growth rate in the crystal growth step.

In Examples 8 to 10, in order to control the size of spherulites, the number of nuclei was adjusted. In these examples, the size of spherulites is controlled by using both the methods (1) and (2).

Figure 10:
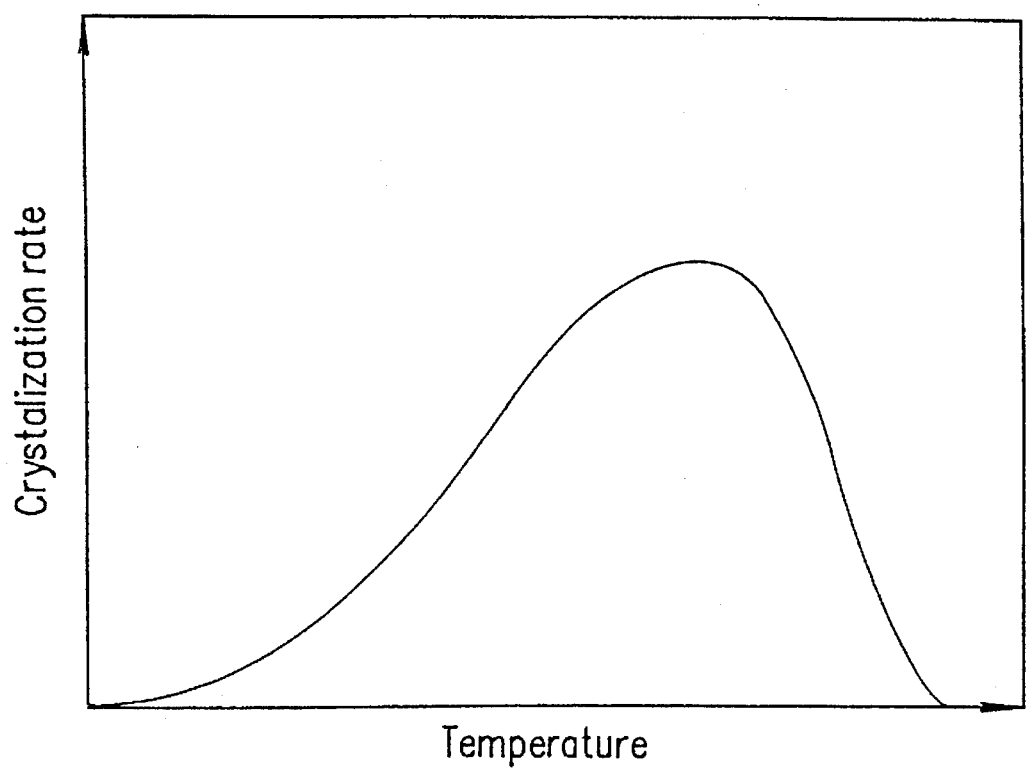
FIG. 10 is a graph showing the relationship between the rate of crystallization of an organic film material used in a liquid crystal display element of the invention, and the temperature.

FIG. 10 is a graph schematically showing the temperature dependence of the rate of crystallization. The rate of crystallization depends on the rate of nucleation and the rate of crystal growth. In the graph of FIG. 10, in the region where the temperature is not lower than the value at which the highest rate of crystallization is obtained, the rate of crystallization depends on the nucleation rate, and in the region where the temperature is not higher than the value, the rate of crystallization depends on the crystal growth rate. Therefore, at a temperature which is not lower than the temperature of the highest rate of crystallization and not higher than the melting point, the nucleation rate can be controlled (method (1) above). When the crystallization is started from a temperature in the vicinity of the temperature at which the highest rate of crystallization is obtained, many crystal nuclei can be generated. In a stage after the nucleation step, the crystal growth rate can be controlled by adjusting the cooling rate (method (2) above). When the cooling rate is low, the size of the spherulites is large, and when the cooling rate is high, the size of spherulites is small. In other words, the size of spherulite can be controlled by controlling the temperature in the step of crystallizing the alignment film.

Consequently, the number of spherulites formed in one pixel can be controlled. When the alignment of the liquid crystal in a pixel is divided into an adequate number of sections, therefore, an image which is free from "unevenness" can be displayed.

An alignment film made of an organic material is cooled in such a manner that the cooling starts from an initial cooling temperature $Y_0°$ C. which is not lower than the temperature of the highest rate of crystallization of the organic material and not higher than the melting point, and the substrate temperature $Y°$ C. reaches a temperature equal to or lower than the glass transition temperature of the organic film after a cooling time t has elapsed. The cooling is controlled in such a manner that the cooling rate a (°C./min) in the crystallization of the organic film is 0.1 (°C./min)$\leq a \leq$3.5 (°C./min) and that the temporal change of the substrate temperature is $Y=Y_0-$at. When the cooling rate in the crystallization of the organic film is controlled in this way, the diameter of spherulites in the alignment film can be set to be not smaller than 1 µm and not greater than 200 µm in the case where the organic film is formed on a foundation layer having a rough surface or a flat surface. In order to obtain spherulites of adequate diameters, the method of controlling the cooling rate in the crystallization of organic film and the method of forming a rough foundation surface can be used independently or in combination.

COMPARATIVE EXAMPLE 4

Alignment films were formed while setting the cooling rate a of the alignment films 9 and 11 of Example 11 to 0.05° C./min and 3.8° C./min. The sizes of spherulites were observed under a polarizing microscope in the same manner as Example 11, and the results shown in Table 2 above were obtained. The cooling rate of 3.8° C./min was found to be too high and spherulites were not formed. The display characteristic of the liquid crystal display device 1 of this example was evaluated. As a result, "unevenness" was confirmed.

COMPARATIVE EXAMPLE 5

The formation of the alignment films 9 and 11 of Example 11 was changed so that the substrate temperature at the start of the cooling process was held at 100° C. for 2 hours and then cooled at a cooling rate of 0.4° C/min. The size of spherulites was observed under a polarizing microscope in the same manner as Example 11, and the results shown in Table 2 above were obtained. In the example, since the cooling was conducted at a cooling rate of 0.4° C./min after the substrate temperature was held for a predetermined period at a low value at the start of the cooling process, spherulites were not formed. The display characteristics of the liquid crystal display device of this example were evaluated. "Unevenness" in the display image was observed.

From the above, according to Example 11, spherulites can be controlled so as to have an adequate size which is not smaller than 1 µm and not greater than 200 µm, by adjusting the crystallization rate of an alignment film. As a result, the example can provide a liquid crystal display device having an excellent viewing angle characteristic and a high display quality which is free from "unevenness".

EXAMPLE 12

Figure 11:
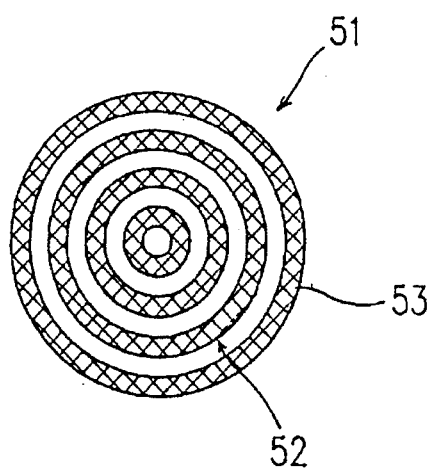
FIG. 11(a) is a configuration view of a photomask which has concentric transparent and light-shield portions for each pixel.
FIG. 11(b) is a configuration view of a photomask in which a pixel is divided into 16 sections.
FIG. 11(c) is a configuration view of a photomask which has transparent and light-shield portions directed in four directions for each pixel.
Figure 11:
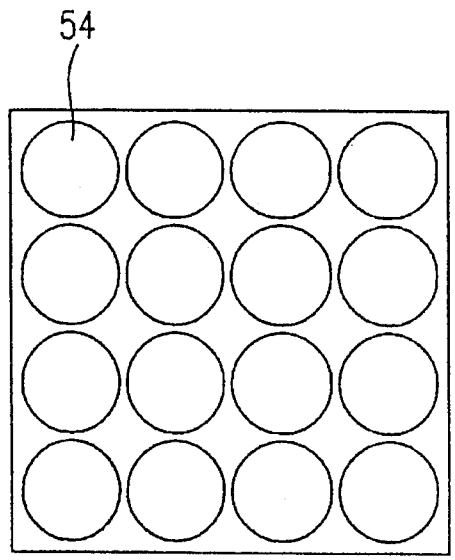
Figure 11:
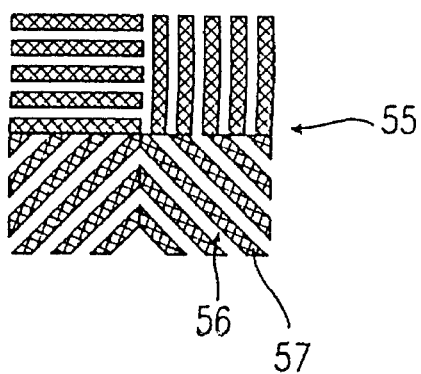

In this example, means for aligning a liquid crystal is formed using a photosensitive polymer. As the material of the alignment film, a photosensitive polymer film (OFR-800, a product of TOKYO OHKA KOGYO CO., LTD.) was used. The photosensitive polymer film was partly irradiated with ultraviolet rays using a photomask. Thereafter, the development and rinse were conducted to form on the surface of a substrate the liquid crystal alignment film having ruggedness which coincides with the pattern of the photomask. The pattern 51 of the photomask used in the example is shown in FIG. 11(a). The pattern shown in FIG. 11(a) corresponds to one pixel, and has at least one transparent portion 52 and at least one light-shield portion 53 which are concentric.

A liquid crystal display device was produced using a pair of substrates each having the thus formed alignment film. As the liquid crystal material, ZLI-4792 (a product of Merck & Co., Inc. adjusted so that the helical pitch was set to be 90°) was used. The thickness of the liquid crystal layer was controlled by using plastic beads having a diameter of 5.5 µm. In the same manner as Examples 8 to 11, the thus produced liquid crystal display device had excellent viewing angle characteristic free from contrast variation depending on the viewing angle and the inversion.

It is preferable to divide a pixel into units of 1 to 200 µm. When the divided pixel unit is greater than 200 µm, the human eye can recognize a portion where the viewing angle is impaired at a certain angle, so that uneveness is conspicuous, thereby lowering the display characteristics. When the unit of dividing a pixel is 1 µm or less, liquid crystal molecules cannot be aligned in accordance with the ruggedness of the substrate, thereby reducing the effects of the invention.

With respect to the division number of a pixel, since a pixel of a liquid crystal display element which is usually used has a size of 50 to 1,000 µm, it is preferable to divide a pixel into 4 to 50 sections in accordance with the above-mentioned divided pixel unit. For example, FIG. 11(b) shows a case where a pixel is divided into 16 sections. Each of portions 54 which are obtained by dividing each pixel into 16 sections has a concentric shape such as shown in FIG. 11(a). In this case, therefore, the photomask has a configuration wherein a pixel portion is divided by 16 and each section has transparent portions and light-shield portions which are concentrically arranged. Preferably, the liquid crystal layer of a liquid crystal display element in which each division unit is set to be an alignment state in one direction has 3 or more alignment directions so that the viewing angle characteristics are made more omni-directional. In order to obtain an alignment film in which each pixel is divided into 4 sections and the sections are aligned in four different alignment directions, for example, the photomask 55 has transparent portions 56 and light-shield portions 57 so that four different alignment directions are obtained as shown in FIG. 11(c). When a pixel is divided in two directions, there exists a region in which the inversion occurs in the viewing angle characteristics, so that the problem of the viewing angle characteristics remain to be solved. Therefore, it is preferable to set at least three different alignment directions. More preferably, considering both the easiness of the production and the viewing angle characteristics, the number of alignment directions is 4 to 6 so as to coincide with the division number of a pixel.

In the example, the liquid crystal alignment layer was formed by optical irradiation using a photomask. In the same manner as Example 5, the liquid crystal alignment layer may be formed by pressing a pattern having projections directed in 3 or more directions, against an alignment film. In the specification, the term "3 or more directions" includes also a radial shape, a concentric shape, a tangential shape, random, etc. Strictly speaking, a radial shape, a concentric shape, and tangential shape are centrally symmetric. In the specification, however, a radial shape, a concentric shape, a tangential shape include those which are not centrally symmetric.

EXAMPLE 13, 14, 15, 16, 17, AND 18

In the following examples, an optical configuration for obtaining a display of a high contrast and free from the coloring phenomenon will be described. As Example 13, the liquid crystal display devices 1 shown in FIG. 1 were produced. In the example, liquid crystal display devices were produced in which pixels formed by the transparent electrodes 8 and 10 are arranged in a matrix form. At least one of the alignment films 9 and 11 has at least one spherulite for each pixel. As the liquid crystal layer 5, a nematic liquid crystal containing a chiral dopant was used. The polarizing plates 3 and 4 are arranged in such a manner that their light transmission axis are perpendicular to each other.

Figure 12:
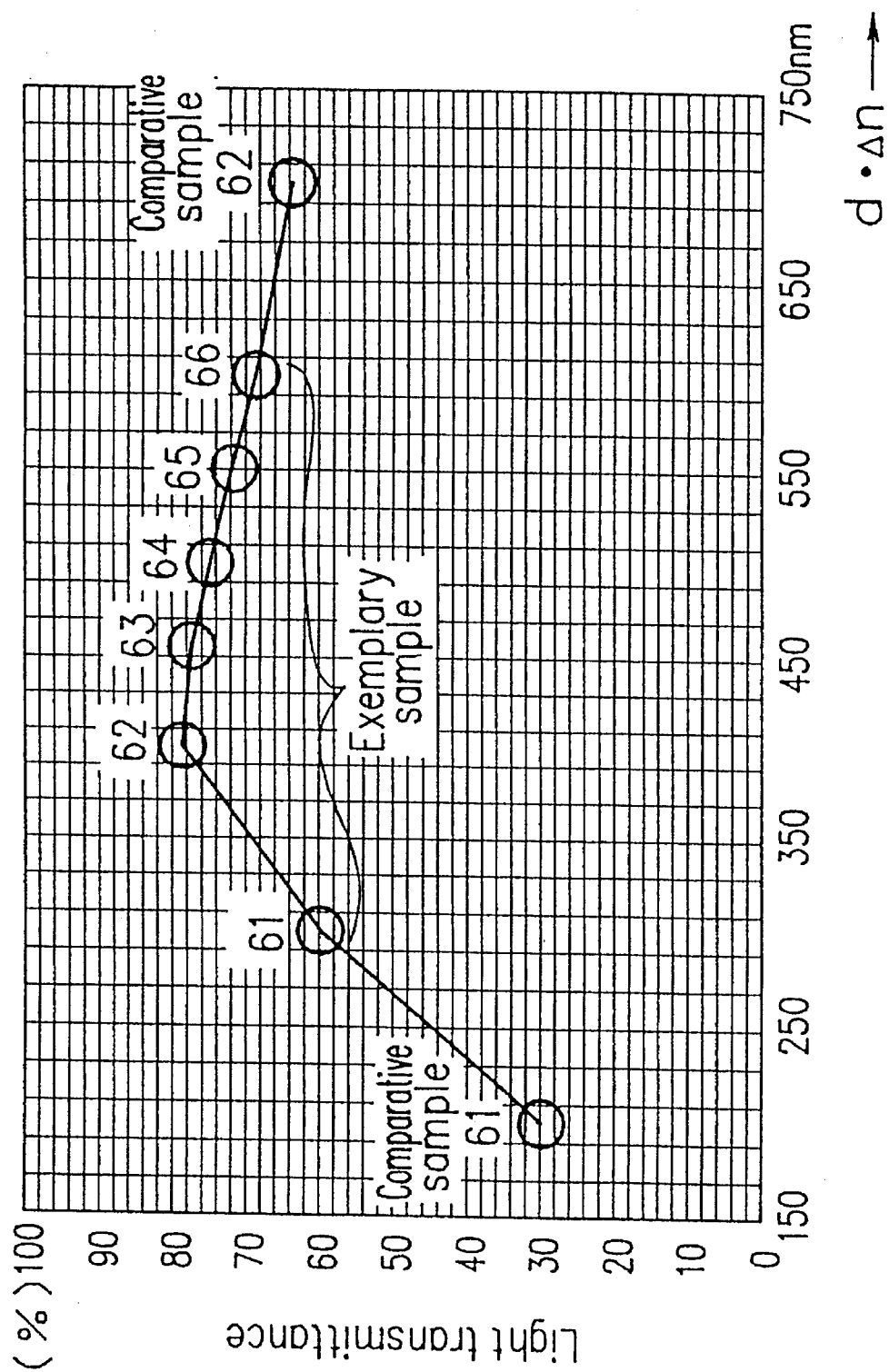
FIG. 12 is a graph showing the $\Delta n \cdot d$ dependence of the light transmittance of a liquid crystal display element of Example 13.

While maintaining the twist angle of the liquid crystal layer 5 of the liquid crystal display devices 1 at 90°, a product d·$\Delta$n of the thickness (cell thickness) d of the liquid crystal layer 5 and the refractive index anisotropy $\Delta$n of the liquid crystal material was varied in the range of 200 to 700 nm and the variation of the light transmittance was measured. The twist angle is the difference of azimuthal angles of liquid crystal alignments on the upper and lower substrates in a liquid crystal layer wherein the azimuthal angle of the liquid crystal alignment in the plane parallel to the substrate surface is twisted along a direction perpendicular to the substrates. FIG. 12 shows the obtained d·$\Delta$n dependence of the light transmittance. As seen from FIG. 12 (exemplary samples 61, 62, 63, 64, 65, and 66, and comparative samples 61 and 62), it was found that the light transmittance varies in accordance with the change of d·$\Delta$n and has a maximal value when d·$\Delta$n is 450 nm.

Figure 13:
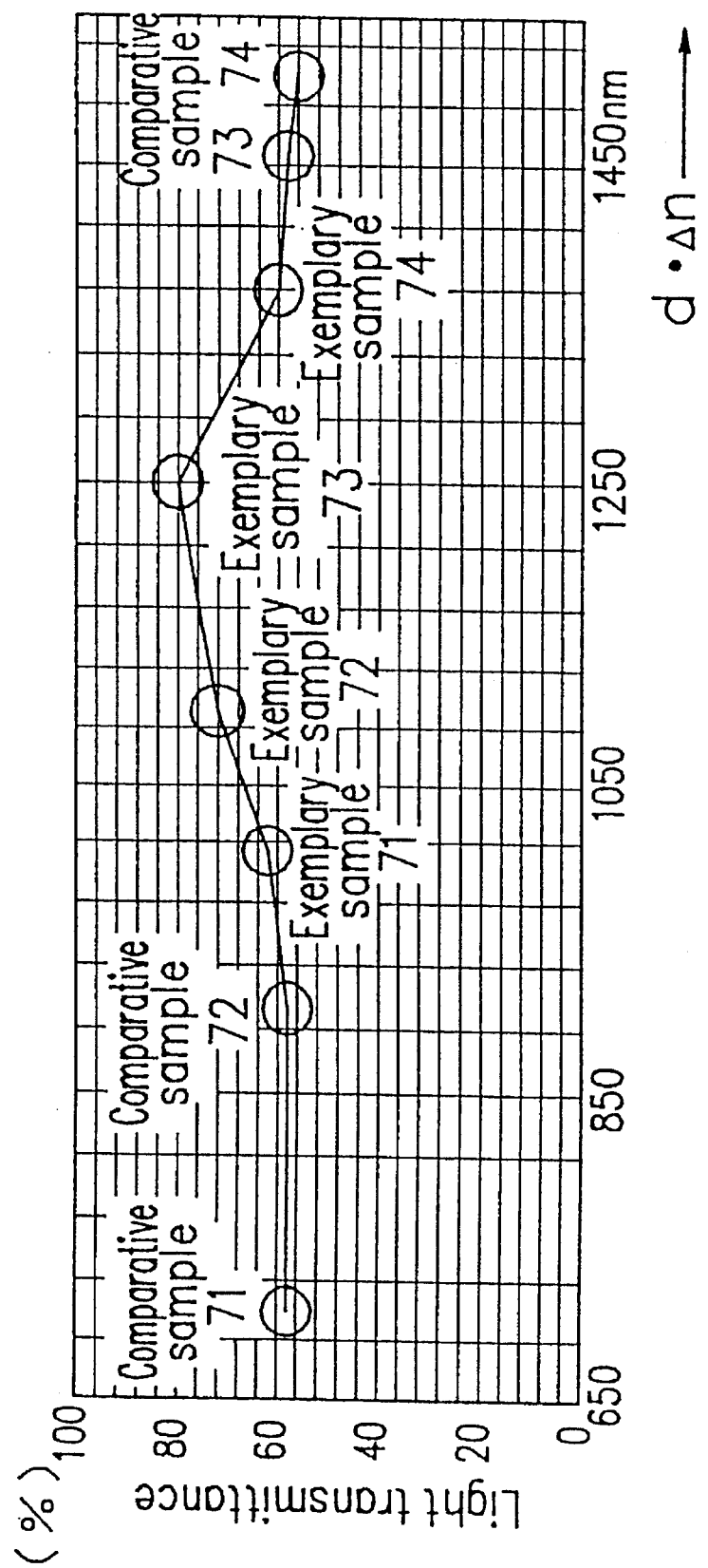
FIG. 13 is a graph showing the $\Delta n \cdot d$ dependence of the light transmittance of a liquid crystal display element of Example 14.

As Example 14, d·$\Delta$n of a liquid crystal display device was similarly changed in the range of 700 to 1,500 nm while maintaining the twist angle of the liquid crystal layer at 90°. It was found that the light transmittance varies as shown in FIG. 13 (exemplary samples 71, 72, 73, and 74, and comparative samples 71, 72, 73, and 74) and has a maximal value when d·$\Delta$n is 1,250 nm.

Figure 14:
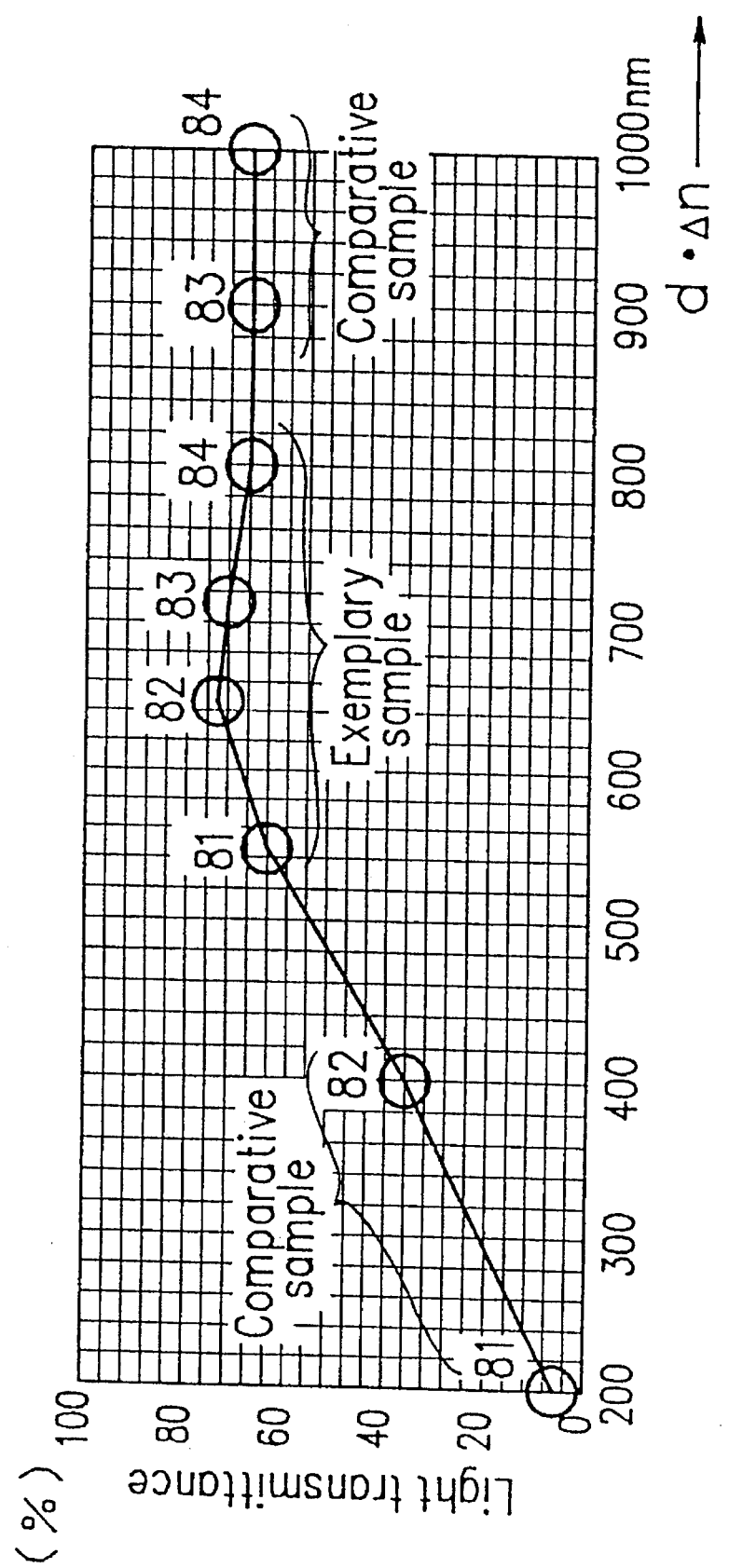
FIG. 14 is a graph showing the $\Delta n \cdot d$ dependence of the light transmittance of a liquid crystal display element of Example 15.

Furthermore, as Example 15, d·$\Delta$n of a liquid crystal display device was similarly changed in the range of 200 to 1,000 nm while maintaining the twist angle of the liquid crystal layer at 270°. It was found that the light transmittance varies as shown in FIG. 14 (exemplary samples 81, 82, 83, and 84, and comparative samples 81, 82, 83, and 84) and has a maximal value when d·$\Delta$n is 650 nm.

Figure 15:
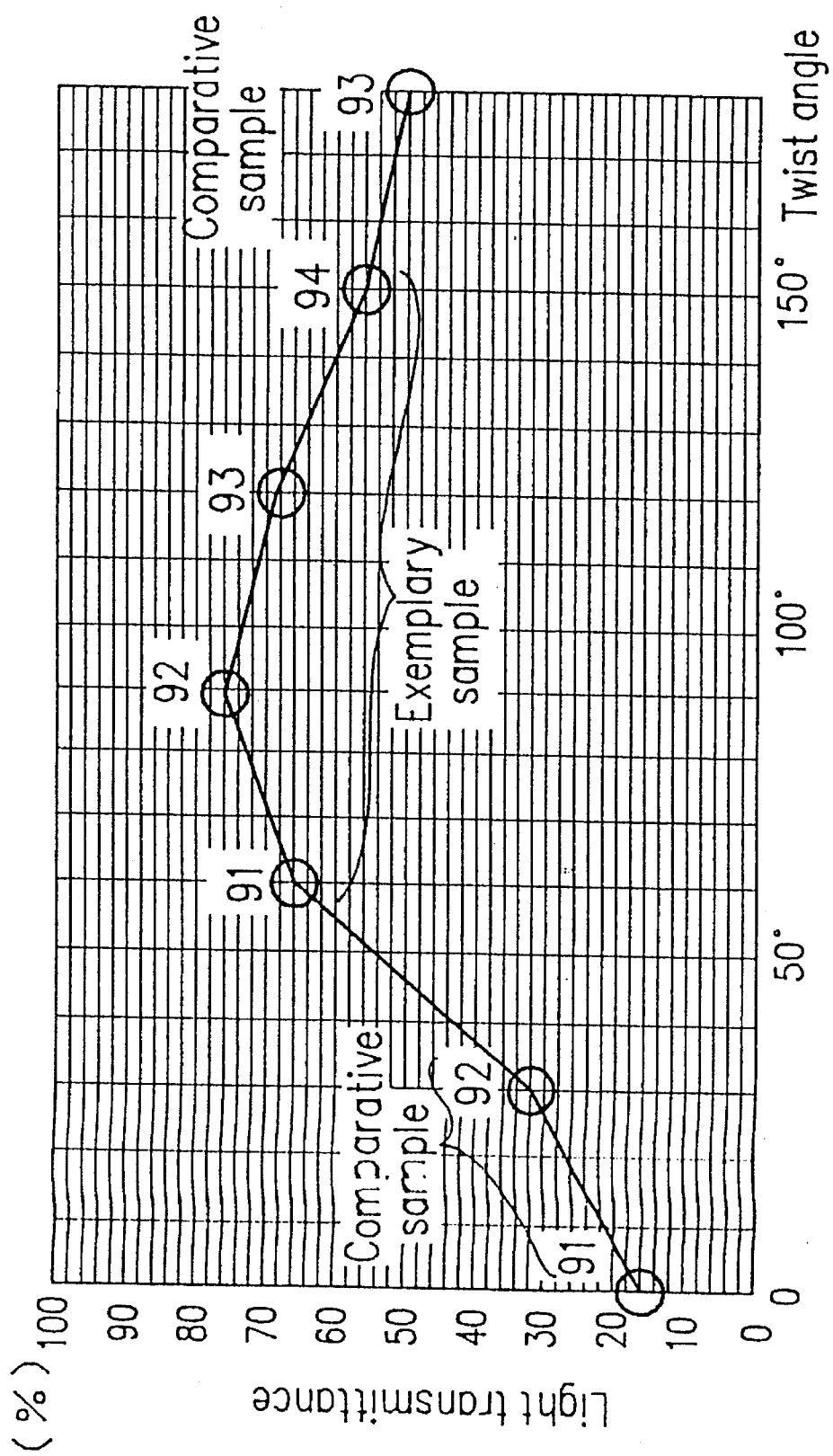
FIG. 15 is a graph showing the twist angle dependence of the light transmittance of a liquid crystal display element of Example 16.

Furthermore, as Example 16, the twist angle of the liquid crystal layer of a liquid crystal display device was changed in the range of 0° to 180° while maintaining d·$\Delta$n at 450 nm. It was found that the light transmittance varies as shown in FIG. 15 (exemplary samples 91, 92, 93, and 94, and comparative samples 91, 92, and 93) and has a maximal value when the twist angle of the liquid crystal layer is 90°.

Figure 16:
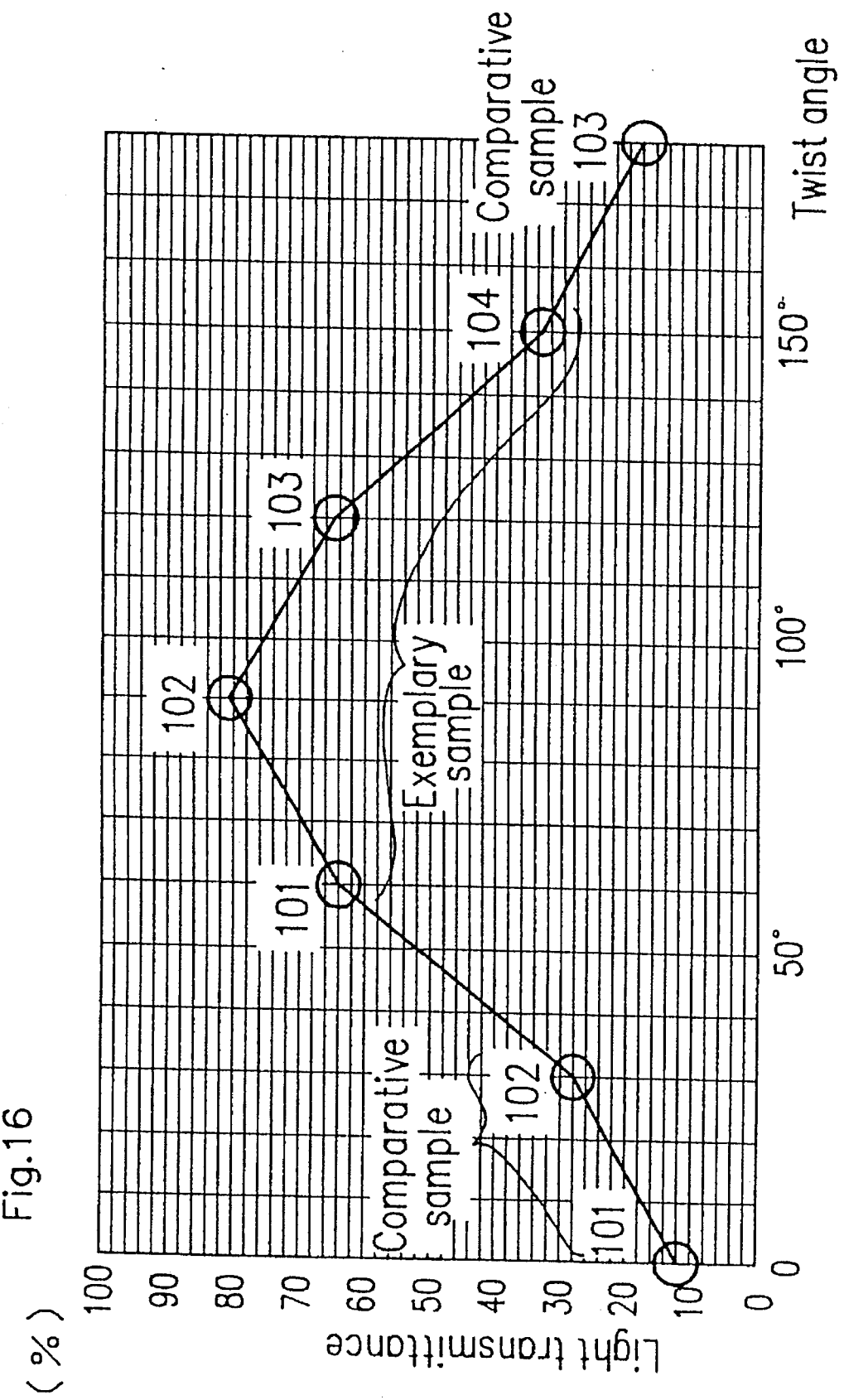
FIG. 16 is a graph showing the twist angle dependence of the light transmittance of a liquid crystal display element of Example 17.

Furthermore, as Example 17, the twist angle of the liquid crystal layer of a liquid crystal display device was similarly changed in the range of 0° to 180° while maintaining d·$\Delta$n at 1,250 nm. It was found that the light transmittance varies as shown in FIG. 16 (exemplary samples 101, 102, 103, and 104, and comparative samples 101, 102, and 103) and has a maximal value when the twist angle of the liquid crystal layer is 90°.

Figure 17:
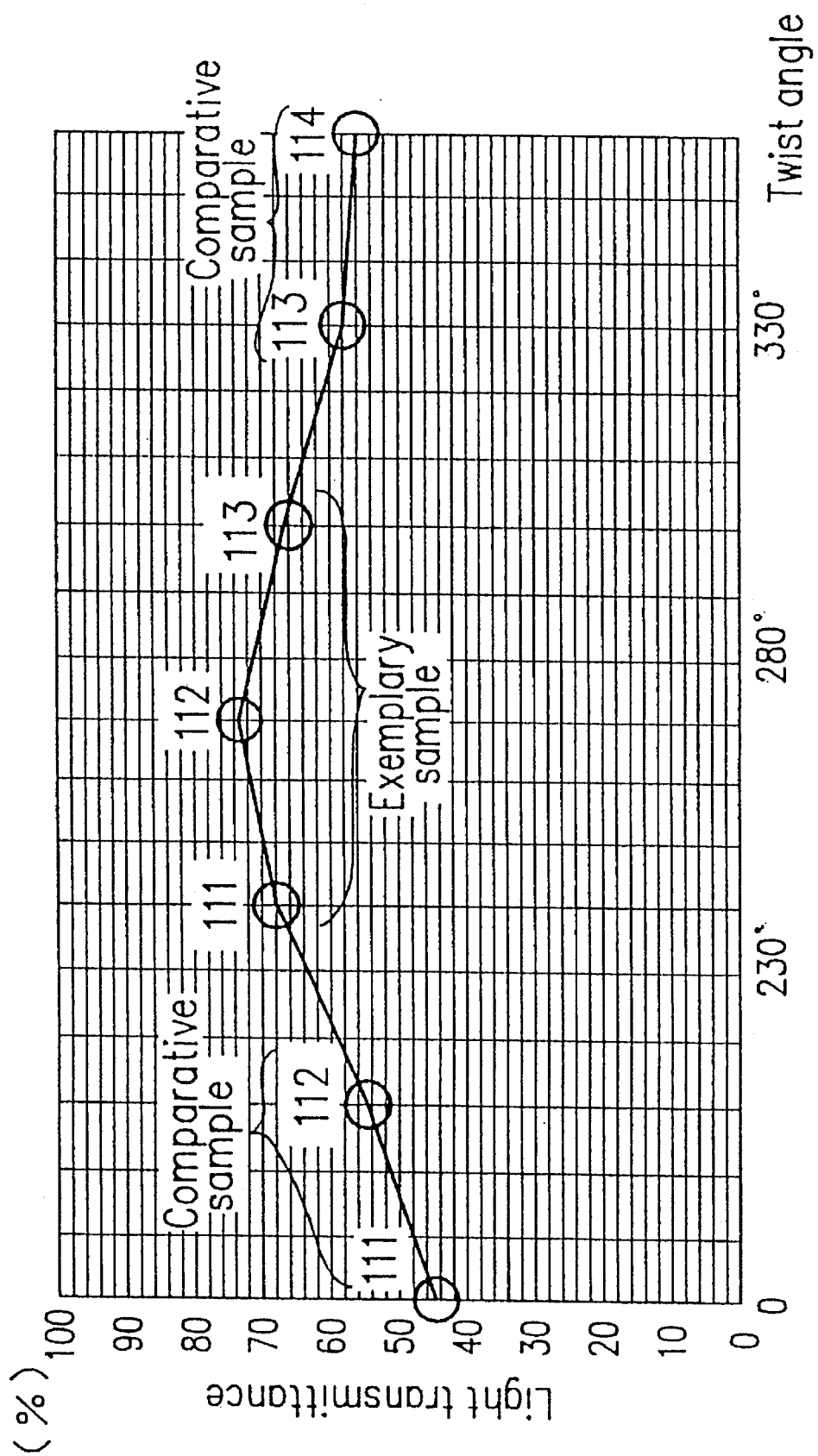
FIG. 17 is a graph showing the twist angle dependence of the light transmittance of a liquid crystal display element of Example 18.

Furthermore, as Example 18, the twist angle of the liquid crystal layer of a liquid crystal display element was similarly changed in the range of 180° to 360° while maintaining d·$\Delta$n at 650 nm. It was found that the light transmittance varies as shown in FIG. 17 (exemplary samples 111, 112, and 113, and comparative samples 111, 112, 113, and 114) and has a maximal value when the twist angle of the liquid crystal layer is 270°.

In the liquid crystal display devices of Examples 13 to 18, the light transmittance in the case where a voltage of substantially 0 V is applied is determined by the twist angle of the liquid crystal layer, and the product of the refractive index anisotropy ($\Delta$n) peculiar to the liquid crystal material and the thickness (d) of the liquid crystal layer. This is caused by the fact that, also in the liquid crystal display devices of Examples 13 to 18, the light transmittance is controlled by adjusting the light absorption of two polarizing plates while utilizing the optical rotary power and birefringence of a liquid crystal layer disposed between the two polarizing plates in the same manner as a conventional liquid crystal display device of the TN type, the STN type, or the like. In order to obtain an excellent black state which largely affects the display quality, the two polarizing plates between which the liquid crystal layer is interposed are preferably arranged in such a manner that their light transmission axes are perpendicular to each other (i.e., normally white). Even when the polarizing plates are arranged in another manner, the display device of the invention can be produced. Hereinafter, the relationship between the light transmittance of a liquid crystal display device and the above-mentioned two parameters (the twist angle and d·$\Delta$n) in the case in which the two polarizing plates are arranged in such a manner that their light transmission axes are perpendicular to each other will be described.

In the Case where the Twist Angle is Constant

In the liquid crystal display devices of Examples 13 and 14, when d·$\Delta$n is changed from 200 to 1,500 nm while maintaining the twist angle of the liquid crystal layer at 90°, the transmittance has a maximal value when d·$\Delta$n is 450 nm and 1,250 nm. When the value of d·$\Delta$n is to be optimized in this region, in the regions where d·$\Delta$n is equal to or greater than 200 nm and smaller than 300 nm, where d·$\Delta$n is greater than 650 nm and smaller than 1,000 nm, and where d·$\Delta$n is greater than 1,400 nm and smaller than 1,500 nm, the light transmittance is lowered, and the display image is colored in red (650 to 800 nm, 1,400 to 1,500 nm), blue (200 to 300 nm, 800 to 900 nm), and green (900 to 1,000 nm). Therefore, the examples are not suitable for a display element.

Accordingly, when the twist angle is 90 deg. and d·$\Delta$n is in the range of 200 to 1,500 nm, the range wherein the examples can satisfactorily be used as a liquid crystal display element is a range of 300 to 650 nm including 450 nm at which the transmittance exhibits a maximal value, or a range of 1,000 to 1,400 nm including 1,250 nm at which the transmittance exhibits a maximal value, and, more preferably, a range of 350 to 550 nm or 1,100 to 1,300 nm.

In the liquid crystal display devices of Example 15, when d·$\Delta$n is changed from 200 to 1,000 nm while maintaining the twist angle of the liquid crystal layer at 270°, the transmittance has a maximal value when d·$\Delta$n is 650 nm. When the value of d·$\Delta$n is not greater than 550 nm or not smaller than 800 nm, the light transmittance is lowered, and a display image is colored in blue (200 to 550 nm), and red (800 to 1,000 nm). Therefore, the example is not suitable for a display element.

Accordingly, when the twist angle is in the vicinity of 270 deg. and d·Δn is 200 to 1,000 nm, the range wherein the example can be used as a liquid crystal display element is a range of 550 to 800 nm including 650 nm at which the transmittance exhibits a maximal value, and, more preferably, a range of 600 to 750 nm.

In the Case where d·Δn is Constant

In the liquid crystal display devices of Example 16, the twist angle of the liquid crystal layer is changed in the range of 0° to 360° while maintaining d·Δn at 450 nm. When the twist angle is smaller than 45° or exceeds 150°, the light transmittance is lowered, and a display image is colored in yellow (0° to 45°), and blue (150° to 360°). Therefore, the example is not suitable for a display element. Accordingly, when d·Δn is in the vicinity of 450 nm and the twist angle is in the range of 0° to 360°, the range wherein the example can be used as a liquid crystal display device is a range of 45° to 150°, and, more preferably, a range of 75° to 150°.

In the liquid crystal display devices of Example 17, the twist angle of the liquid crystal layer is changed in the range of 0° to 360° while maintaining d·Δn at 1,250 nm. When the twist angle is smaller than 45° or exceeds 150°, the light transmittance is lowered, and a display image is colored in blue (0° to 45°, 200° to 360°), and yellow (150° to 200°). Therefore, the example is not suitable for a display element. Accordingly, when d·Δn is in the vicinity of 50 nm and the twist angle is in the range of 0° to 60°, the range wherein the example can be used as a liquid crystal display device is a range of 45° to 50°, and, more preferably, a range of 75° to 105°.

In the liquid crystal display devices of Example 18, the twist angle of the liquid crystal layer is changed in the range of 0° to 360° while maintaining d·Δn at 650 nm. When the twist angle is equal to or smaller than 240° or equal to or greater than 300°, the light transmittance is lowered, and a display image is colored in purple (0° to 45°), red (45° to 105°), yellow (105° to 240°), and blue (330° to 360°). Therefore, the example is not suitable for a display element. Accordingly, when d·Δn is in the vicinity of 650 nm and the twist angle is in the range of 0° to 360°, the range wherein the example can be used as a liquid crystal display device is a range of 240° to 300°, and, more preferably, a range of 255° to 285°.

Examples 13 to 18 will be described specifically. First, exemplary samples 61 to 66, and comparative samples 61 and 62 of Example 13 will be described. On glass substrates (thickness: 1.1 mm) which were provided with transparent electrodes of ITO (a mixture of indium oxide and tin oxide, thickness: 50 nm), an alignment film was formed in the same manner as any of Examples 8 to 12. Thereafter, using a pair of the substrates, the cell thickness d was maintained by a spacer at a value listed in Table 3 below, thereby constituting liquid crystal cells.

As the liquid crystal material, ZLI-4792 (a product of Merck & Co., Inc. added with S-811 and adjusted so that the twist angle of the liquid crystal between the upper and lower substrates was set to be 90° in accordance with the cell thickness d of each cell) was injected into the liquid crystal cells, thereby constituting a liquid crystal display device.

When the thus produced liquid crystal display devices were observed under a polarizing microscope, a pattern (schlieren pattern) due to the alignment of the liquid crystal as shown in FIG. 2 was observed. The reason of this phenomenon is that liquid crystal molecules on the substrate interface of the liquid crystal layer were aligned in accordance with spherulites of the polymer films formed on the substrates.

The characteristics of the light transmittance and d·Δn of the liquid crystal display devices obtained when no voltage was applied are shown in FIG. 12. In this case, the light transmittance of 100% was set to a transmittance realized by sticking two polarizing plates (of the same kind as that stuck to the cells) together in parallel in such a manner that their transmission axes coincided with each other.

According to the liquid crystal display devices, in all of the exemplary samples and comparative samples of Example 13, the alignment films were provided with spherulites of an adequate size, and therefore the liquid crystal was aligned in multiple axial directions. Accordingly, the viewing angle characteristics were excellent and the inversion which is a problem of a TN cell to be solved was not observed. In the exemplary samples of Example 13, the contrast was high and transmitted light was free from coloring.

Next, exemplary samples 71 to 74, and comparative samples 71 to 74 of Example 14 will be described. The substrates of the liquid crystal display devices were produced in the same manner as Example 13. The liquid crystal display devices were configured in the same manner as those of Example 13. The cell thickness was selected for each of the exemplary samples and comparative samples as shown in Table 4 below, whereby Δn·d was realized as listed in Table 4.

TABLE 3

|  | Comparative sample 61 | Exemplary sample 61 | Exemplary sample 62 | Exemplary sample 63 | Exemplary sample 64 | Exemplary sample 65 | Exemplary sample 66 | Comparative sample 62 |
| --- | --- | --- | --- | --- | --- | --- | --- | --- |
| Cell thickness (μm) | 2.1 | 3.2 | 4.2 | 4.8 | 5.3 | 5.8 | 6.4 | 7.4 |
| Δn · d (nm) | 198 | 302 | 396 | 453 | 500 | 548 | 604 | 699 |

TABLE 4

| | Comparative sample 71 | Comparative sample 72 | Exemplary sample 71 | Exemplary sample 72 | Exemplary sample 73 | Exemplary sample 74 | Comparative sample 73 | Comparative sample 74 |
|---|---|---|---|---|---|---|---|---|
| Cell thickness (μm) | 7.4 | 9.5 | 10.6 | 11.7 | 13.2 | 14.6 | 15.4 | 15.9 |
| Δn · d (nm) | 698 | 897 | 1001 | 1105 | 1246 | 1378 | 1454 | 1501 |

In this case, the proportion of the chiral agent (S811) in the liquid crystal of the liquid crystal display devices of the exemplary samples and comparative samples were adjusted so that the twist angle was set to be 90° in accordance with the cell thickness of each cell. A liquid crystal material was prepared for each cell, and the liquid crystal material was injected into the respective cell, thereby constituting liquid crystal display devices.

When the thus produced liquid crystal display devices were observed under a polarizing microscope, a pattern (schlieren pattern) due to the alignment of the liquid crystal as shown in FIG. 2 was observed. The reason for this phenomenon was that liquid crystal molecules on the substrate interface of the liquid crystal layer were aligned in accordance with spherulites of the polymer films formed on the substrates. The light transmittance of the liquid crystal display devices obtained when no voltage was applied are shown in FIG. 13. In this case, a light transmittance of 100% was set to a transmittance realized by sticking two polarizing plates (of the same kind as those stuck to the cells) together in parallel in such a manner that their transmission axes coincided with each other.

According to the liquid crystal display devices, in all of the exemplary samples and comparative samples of Example 14, the viewing angle characteristic was excellent and the inversion which is an unsolved problem in a TN cell was not observed in the same manner as those of Example 13. In the exemplary samples of Example 14, the contrast was high and transmitted light was free from coloring.

Furthermore, exemplary samples 81 to 84, and comparative samples 81 to 84 of Example 15 will be described. The substrates of the liquid crystal display devices were produced in the same manner as the production method of Example 13. The liquid crystal display devices were configured in the same manner as those of Example 13. The cell thickness d was selected for each of the exemplary samples and comparative samples as shown in Table 5 below, whereby Δn·d was realized as listed in Table 5.

so that the twist angle was set to be 270° in accordance with the cell thickness d of each cell. A liquid crystal material was prepared for each cell, and the liquid crystal material was injected into the respective cell, thereby constituting liquid crystal display devices.

When the thus produced liquid crystal display devices were observed under a polarizing microscope, a pattern (schlieren pattern) due to the alignment of the liquid crystal as shown in FIG. 2 was observed. The reason for this phenomenon was that liquid crystal molecules on the substrate interface of the liquid crystal layer were aligned in accordance with spherulites of the polymer films formed on the substrates.

Measurements were conducted in the same manner as Example 13, and the d·Δn dependence of the light transmittance shown in FIG. 14 was obtained.

According to the liquid crystal display devices, in all of the exemplary samples and comparative samples of Example 15, the viewing angle characteristic was excellent and the inversion phenomenon which is an unsolved problem in a TN cell was not observed. In the exemplary samples of Example 15, the contrast was high and transmitted light was free from coloring.

Furthermore, exemplary samples 91 to 94, and comparative samples 91 to 93 of Example 16 will be described. By the configuration and injecting method which are the same as those used to make Example 13, liquid crystal display devices were produced. The proportions of the chiral agent

TABLE 5

| | Comparative sample 81 | Comparative sample 82 | Exemplary sample 81 | Exemplary sample 82 | Exemplary sample 83 | Exemplary sample 84 | Comparative sample 83 | Comparative sample 84 |
|---|---|---|---|---|---|---|---|---|
| Cell thickness (μm) | 2.1 | 4.2 | 5.8 | 6.9 | 7.6 | 8.5 | 9.5 | 10.6 |
| Δn · d (nm) | 198 | 396 | 548 | 651 | 717 | 802 | 897 | 1001 |

In this case, the proportions of the chiral agent (S811) in the liquid crystal of the liquid crystal display devices of the exemplary samples and comparative samples were adjusted (S811) in the liquid crystal were adjusted so that the twist angle listed in Table 6 below was realized in accordance with the cell thickness d (4.8 μm) of the liquid crystal layer.

TABLE 6

|  | Comparative sample 91 | Comparative sample 92 | Exemplary sample 91 | Exemplary sample 92 | Exemplary sample 93 | Exemplary sample 94 | Comparative sample 93 |
| --- | --- | --- | --- | --- | --- | --- | --- |
| Twist angle (deg.) | 0 | 30 | 60 | 90 | 120 | 150 | 180 |

The cells were configured in the same manner as those of Example 13. With respect to the cell thickness d, cells with 4.8 μm thickness selected from many cells were used. This allowed d·Δn to be 450 nm.

Measurements were conducted in the same manner as Example 13, and the twist angle dependence of the light transmittance shown in FIG. 15 was obtained.

According to the liquid crystal display devices, in all of the exemplary samples and comparative samples of Example 16, the viewing angle characteristic was excellent and the inversion was not observed. In the exemplary samples of Example 16, the contrast is high and transmitted light was free from coloring.

Furthermore, exemplary samples 101 to 104, and comparative samples 101 to 103 of Example 17 will be described. By the configuration and injecting method used in Example 13, liquid crystal display devices were produced. The proportions of the chiral agent (S811) in the liquid crystal was adjusted so that the twist angle listed in Table 7 below was realized in accordance with the thickness (13.2 μm) of the liquid crystal layer.

According to the liquid crystal display devices, in all of the exemplary samples and comparative samples of Example 17, the viewing angle characteristic was excellent and the inversion was not observed. In the exemplary samples of Example 17, the contrast was high and transmitted light was free from coloring.

Furthermore, exemplary samples 111 to 113, and comparative samples 111 to 114 of Example 18 will be described. By the configuration and injecting method used in Example 13, liquid crystal display devices were produced. The proportions of the chiral agent (S811) in the liquid crystal were adjusted so that the twist angle listed in Table 8 below was realized in accordance with the thickness (6.9 μm) of the liquid crystal layer.

TABLE 8

|  | Comparative sample 111 | Comparative sample 112 | Exemplary sample 111 | Exemplary sample 112 | Exemplary sample 113 | Comparative sample 113 | Comparative sample 114 |
| --- | --- | --- | --- | --- | --- | --- | --- |
| Twist angle (deg.) | 180 | 210 | 240 | 270 | 300 | 330 | 360 |

The liquid crystal display devices were configured in the same manner as those of Example 15. With respect to the cell thickness d, those with 6.9 μm thickness were selected from many liquid crystal display devices to be used. This allowed d·Δn to be 650 nm.

Measurements were conducted in the same manner as Example 15, and the twist angle dependence of the light transmittance shown in FIG. 15 was obtained.

According to the liquid crystal display devices, in all of the exemplary samples and comparative samples of Example 18, the viewing angle characteristic was excellent and the inversion was not observed. In the exemplary

TABLE 7

|  | Comparative sample 101 | Comparative sample 102 | Exemplary sample 101 | Exemplary sample 102 | Exemplary sample 103 | Exemplary sample 104 | Comparative sample 103 |
| --- | --- | --- | --- | --- | --- | --- | --- |
| Twist angle (deg.) | 0 | 30 | 60 | 90 | 120 | 150 | 180 |

The liquid crystal display devices were configured in the same manner as those of Example 14. With respect to the cell thickness d, those with 3.2 μm thickness selected from many liquid crystal display devices were used. This allowed d·Δn to be 1,250 nm.

Measurements were conducted in the same manner as Example 14, and the twist angle dependence of the light transmittance shown in FIG. 16 was obtained.

samples of Example 18, the contrast was high and transmitted light was free from coloring.

As described in Examples 13 to 18, in a liquid crystal display device wherein the twist angle of alignment between the upper and lower substrates in a liquid crystal injected into a liquid crystal display cell is 45 to 150 deg. and a product of the refractive index anisotropy Δn of the liquid crystal material and the cell thickness d is 300 to 650 nm, a liquid crystal display device wherein the twist angle is 45 to 150 deg. and Δn·d is 1,000 to 1,400 nm, or a liquid crystal display device wherein the twist angle is 240 to 300 deg. and Δn·d is 550 to 800 nm, the contrast was high and transmitted light was free from coloring.

As described above, spherulites of an alignment film adequately grow owing to the ruggedness of a foundation layer for the liquid crystal alignment film. In this way, the alignment film has spherulites of adequate diameters. In a liquid crystal layer contacting with the alignment film, therefore, a portion in which a radial alignment is conducted is formed in accordance with the surface state of the spherulites in the alignment film. Liquid crystal molecules of the liquid crystal layer in which a radial alignment is conducted are aligned in various directions. As a result, in the obtained liquid crystal display element, there is substantially no viewing angle dependence. Depending on the degree of the roughness of the foundation surface, moreover, it is possible to control the optimum size of spherulites so that "unevenness" does not occur in an image. The surface roughness is preferably 1.4 to 2.8 nm. The roughness of the rugged shape may be formed easily by depositing particles onto the foundation surface, or by etching the foundation surface.

Furthermore, a larger number of crystal nuclei can be generated by using one polymer component in polymer blends as crystal nuclei. Therefore, it is possible to control the optimum size of spherulites so that "unevenness" does not occur in an image.

Furthermore, a large number of crystal nuclei can be generated by starting the crystallization from a temperature in the vicinity of the temperature at which the highest crystal growth rate is obtained, and the crystal growth rate of spherulites can be controlled by then adjusting the cooling rate. Accordingly, the optimum size of spherulites preventing "unevenness" can be obtained.

When the twist angle of the liquid crystal, and a product Δn·d of the refractive index anisotropy Δn and the cell thickness d are set in the range in the vicinity of the maximal value of the light transmittance property with respect to the twist angle and the product Δn·d, the contrast is high and transmitted light is free from coloring.

EXAMPLE 19

As a method of aligning a liquid crystal in 3 or more different directions in order to improve the viewing angle characteristic of a liquid crystal display device, the inventors found a method utilizing polymer walls in a liquid crystal display element using a polymer dispersed liquid crystal (PDLC). Hereinafter, this method will be described. The inventors paid attention to a horizontal portion (a portion parallel to a substrate) of a polymer matrix for arranging liquid crystal domains radially or at random in a liquid crystalline phase in a liquid crystal display device of the PDLC mode, and found that, even when the degree of the formation of polymer walls in PDLC is reduced, liquid crystal domains can be arranged radially, in a grid form, or at random by controlling the configuration of the horizontal portion.

Figure 18:
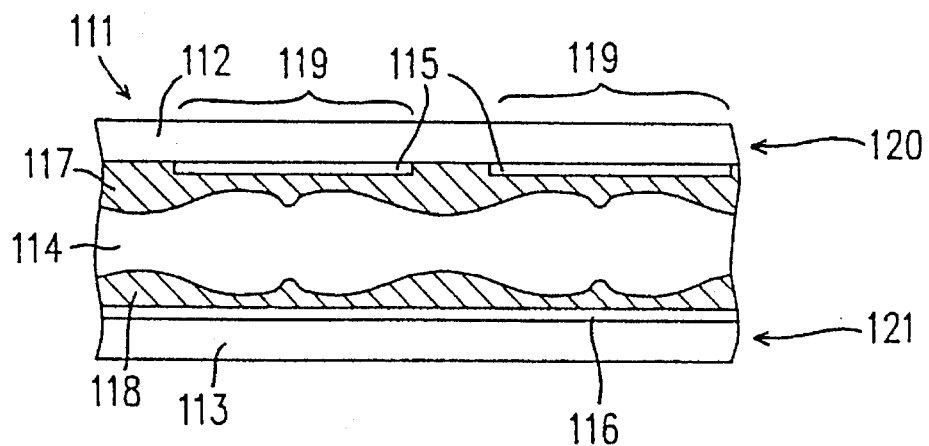
FIG. 18 is a section view of a TN type liquid crystal display element of Example 19.

FIG. 18 is a section view of a TN type liquid crystal display element 111 of an example of the invention. For example, the TN type liquid crystal display element 111 has a configuration in which a liquid crystal layer 114 is sandwiched between a pair of glass substrates 112 and 113. On the one substrate 112, a plurality of pixel electrodes 115 are formed in a matrix form. On the other substrate 113, a common electrode 116 is formed. Polymer films 117 and 118 are formed on the substrates 112 and 113, respectively. The shapes of the polymer films 117 and 118 will be described later. Each pixel 119 is structured by one of the pixel electrodes 115, the common electrode 116, and the liquid crystal layer 114 between the pixel electrode 115 and the common electrode 116.

Hereinafter, a method of producing the liquid crystal display element 111 of the example will be described.

A pair of display substrates 120 and 121 were obtained by forming the pixel electrodes 115 and the common electrode 116, which are transparent electrodes made of ITO (film thickness: 50 nm), on the paired glass substrates 112 and 113 (plate thickness: 1.1 mm). The pair of display substrates 120 and 121 were combined keeping a cell thickness of 6 μm by spacers (not shown), thereby constituting a cell. The spacer can be spherical, cylindrical or fibrous and have a diameter of 6 μm. The cell has a configuration in which the pair of display substrates 120 and 121 are separated from each other by the spacers. A sealing agent is disposed in the periphery portions of the display substrates 120 and 121 to perform the seal.

Figure 19:
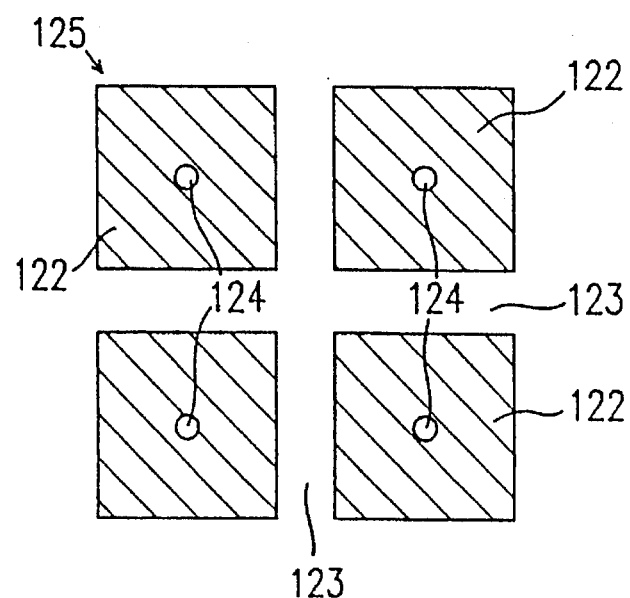
FIG. 19 is a plan view of a photomask used in Example 19.

On the upper face of the produced cell, a photomask 125 shown in FIG. 19 is disposed. The photomask 125 has a configuration in which a plurality of rectangular light-shield regions 122 are formed in a matrix form, a transparent region 123 is formed between the light-shield regions 122, and a transparent hole 124 having, for example, a circular shape is formed at the center portion of each light-shield region 122.

In the cell, a mixture was disposed in which 0.1 g of a photocurable resin material (for example, R-684 (a product of NIPPON KAYAKU CO., LTD.):styrene isobornyl methacrylate=10:5:85), 1.9 g of a liquid crystal material, for example, ZLI-4792 (a product of Merck & Co., Inc. containing 0.4 wt % of S-811), and 0.0025 g of a photo-initiator, for example, Irugacure 651 are mixed. Specifically, the mixture in a transparent state (35° C.) was injected into the cell. While maintaining the same temperature, then, an irradiation cycle (UV rays are irradiated for 1 second and irradiation is halted for 30 seconds) was conducted 20 times. The light intensity at a position of the cell was 10 mW/cm$^2$. A high pressure mercury lamp was used as a light source for producing parallel rays and irradiation was performed from the side of the dot pattern of the photomask 125. Thereafter, UV rays were irradiated for 10 minutes, and UV rays were further irradiated for 10 minutes after removing the photomask 125, thereby curing the photocurable resin material in the mixture.

Figure 20:
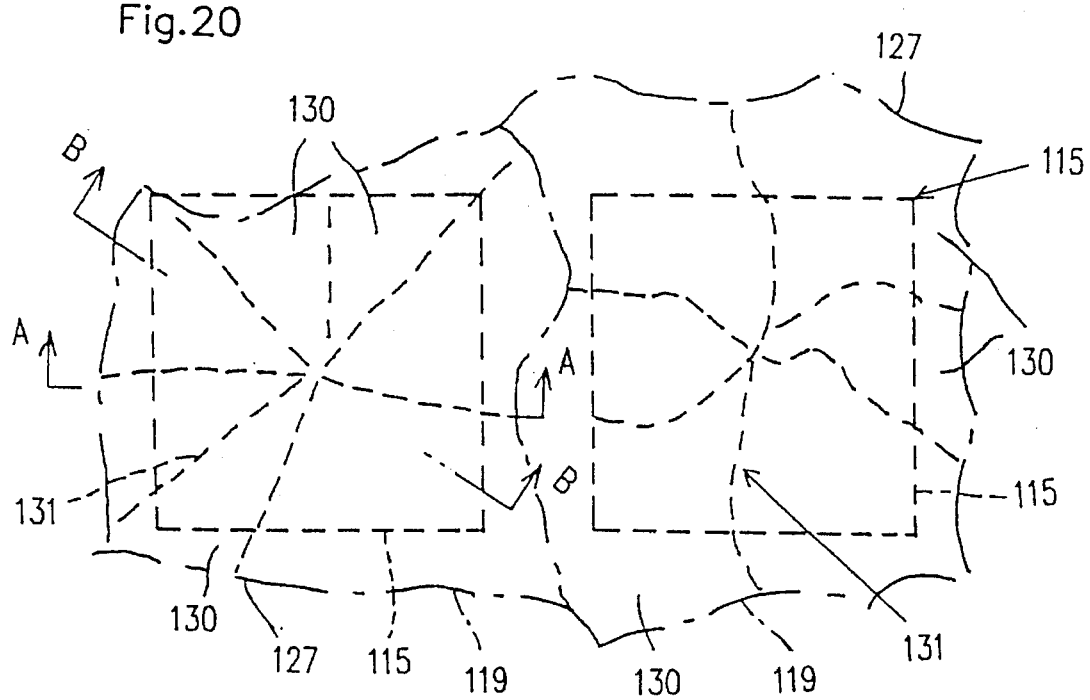
FIG. 20 is a plan view showing a part of the liquid crystal display element of Example 19.

The liquid crystal display element 111 in which the liquid crystal layer 114 is formed in this way between the pair of glass substrates 120 and 121 of the cell was observed under a polarizing microscope. Although regions wherein polymer walls are formed as a result of curing the photocurable resin material between the upper and lower display substrates 120 and 121 partly exist, the liquid crystal display element 111 had, as a whole, a configuration which was substantially free from such polymer walls as shown in FIG. 18. In the element, as shown in FIG. 20, liquid crystal domains were partly formed in a radial manner.

Figure 21:
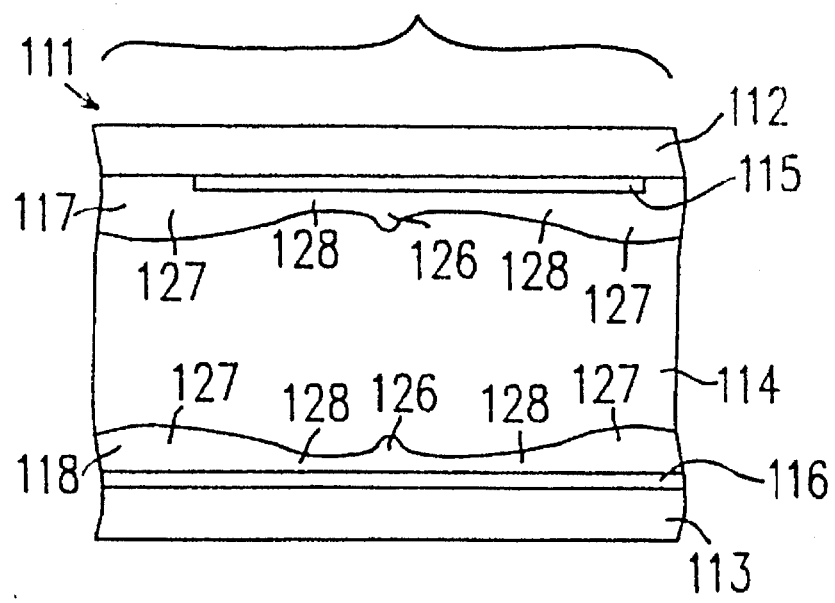
FIGS. 21(a) and 21(b) are section views of the liquid crystal display element of Example 19 as viewed from section lines A—A and B—B in FIG. 20, respectively.
Figure 21:
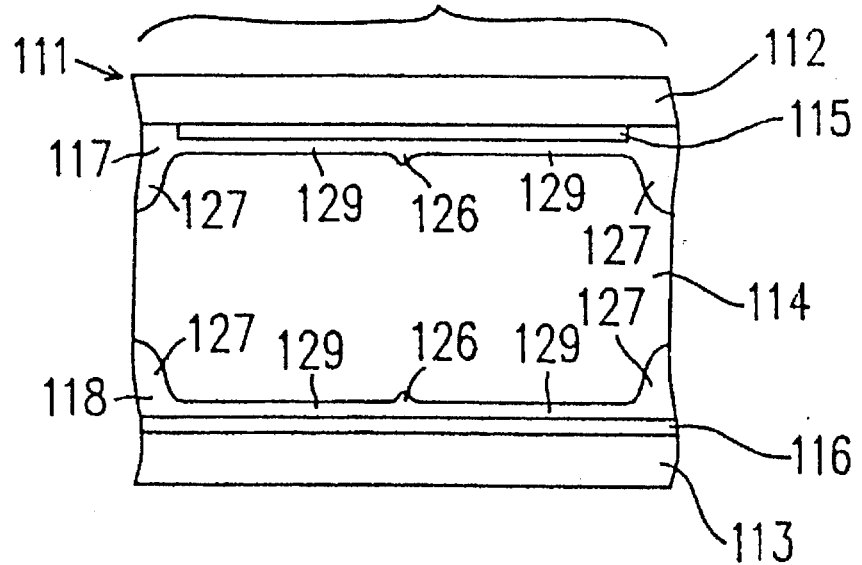

Hereinafter, the configuration of each pixel of the liquid crystal display element 111 will be described in detail. FIG. 20 is a plan view showing a part of the liquid crystal display element 111, FIG. 21(a) is a section view as viewed from a section line A—A of FIG. 20, and FIG. 21(b) is a section view as viewed from a section line B—B of FIG. 20. Each pixel 119 is formed in a range which substantially covers the respective pixel electrode 115. On the polymer films 117 and 118 within the range of each pixel 119, projection 126 is formed at a substantially center portion of each pixel 119. In the peripheral portion of each pixel 119, a ridge 127 is formed which is a raised portion substantially continuing along the peripheral portion. Between the projections 126 and the ridge 127, a plurality of radial ridges 128 are formed in a radial or relatively random manner. In the areas between the projections 126, the ridge 127, and the radial ridges 128, thin film portions 129 which are relatively thin are formed on the electrodes 115 and 116. The thin film portions 129 function as alignment films for liquid crystal molecules of the liquid crystal layer 114.

In the liquid crystal layer 114 within the range of each pixel 119, the liquid crystal domains 130 are formed at portions corresponding to the thin film portions 129, and disclinations 131 are formed at portions corresponding to the projections 126, the ridge 127, and the radial ridges 128, in a radial or relatively random manner corresponding to the shapes of these projections and ridges.

Two polarizing plates which have polarizing axes crossing each other perpendicularly are respectively stuck to both sides of the thus produced liquid crystal display element 111, thereby producing a liquid crystal display element 111 in which the liquid crystal layer 114 is sandwiched between the polymer films 117 and 118. The electrooptic characteristics of the thus produced liquid crystal display element 111 are shown in Table 9 below. In the column of the inversion in a half tone of Table 9, a mark ○ indicates a state where the inversion does not occur, a mark X indicates a state where the inversion can easily be observed, and a mark Δ indicates a state where the inversion is hardly observed.

COMPARATIVE EXAMPLE 6

A mixture was injected into the cell used in Example 19, injected was the mixture contained 0.15 g of a photocurable resin (R-684 (a product of NIPPON KAYAKU CO., LTD-.):styrene: isobornyl methacrylate=10:5:85), 0.85 g of a liquid crystal material, ZLI-4792 (a product of Merck & Co., Inc. containing 0.4 wt % of S-811), and 0.0025 g of a photo initiator, Irugacure 651 were mixed. In the same manner as Example 19, thereafter, a liquid crystal display element in which the liquid crystal layer 114 is sandwiched between the polymer films 117 and 118 was produced. Its characteristics are shown in Table 9 below.

COMPARATIVE EXAMPLE 7

In the above-mentioned cell, a mixture in which 0.001 g of a photocurable resin, 1.2 g of a liquid crystal material, and 0.0025 g of a photo-initiator, Irugacure 651 were mixed and used, thereby producing a liquid crystal display element.

In Table 9 below, the hysteresis is defined by the difference between the driving voltages at the rising and falling processes by which a transmittance change of 50% is attained in a driving voltage-transmittance curve of the liquid crystal layer 114, and the light transmittance was measured while setting as the value obtained when the polarization axes of the two polarizing plates are arranged in parallel with each other.

TABLE 9

|  | Example 19 | Comparative example 6 | Comparative example 7 |
| --- | --- | --- | --- |
| Light transmittance in OFF-state (%) | 55 | 38 | 54 |

TABLE 9-continued

|  | Example 19 | Comparative example 6 | Comparative example 7 |
| --- | --- | --- | --- |
| Hysteresis (ΔV) | 0.03 | 0.15 | 0.03 |
| Inversion in half-tone display | ○ | ○ | Δ |

Figure 22:
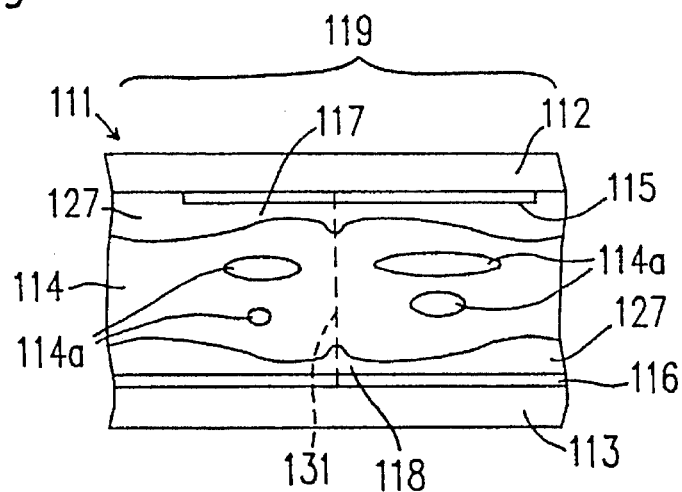
FIGS. 22(a) to 22(c) are section views illustrating the operation of the liquid crystal display element of Example 19.
Figure 22:
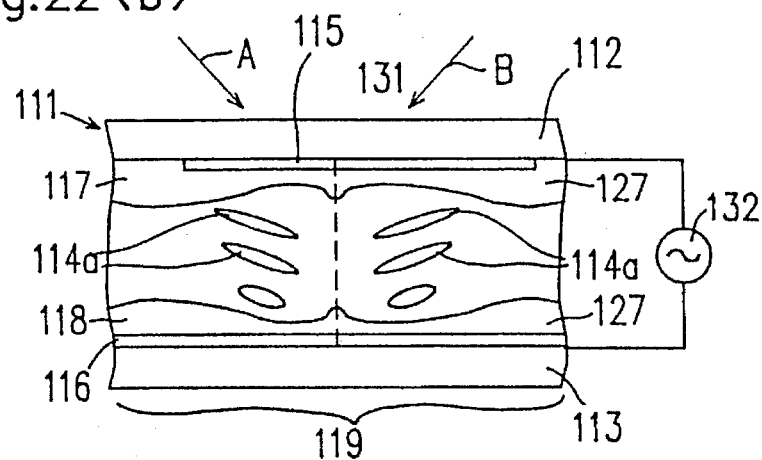
Figure 22:
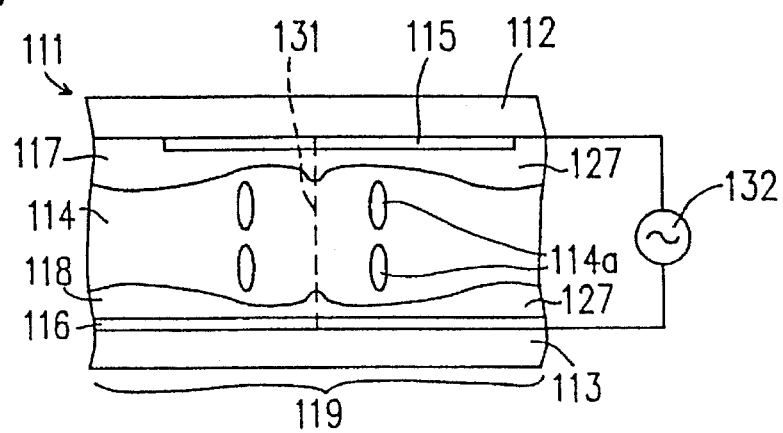

FIGS. 22(a) to 22(c) are section views of the liquid crystal display element 111 of the example. In the TN type liquid crystal display element 111, for example, liquid crystal molecules 114a of the liquid crystal layer 114 are aligned in each pixel 119 in a radial or random manner as described above. When the driving voltage from a power source 132 is applied, therefore, the liquid crystal molecules 114a are raised along the ridge 127 while maintaining the alignment state as shown in FIG. 22(c). The liquid crystal molecules 114a are to be raised when a half-tone image is displayed. Accordingly, the liquid crystal molecules 114a are tilted with respect to the center portion of the pixel 119 in a radial or random manner as shown in FIG. 22(b). The liquid crystal molecules 114a are observed in the directions indicated by arrows A and B which are separated from each other by a relatively wide angle as shown in the figure, therefore, the apparent refractive indices are equalized. This causes the contrasts of the images as viewed from the directions A and B to be equalized, whereby abnormal display such as the inversion of an image can be prevented from occurring. As a result, the viewing angle characteristic of the liquid crystal display element 111 is remarkably improved.

As described above, in the example, a mixture of a liquid crystal material, a photocurable resin, and a photo-initiator, which was injected between the paired display substrates 120 and 121 of the liquid crystal display element 111, was subjected to light irradiation having weak irradiation regions each of which has an area substantially corresponding to the respective pixel 119 of the liquid crystal display element 111, thereby curing the photocurable resin. In the example, the added amount of the photocurable resin in the mixture is set to be smaller than that in the conventional PDLC. This allows the liquid crystal display element 111 to be produced with forming substantially no polymer wall between the upper and lower display substrates 120 and 121 of the liquid crystal display cell, during the photo-curing process.

In the mixture between the paired display substrates 120 and 121, the photocurable resin in the irradiation regions undergoes the polymerization reaction, whereby the concentration of the unreacted resin in the mixture in the irradiation regions is lowered. The mass transfer is conducted in accordance with the concentration gradient in the mixture. During the transfer of the mixture, the polymerization reaction is caused to partly occur by scattered light and reflected light. While the mass transfer is conducted from the center of each pixel 119 toward the irradiation region in the periphery portion of the pixel 119, therefore, the polymer films 117 and 118 are formed on the paired display substrates 120 and 121, respectively.

In the liquid crystal layer 114 of each pixel 119 of the liquid crystal display element 111 of the example, the liquid crystal molecules 114a are aligned in a random or radial manner. Unlike a conventional TN type liquid crystal cell, accordingly, the liquid crystal molecules are prevented from being aligned in one direction when a voltage is applied. When a halftone image is displayed, particularly, the apparent refractive indices are substantially equalized in all viewing directions of the liquid crystal display element of the invention, and therefore the viewing angle characteristic of the liquid crystal is extremely improved.

In the liquid crystal display element 111 of the example, since a polymer wall extending between the paired display substrates 120 and 121 is not formed, the interaction of the liquid crystal molecules 114a and the polymer material can be decreased in level. This can enhance the response speed of the liquid crystal molecules 114a and reduce the hysteresis in the optoelectric characteristic.

In this way, according to the liquid crystal display element 111 of the example, the brightness of an image can be improved, and the display quality is remarkably improved. Moreover, the manufacturing method can be simplified.

Utilizing the wide viewing angle, the liquid crystal display element of the invention can be used specifically in a flat display device, for example, a personal computer, a word processor, an amusement device, or a television receiver. Utilizing the shutter effect, the present liquid crystal display element can be used in various display boards, a window, a wall, etc. Since liquid crystal microcells surrounded by many polymer walls exist in a cell, the liquid crystal display element of the example has a feature that it can endure a large external force. Therefore, the element can be used as a liquid crystal display element for a pen input device.

EXAMPLE 20

The inventors found that, when an alignment film is formed between a substrate and a liquid crystal layer in a liquid crystal display element having a liquid crystal region surrounded by polymer walls, a plurality of liquid crystal domains in a liquid crystal region can be arranged radially or in a grid form, a polymer film can be prevented from entering the liquid crystal domains, the light transmittance in the off-period of a driving voltage can be improved, and disclination lines can be arranged in directions in which the lines are invisible when the driving voltage is applied.

The alignment film such as described in the examples hitherto can function as domain control means which can determine an arrangement of the domains. In examples described below, the liquid crystal layer has a plurality of liquid crystal domains, and the alignment film determines the directions of disclination lines generated at the boundary of the liquid crystal domains and also the alignment of the liquid crystal.

Figure 23:
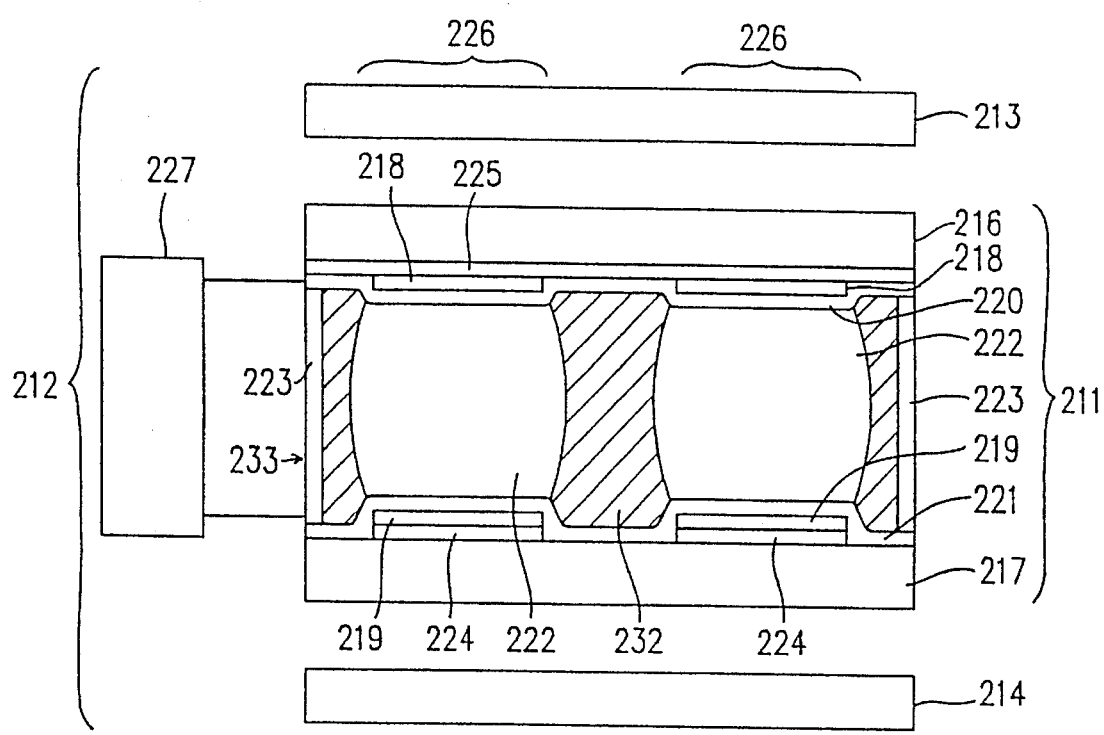
FIGS. 23 is a section view of a liquid crystal display element of Example 20.

FIG. 23 is a section view of a liquid crystal display element 211 of an example of the invention. The liquid crystal display element 211 has a configuration in which a plurality of pixels for display are arranged in a matrix form and a display medium layer 233 is sandwiched between a pair of glass substrates 216 and 217. On the one glass substrate 217, pixel electrodes 224 are formed in a matrix form or at positions respectively corresponding to pixels of the liquid crystal display element 211. On the plural pixel electrodes 224, projections 219 which function as the domain control means are formed into a matrix form. On the other glass substrate 216, for example, a plurality of stripe-like common electrodes 225 are formed. On each common electrode 225, a plurality of projections 218 similar in shape to the projections 219 are formed at positions similar to those of the projections 219.

Alignment films 220 and 221 are formed on the glass substrates 216 and 217 so as to cover the pixel electrodes 224 and the common electrodes 225, respectively. In a modification of the example, the alignment films 220 and 221 need not be formed. A sealing agent 223 is disposed in the periphery portions of the glass substrates 216 and 217 to perform the seal. Polarizing plates 213 and 214 are attached to the outer faces of the glass substrates 216 and 217, respectively. For each of the pixels 226, the display medium layer 233 has a liquid crystal region 222 surrounded by polymer walls 232. Each pixel 226 is structured by one of the pixel electrodes 224, the common electrode 225, and the liquid crystal region 222 between the pixel electrode 224 and the common electrode 225. The polarizing plates 213 and 214 are attached to constitute the liquid crystal display element 211. A driving circuit 227 is connected to the pixel electrodes 219 and the common electrodes 218 of the liquid crystal display element 211, thereby constituting a liquid crystal display device 212. A driving voltage is supplied from the driving circuit 227 to the electrodes 224 and 225 so that a display is conducted in the unit of each pixel 226.

Hereinafter, a method of manufacturing the liquid crystal display element 211 of the example will be described.

Figure 24:
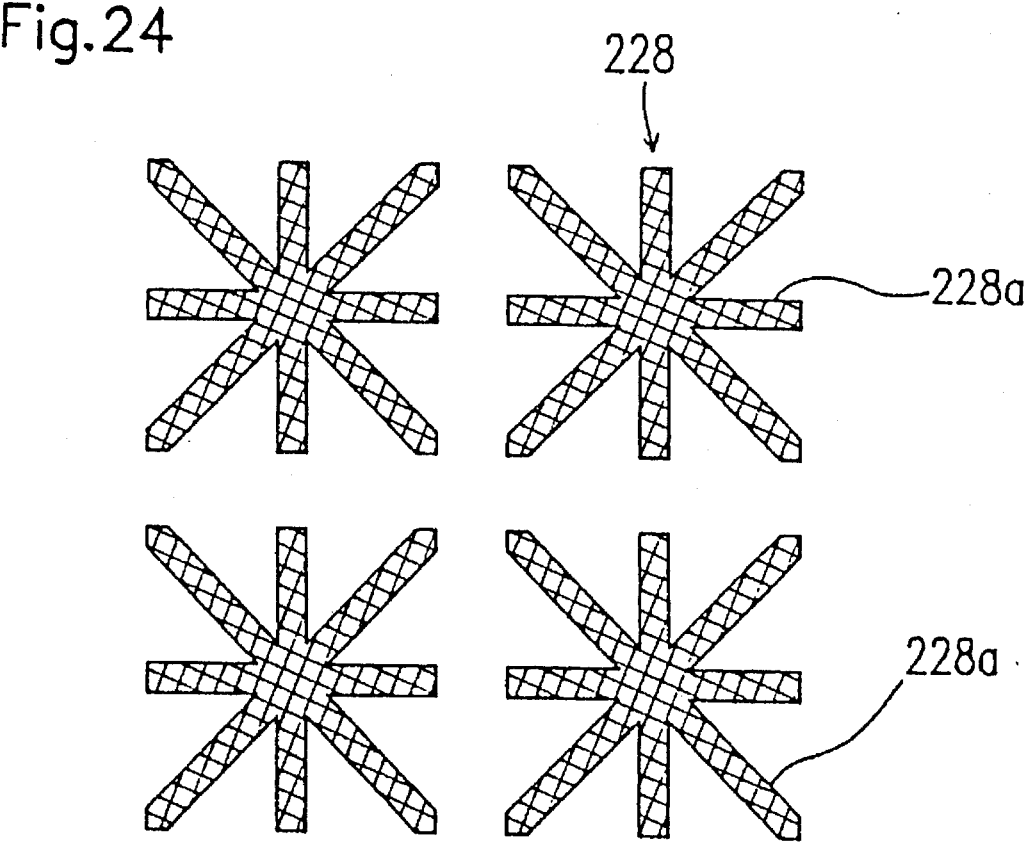
FIG. 24 is a plan view of a photomask for forming projections on a glass substrate.
Figure 25:
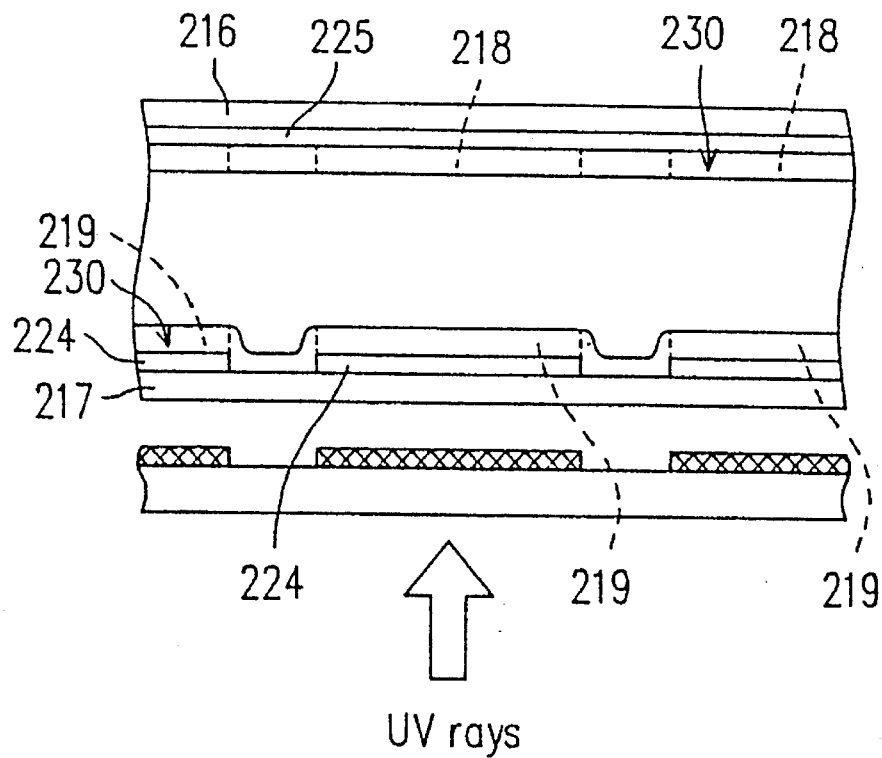
FIG. 25 is a section view illustrating the process of manufacturing the element of Example 20.
Figure 26:
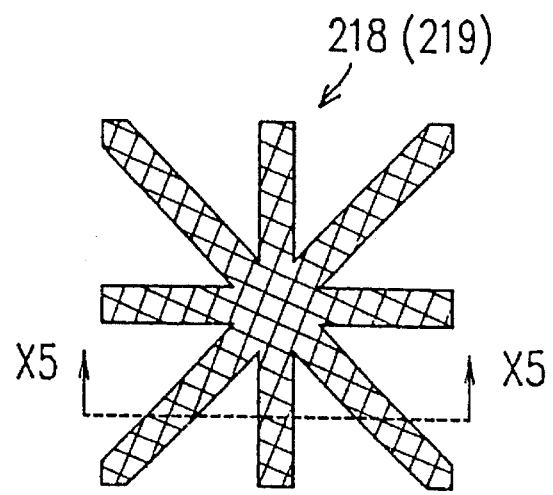
FIG. 26 is a plan view of projections in Example 20.
Figure 27:
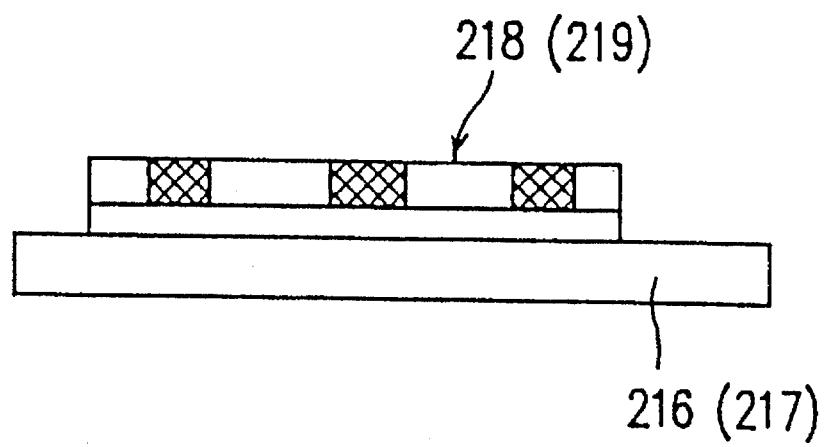
FIG. 27 is a section view as viewed from a section line X5–X5 in FIG. 26.
Figure 28:
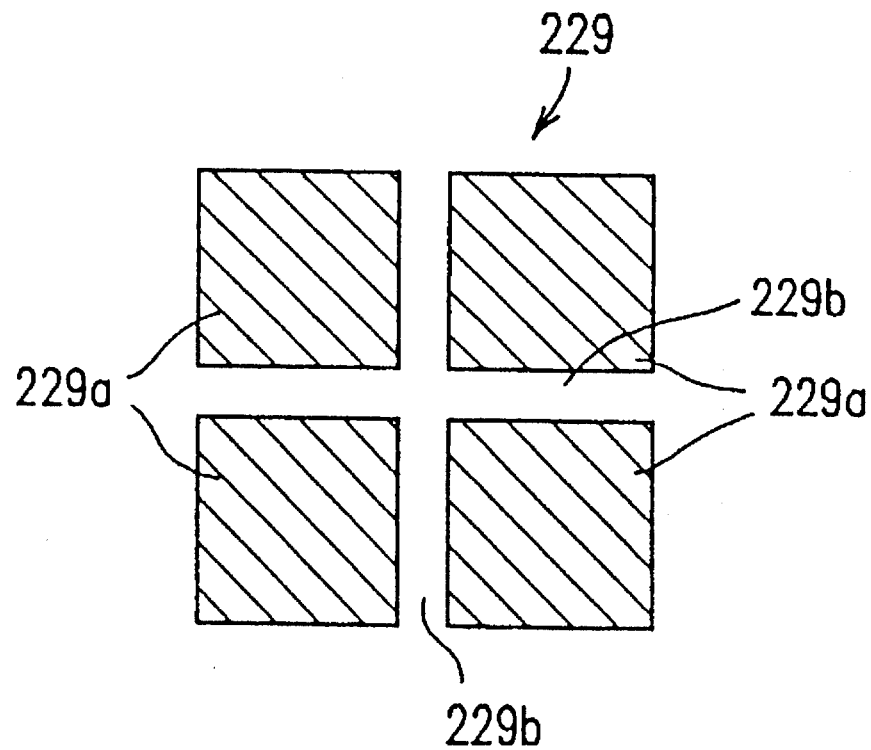
FIG. 28 is a plan view of a photomask for forming a liquid crystal region.

FIG. 24 is a plan view of a photomask 228 used in the manufacturing of the liquid crystal display element 211 of the example, FIG. 25 is a section view illustrating the method of manufacturing the example, FIG. 26 is a plan view of the projections 218 and 219, FIG. 27 is a section view as viewed from a section line X5—X5 in FIG. 26, and FIG. 28 is a plan view of another photomask 229 used in the example.

On glass substrates (thickness: 1.1 mm), an ITO film (a mixture of indium oxide and tin oxide, film thickness: 50 nm) was formed and patterned to form the pixel electrode 224 and the common electrode 225 as transparent electrodes. A photoresist was applied onto the paired glass substrates 216 and 217 respectively having the electrodes 224 and 225, by the spin coating method into a film thickness of, for example, 1 μm, whereby a photoresist film 230 was formed as shown in FIG. 25.

Thereafter, using the photomask 228 having a shape in which, for example, light-shield portions 228a radially extend in 8 directions, the photoresist film 230 was subjected to the exposure, development, and curing processes, whereby the projections 218 and 219 having the shapes shown in FIGS. 26 and 27 were formed on the substrates 216 and 217, respectively. Thereafter, spacers having, for example, a diameter of 6 μm and a spherical, cylindrical or fibrous shape were sprayed on the glass substrates 216 and 217. The sealing agent 223 was then applied to the periphery portions of the paired glass substrates 216 and 217 on which the projections 218 and 219 were respectively formed. Then, the paired glass substrates 216 and 217 were stuck to each other so that a display cell was constituted while equalizing its thicknesses which is the distance between the alignment films 220 and 221 on the glass substrates 216 and 217.

A photomask 229 is attached onto the obtained display cell. As shown in FIG. 28, the photomask 229 has light-shield regions 229a for each pixel 226 of the liquid crystal display element 211, and a transparent region 229b in a portion corresponding to the area between the pixels 226. The pitch of the light-shield regions 229a is equal to the arrangement pitch of the pixels 226 of the liquid crystal display element 211. In this case, the photomask 229 is positioned so that the center of the light-shield region 229a for each pixel 226 substantially coincides with the centers of the projections 218 and 219 shown in FIG. 25, and then attached to the cell.

In the display cell, a liquid crystal mixture was disposed in which 0.1 g of R-684 (a product of NIPPON KAYAKU CO., LTD.), 0.05 g of styrene, 0.85 g of isobornyl methacrylate, 4 g of a liquid crystal material, ZLI-4792 (a product of Merck & Co., Inc. containing 0.4 wt % of S-811), and 0.0025 g of a photo-initiator, Irugacure 651 are mixed. The mixture in a transparent state (35° C.) was injected between the paired glass substrates 216 and 217. While maintaining the display cell at the same temperature, then, a cycle (ultraviolet rays are irradiated for 1 second and irradiation is halted for 30 seconds) was conducted 20 times. The light intensity at a position of the cell was 10 mW/cm$^2$. A high pressure mercury lamp was used as a light source for producing parallel rays and irradiation was performed from the side of the dot pattern of the photomask 229.

Thereafter, ultraviolet rays were irradiated for 10 minutes, and ultraviolet rays were further irradiated for 10 minutes after removing the photomask 229, thereby curing the photocurable resin material in the mixture. The produced liquid crystal display element 211 was observed under a polarizing microscope. As a result, it was observed that the liquid crystal display element has a regularity which is the same as the regularity of the dot pattern of the photomask 229, i.e., the regularity of the pixels 226, and the disclination lines are formed in the liquid crystal domain for each pixel 226 at portions corresponding to the projections 218 and 219 formed on the glass substrates 216 and 217. In this way, the liquid crystal display element 211 of the example was manufactured.

Figure 29:
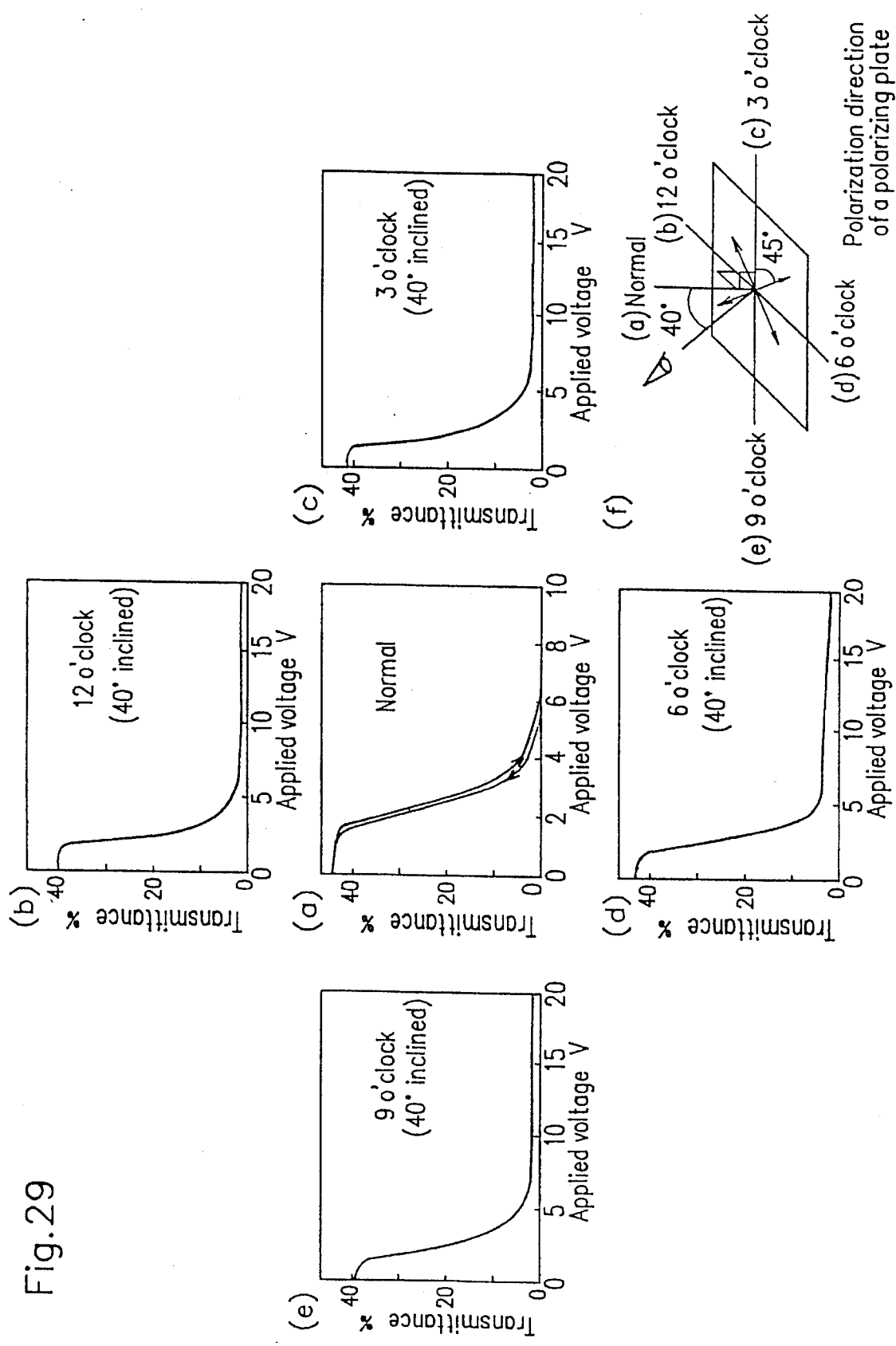
FIGS. 29(a) to 29(e) are graphs showing the viewing angle characteristics of the liquid crystal display element of Example 20 and FIG. 29(f) is a perspective view illustrating the measuring configuration.

As shown in FIG. 23, the two polarizing plates 213 and 214 which have polarizing axes crossing each other perpendicularly are respectively stuck to both sides of the thus produced liquid crystal display element 211, thereby producing the liquid crystal display element 211 in which the liquid crystal region 222 for each pixel 226 is surrounded by the polymer walls 232. Among results obtained in measurements of the electrooptic characteristics of the thus produced liquid crystal display element 211, the light transmittance in the voltage-off period, and the existence of the inversion in a half-tone display are shown in Table 10 below, and the viewing angle characteristic is shown in FIG. 29. FIGS. 29(a), (b), (c), (d), and (e) are graphs showing relationships between the applied voltage and the light transmittance obtained when the liquid crystal display element 211 was viewed from the directions of the normal line, 12 o'clock, 3 o'clock, 6 o'clock, and 9 o'clock. FIG. 29(f) is a perspective view illustrating the measuring configuration of the light transmittance.

Figure 30:
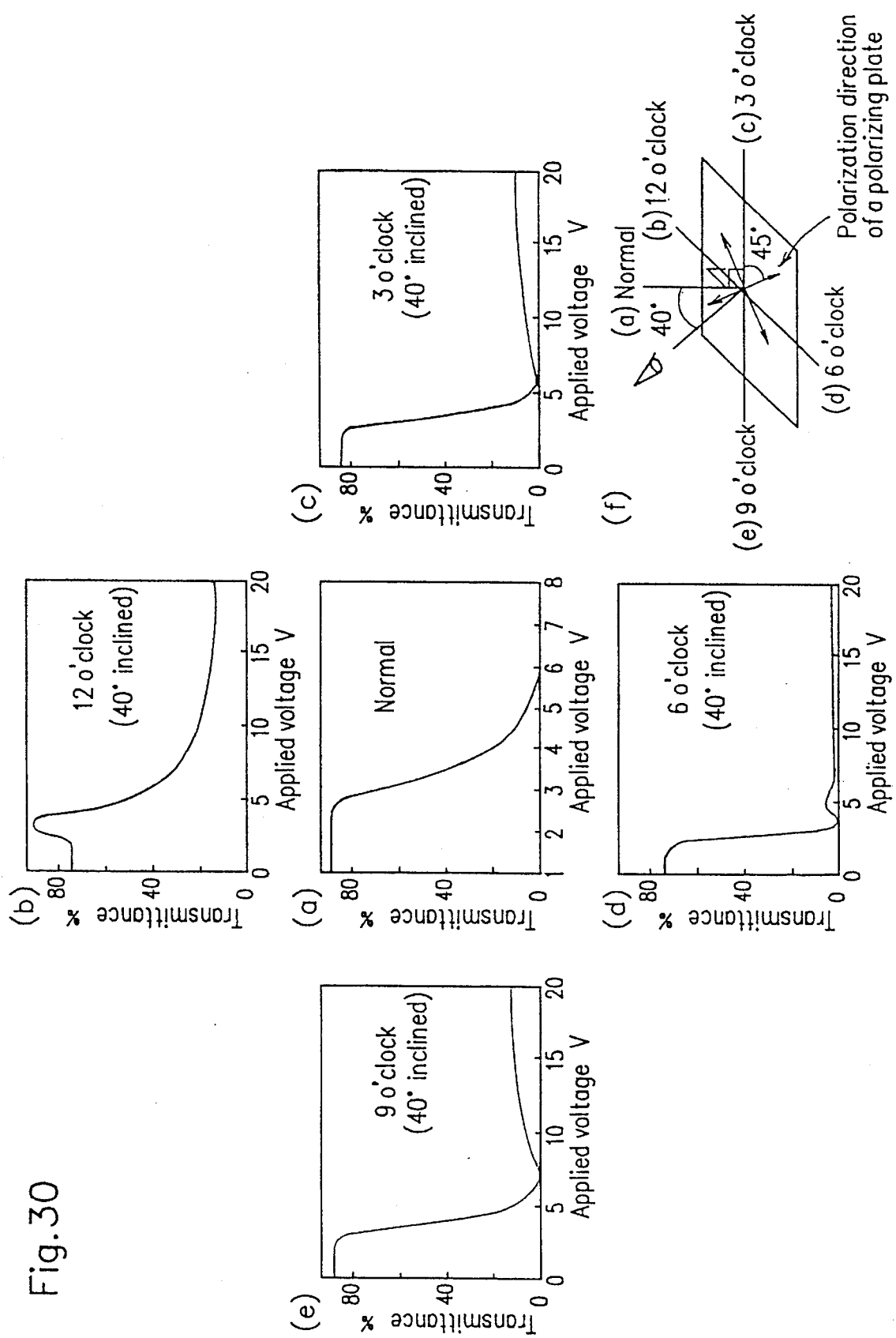
FIGS. 30(a) to 30(e) are graphs showing the viewing angle characteristics of a liquid crystal display element of Comparative Example 8 and FIG. 30(f) is a perspective view illustrating the measuring configuration.

In the column of the inversion in a half tone display of Table 10, the mark ○ indicates a state where the inversion does not occur, the mark X indicates a state where the inversion can easily be observed, and the mark Δ indicates a state where the inversion is hardly observed.

relationships between the applied voltage and the light transmittance obtained when the liquid crystal display element 211 was viewed from the directions of the normal line, 12 o'clock, 3 o'clock, 6 o'clock, and 9 o'clock. FIG. 30(f) is a perspective view illustrating the measuring configuration of the light transmittance. From Table 10, it will be seen that, in the liquid crystal display element 211 of the example, the inversion of the display which is seen in a conventional TN type liquid crystal display element (Comparative Example 8 in Table 10) having the viewing angle characteristic shown in FIG. 30 does not occur, and the increase of the transmittance at a high viewing angle at the voltage saturation is not observed.

Hereinafter, the invention specified as Example 20 will be described. According to the invention, in a liquid crystal display element having a liquid crystal region surrounded by polymer walls, an alignment film functioning as a domain control means is formed between a substrate and a display medium layer, whereby a plurality of liquid crystal domains can be arranged radially or in a grid form in the liquid crystal region, a polymer film can be prevented from entering the liquid crystal domains, the light transmittance in the off-period of a driving voltage can be improved, and disclination lines can be arranged in directions in which the lines are hardly visible when the driving voltage is applied.

Method of Controlling the Directions and Positions of Disclination Lines (1) The first method is the following manufacturing method. As shown in FIG. 26, when a display cell is to be produced, an alignment film is formed on at least one of a pair of substrates so as to, for example, have rugged portions arranged radially about the center of a pixel. Thereafter, the pair of substrates are combined to constitute the display cell. Then, a mixture containing a liquid crystal, a photocurable resin, a photo-initiator, etc. is injected into the display cell, a photomask is attached to the display cell, and the mixture is exposed to light through the photomask. At this time, when the portion of the rugged portion for each pixel and corresponding to the center portion of the respective pixel is positioned so as to coincide with the center portion of the portion of the photomask and for each pixel, the polymerization occurs in a portion other than the light-shield portion of the photomask in the light irradiation period of the exposure process, so that the photopolymerizable resin is consumed to produce a concentration gradient of the photopolymerizable resin. This causes the polymerization to proceed while the photocurable resin moves in the mixture from the portion corresponding to the center portion of the photomask to the portion corresponding to the edge portion

TABLE 10

|  | Example 20 | Example 21 | Example 22 | Comparative example 8 | Comparative example 9 |
| --- | --- | --- | --- | --- | --- |
| Light transmittance in OFF-state (%) | 52 | 37 | 40 | 87 | 20 |
| Inversion in half-tone display | ○ | ○ | ○ | X | Δ |

FIG. 30 is a graph showing the viewing angle characteristic of a conventional TN type liquid crystal display element. FIGS. 30(a), (b), (c), (d), and (e) are graphs showing of the photomask. Even when the used substrates are flat in the region extending from the center portion of each pixel portion of the photomask to the edge portion, a polymer film having ruggedness can be formed also on the substrates.

According to the invention, in order to artificially control the shape and position of the polymer films having ruggedness, rugged portions are produced in a radial, grid or honeycomb form on a substrate before the formation of the polymer films. In this configuration, disclination lines are selectively formed for each pixel in accordance with the shape, etc. of the ruggedness of the rugged portions. When this selective formation is utilized, it is possible to artificially arrange liquid crystal domains in at least one of a radial form and a grid form.

Figure 40:
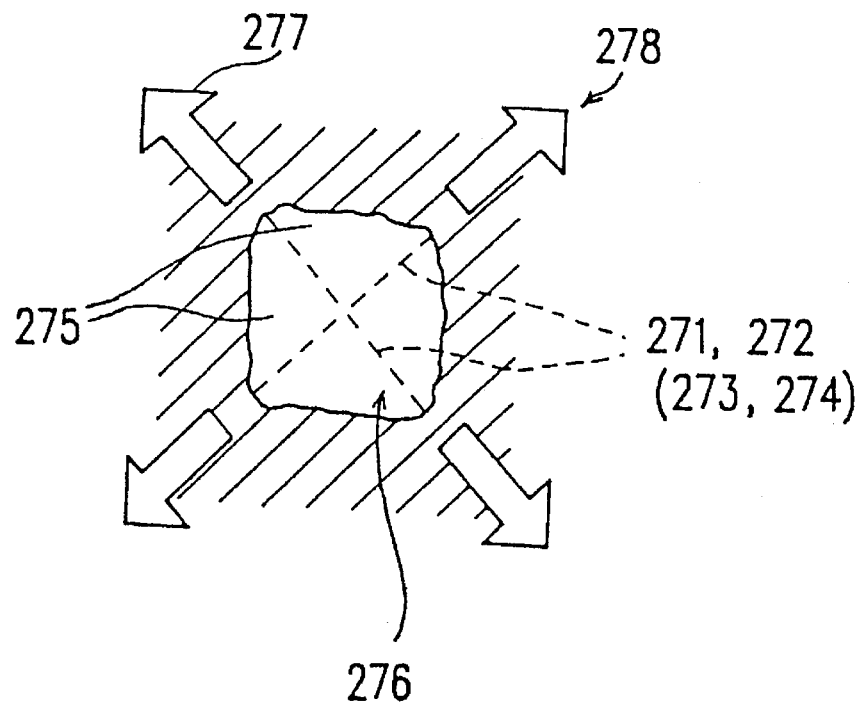
FIG. 40 is a view showing the relationship between the projections and the polarization axis in Example 23.
Figure 41:
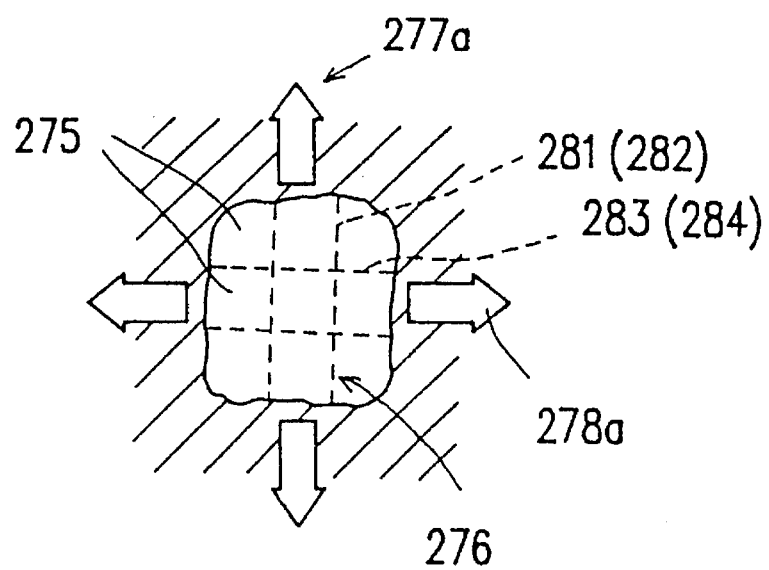
FIG. 41 is a view showing the relationship between projections and the polarization axis in Example 24.

With respect to the shape and alignment method of liquid crystal domains, there are two cases as shown in FIGS. 40 and 41. In the case of FIG. 40, liquid crystal domains are radially arranged, and a part of the disclination lines between the liquid crystal domains are directed so as to be parallel to the direction of the polarization axis. In the case of FIG. 41, there are plural liquid crystal domains having a concentric alignment of liquid crystal molecules, and disclination lines between the liquid crystal domains are substantially directed in the polarization axis direction of the polarizing plate. In both the cases, since liquid crystal molecules are substantially omnidirectionally aligned, the viewing angle characteristic of a liquid crystal display element is improved. Moreover, the disclination lines disappear during the application of a voltage so that the black level is improved.

Figure 33:
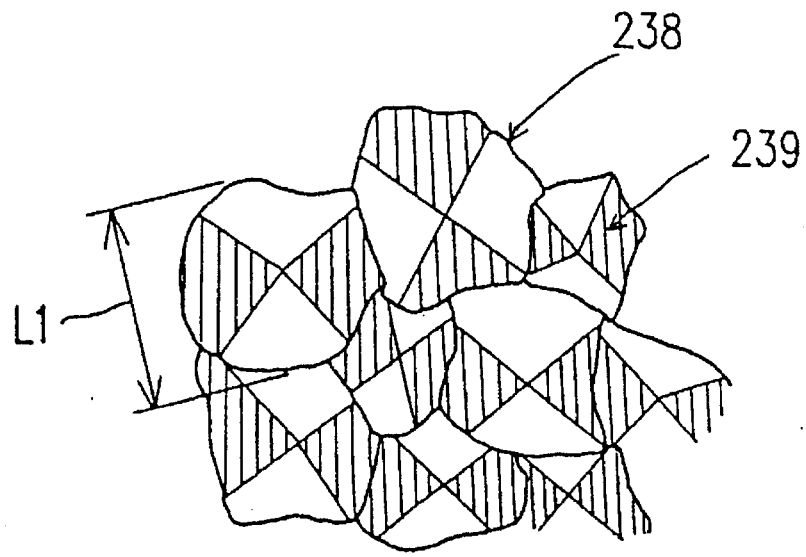
FIG. 33 is a plan view of planar spherulites used in Example 22.

(2) In the second method, as shown in FIG. 33, a thin film having polycrystals is formed on the surface of a substrate as the domain control means, and liquid crystal domains are arranged using such a substrate into a radial or grid form. In the method, a polymer film having ruggedness formed during the polymerization is formed along the alignment state of the polycrystals on the substrate. In a liquid crystal, the surface tension in a direction parallel to the crystal alignment direction is different from that in a direction other than the crystal alignment direction. Therefore, disclination lines are formed along the alignment state of the polycrystals so that the liquid crystal domains also are radially formed.

Method of Making Disclination Lines Hardly Visible (1) Among the alignment states where liquid crystal domains are omnidirectionally aligned, an alignment state where liquid crystal domains are radially aligned for each pixel shows the smallest alignment variation of liquid crystal domains. This enables disclination lines formed between the liquid crystal domains, to disappear at a low voltage, whereby the black level during the application of a voltage is improved and the contrast is improved.

(2) Disclination lines can be made hardly visible by making the directions of the lines substantially coincident with the polarization axis of the polarizing plate. In this case, with respect to the center portion of each pixel, disclination lines may be positioned in the range of ±30° from the polarization axis of the polarizing plate. This enables disclination lines formed along the ruggedness, to be formed within the range of ±30° from the polarization axis of the polarizing plate in the same manner as the ruggedness, so that the disclination lines substantially disappear when a voltage is applied, thereby improving the black level. Also, this can improve the contrast of a display image.

When disclination lines are deviated in direction from the polarization axis by 30° or more, the disclination lines are visible also during the application of a voltage. The deviation may be within ±10°. The maximum value of the deviation is 60°. When the deviation reaches 60°, the direction of disclination lines enter the above-mentioned range ±30° with respect to the direction of the polarization axis of the other polarizing plate.

COMPARATIVE EXAMPLE 8

On a plurality of glass substrates having pixel electrodes 224, common electrodes 225, and projections 218 and 219 in the same manner as Example 20, the alignment films 220 and 221 which were the same as those of Example 20 were formed. Thereafter, a rubbing process using a nylon cloth was conducted. In the same manner as Example 20, a pair of glass substrates were stuck to each other in such a manner that the alignment directions of the alignment films 220 and 221 were perpendicular to each other, thereby constituting a display cell. Into the produced display cell, in the same manner as Example 20, a liquid crystal material, ZLI-4792 (containing 0.4 wt % of S-811) was injected to produce a liquid crystal display cell. Polarizing plates were stuck to the produced liquid crystal display cell in such a manner that the two polarizing plates were respectively stuck to both sides of the liquid crystal display cell under a state where their polarization axes were perpendicular to each other, thereby constituting a conventional TN type liquid crystal display element.

Regarding electrooptic characteristics of the thus produced liquid crystal display element, the light transmittance in the voltage-off period, and the existence of the inversion in a half-tone display are shown in Table 10 above, and the above-described viewing angle characteristic is shown in FIG. 30.

In the liquid crystal layer 233 of the liquid crystal display element 211 of the example, liquid crystal molecules are aligned in a random or radial manner. Unlike a conventional TN type liquid crystal cell, accordingly, the liquid crystal molecules are prevented from being aligned in one direction when a voltage is applied. When a half-tone image is displayed, particularly, the apparent refractive indices are substantially equalized in all viewing directions of the liquid crystal display element of the invention, and, therefore, the viewing angle characteristic of the liquid crystal cell is extremely improved. In the same way, according to the liquid crystal display element 211 of the example, the brightness of an image can be improved, and the display quality is remarkably improved. Moreover, the manufacturing method can be simplified.

Figure 35:
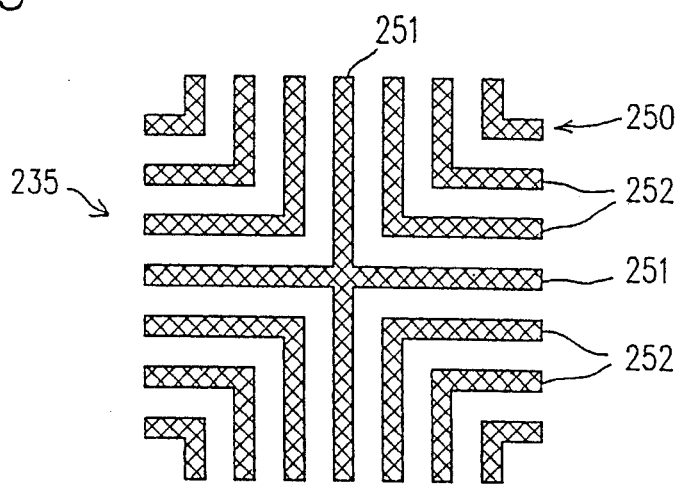
FIG. 35 is a plan view of projections used in a modification of Example 20.

FIG. 35 is a plan view of a pixel-corresponding portion 235 of a covering film made of a polymer material in a modification of Example 20. In the modification, the pixel-corresponding portion 235 which is formed for each pixel 226 may have a configuration in which a projection 250 having a shape shown in FIG. 35 is formed. The projection 250 of the pixel-corresponding portion 235 of the modification includes a cross portion 251 having a cross shape, and a plurality of L-like bent portions 252 which are formed in each of four sections defined by the cross portion 251.

Also the projection 250 having such a configuration can attain the same effects as those described in the foregoing examples.

Figure 36:
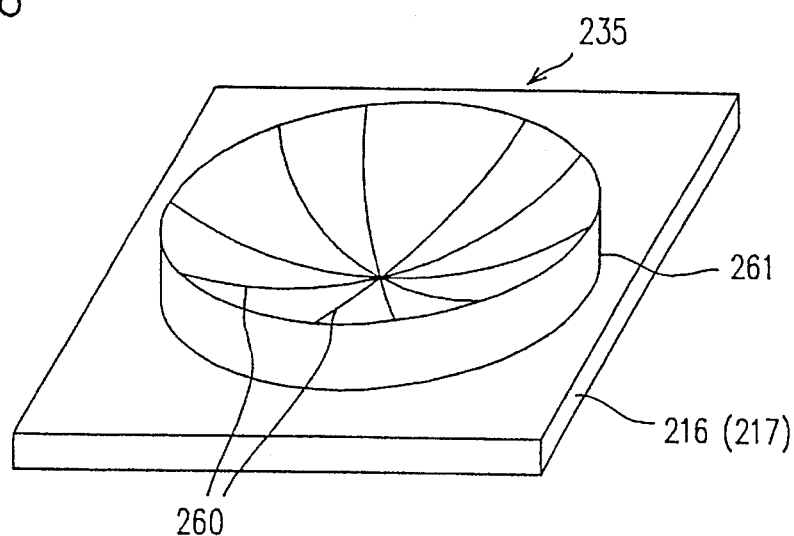
FIG. 36 is a perspective view of projections used in another modification of Example 20.
Figure 37:
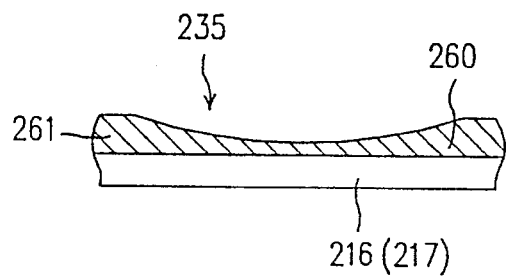
FIG. 37 is a section view of the projections of another modification of Example 20.
Figure 38:
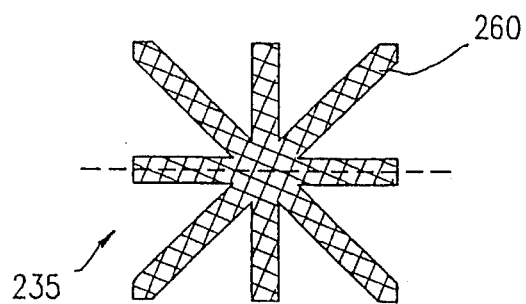
FIG. 38 is a plan view of the projections of the other modification of Example 20.

FIG. 36 is a plan view of a pixel-corresponding portion 235 of a covering film in another modification of Example 20, FIG. 37 is a section view of the pixel-corresponding portion 235, and FIG. 38 is a plan view of the pixel-corresponding portion 235. In the modification, the pixel-corresponding portion 235 which is made of the above-mentioned polymer material and formed for each pixel 226 may have a conical configuration shown in FIGS. 36 to 38. In the pixel-corresponding portion 235 of the modification, the film thickness of the peripheral portion 261 is greater than that of the center portion. In the pixel-corresponding portion 235, a plurality of projections 260 each having a plan view which is similar to the projections 218 and 219 of Example 20 and shown in FIG. 26, and a conical section shape are radially formed with the center portion of the pixel-corresponding portion 235 as the center.

Also the projection 260 having such a configuration can attain the same effects as those described in the foregoing examples.

The heights of the projections 218, 219 and 260 are preferably set so that, even when added with the height of the ruggedness of the glass substrates 216 and 217, they are smaller than the cell thickness which is the distance between the alignment films 220 and 221 on the glass substrates 216 and 217. When the heights of the projections 218, 219 and 260 are equal to or greater than the cell thickness, the projections 218, 219 and 260 form walls or columns between the glass substrates 216 and 217. This produces a state which is identical with that wherein the polymer material enters the pixels 226, so that the light transmittance in the voltage-off period is lowered. More preferably, the heights are 30% or less of the cell thickness. The heights of the projections 218, 219 and 260 are not required to be uniform. The configuration in which projections in one pixel are formed into a conical shape as described above is more preferable because liquid crystal molecules are radially aligned in one pixel with a pretilt angle, so that the viewing angle characteristic of the liquid crystal display element 211 is further improved.

EXAMPLE 21

Figure 31:
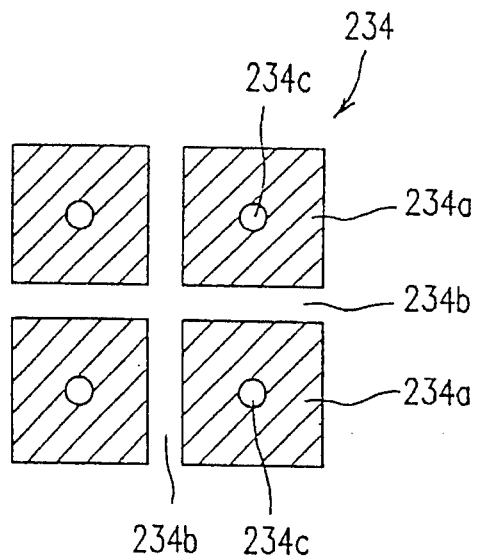
FIG. 31 is a plan view of a photomask used in Example 21.

Hereinafter, Example 21 of the invention will be described. The example is similar to Example 20 described above, and portions of the example which are similar or corresponding to those of Example 20 are indicated by the same reference numerals. In the example, two glass substrates 216 and 217 having pixel electrodes 224, and common electrodes 225 in the same manner as Example 20 were used. A display cell was produced by using the glass substrates 216 and 217 without forming the projections 218 and 219 which were formed in Example 20. The mixture which was the same as that used in Example 20 was injected into the produced display cell, and the mixture was irradiated with ultraviolet rays using a photomask 234 having a shape shown in FIG. 31 to conduct the exposure, development, and curing processes. The photomask 234 has a light-shield portion 234a for each pixel 226 of the liquid crystal display element 211 shown in FIG. 23, and a transparent portion 234b in a portion corresponding to the area between the pixels 226.

A transparent hole 234c having, for example, a circular shape is formed at the center portion of each light-shield portion 234a which is disposed for each pixel 226. The pitch of the light-shield portions 234a of the photomask 234 is equal to the arrangement pitch of the pixels 226 of the liquid crystal display element 211. The photomask 234 is positioned so that the light-shield portion 234a for each pixel 226 substantially coincides with the centers of the projections 218 and 219 shown in FIG. 25, and then attached.

The produced liquid crystal display element was observed under a polarizing microscope. In a region corresponding to the light-shield portion 234a of the photomask 234, a polymer island made of the polymer material is formed at the center portion of the region, and liquid crystal domains are radially arranged with the polymer island as the center. After the liquid crystal display element was split into the two glass substrates 216 and 217, the liquid crystal material was washed away by acetone, and the substrates were dried.

Figure 32A:
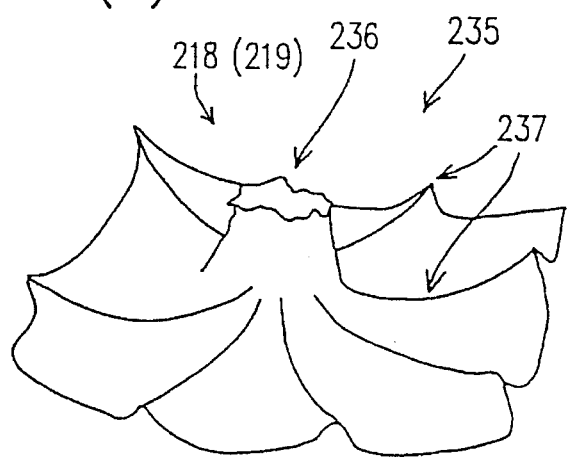
FIGS. 32(a) and 32(b) are a perspective view and a section view of projections in Example 21.
Figure 32B:
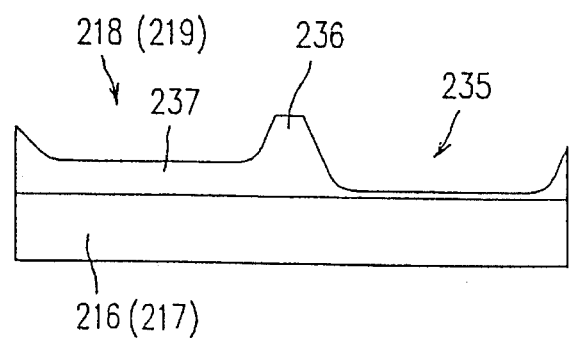

FIG. 32(*a*) is a perspective view of the pixel-corresponding portion of the covering film made of the polymer material, and FIG. 32(*b*) is a section view of the pixel-corresponding portion of the covering film. The covering film made of the polymer material on the glass substrates 216 and 217 which had been subjected the drying process was observed under a laser scanning microscope. As a result, it was observed that, in the pixel-corresponding portion 235 of the covering film made of the polymer material, a plurality of projections 237 extend in a radial manner with a polymer island 236 at the center portion as the center. Furthermore, it was confirmed that the pixel-corresponding portion 235 of the covering film has a so-called conical configuration in which the thickness is greater at the periphery portion and gradually decreases as moving toward the center portion.

The conical configuration may be realized in the following manner: The photocurable resin in the portion of the mixture which is irradiated with ultraviolet rays through the transparent portion 234b and transparent hole 234c of the photomask 234 is cured earlier or more rapidly than that in the other portion. This produces a concentration gradient in the mixture. The irradiated region in the mixture moves along the concentration gradient or along the radial directions from the center portion toward the peripheral portion. During the movement of the irradiated region, in a plurality of regions of the mixture which are shielded from ultraviolet rays by the light-shield portions 234a of the photomask 234, the polymerization is caused to occur in a part of the photocurable resin in the mixture by light leaking into the regions. Therefore, the pixel-corresponding portion 235 of the covering film made of the polymer material has the above-mentioned conical configuration.

Measurement results of the electrooptic characteristics of the liquid crystal display element of the example are listed in Table 10 above. From Table 10, it will be seen that, in the liquid crystal display element of the example, the inversion of a display which is seen in a conventional TN type liquid crystal display element (Comparative Example 8 in Table 10) having the viewing angle characteristic shown in FIG. 30 does not occur, and the increase of the transmittance in a high viewing angle at the voltage saturation is not observed. According to the example, moreover, a covering film having the above-mentioned configuration is automatically formed by irradiation of light, thereby attaining an effect that the industrial manufacturing process can be simplified.

EXAMPLE 22

Hereinafter, Example 22 of the invention will be described. The example is similar to the above-described example, and portions which are similar or corresponding to those of the above-described example are indicated by the same reference numerals. In the example, onto glass substrates 216 and 217 having electrodes 224 and 225 in the same manner as Example 20, an o-xylene solution containing 2 wt % of nylon 66 was applied by the spin coating method to form polymer thin films. The glass substrates on which the polymer thin films were formed were allowed to stand for 1 hour at 170° C., and then slowly cooled to the room temperature over 8 hours. The glass substrates on which the polymer thin films were formed were observed under a polarizing microscope with the result that plural planar spherulites 238 such as shown in FIG. 3 and having a diameter L1 (for example, 20 to 60 μm) were formed on the substrates. According to this observation, each of the planar spherulites 238 which function as the domain control means has a pair of extinction patterns 239 having a pair of sector regions which are opposite ones in the four sector regions. The sector regions are obtained by dividing into four substantially equal parts the respective planar spherulite 238 in the circumferential direction. Thereafter, as shown in FIG. 23, the alignment films 220 and 221 were formed on the glass substrates 216 and 217, respectively. A sealing agent was then applied to the periphery portions of the glass substrates 216 and 217, and the glass substrates 216 and 217 were combined with each other to constitute a display cell. The same mixture as that used in Example 20 was injected into the display cell.

Figure 34:
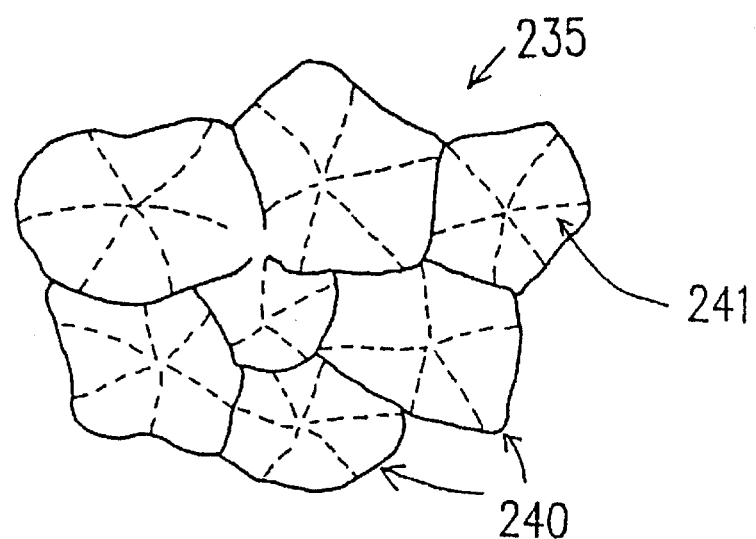
FIG. 34 is a plan view of projections used in Example 22.

The display cell into which the mixture was injected was subjected to irradiation of ultraviolet rays under the same conditions as those of Example 20, while being covered by the photomask 229 which was the same as that used in Example 20 and shown in FIG. 28. The produced liquid crystal display element was observed under a polarizing microscope. As a result, the element had a configuration wherein liquid crystal domains were radially arranged in the regions between the glass substrates 216 and 217 which respectively correspond to the light-shield regions 229a of the photomask 229. It seems that the radial structure of the liquid crystal domains was partly formed along the planar spherulites 238. The liquid crystal display element was split in liquid nitrogen into the two glass substrates 216 and 217, and the liquid crystal material was washed away by acetone. Thereafter, the polymer film on the glass substrates 216 and 217 which had been subjected the drying process was observed under a laser scanning microscope. As a result, a configuration was observed in which, as shown in FIG. 34, a unit region 240 is formed for each of the planar spherulites 238, and, in each unit region 240, a plurality of ridges 241 made of the polymer material are arranged along the respective planar spherulite 238 and partly in a radial form.

A pair of polarizing plates were respectively stuck to the both sides of the thus produced liquid crystal display element in such a manner that their polarization axes are perpendicular to each other, thereby producing the liquid crystal display element. The electrooptic characteristics of the produced liquid crystal display element are listed in Table 10 above.

The example described above can attain the same effect as those described in Example 20 above.

COMPARATIVE EXAMPLE 9

The display cell same as that of Example 20 was produced, and the mixture same as that used in Example 20 was injected into the display cell. After the process of injecting the mixture into the display cell, the display cell was irradiated with ultraviolet rays in the same manner as Example 20 except that the display cell was not covered by the photomask used in the above-described example. A pair of polarizing plates were stuck to the thus produced display cell so that a polymer dispersed liquid crystal display element was produced. The electrooptic characteristics of the produced polymer dispersed liquid crystal display element are listed in Table 10 above.

In the comparative example, particle-like liquid crystal regions were formed, and the display image as a whole was showed "unevenness".

EXAMPLES 23 AND 24

The outline structure of the liquid crystal display element according to Example 23 or 24 is similar to that of the liquid crystal display element 211 of Example 20 described using FIG. 23, and its section view is identical with that of FIG. 23. Accordingly, the components of the liquid crystal display elements of the examples which correspond to those of the liquid crystal display element 211 of Example 20 are indicated by the same reference numerals.

Hereinafter, the method of manufacturing the liquid crystal display elements of Examples 23 and 24 will be described.

Figure 39:
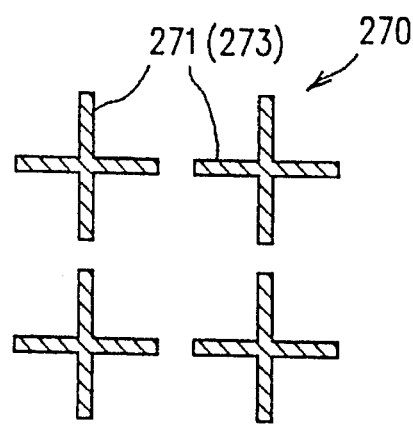
FIGS. 39(a) and 39(b) are plan views of projections used in Example 23.
Figure 39:
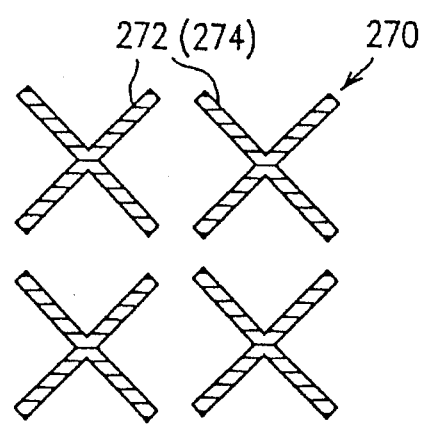

On glass substrates (thickness: 1.1 mm), an ITO film (a mixture of indium oxide and tin oxide, film thickness: 50 nm) was formed and patterned to form the plural pixel electrode 224 and common electrode 225 as transparent electrodes. A photoresist (ORD500, a product of TOKYO OHKA KOGYO CO., LTD.) was applied onto a pair of the glass substrates 216 and 217 respectively having the electrodes 224 and 225, by the spin coating method into a film thickness of 1 μm. Using a photomask 270 having a radial shape shown in FIG. 39 (Example 23), or a photomask 280 having a shape shown in FIG. 42 which has a grid-like light-shield portion consisting of plural row light-shield portions 281 and plural column light-shield portions 283 (Example 24), the exposure, development, and curing processes were conducted. FIG. 39(a) shows cross light-shield portions 271, and FIG. 39(b) shows X-like light-shield portions 272.

Of the paired glass substrates 216 and 217 which underwent the above-mentioned processes, spacers having, for example, a diameter of 6 μm and a spherical, cylindrical or fibrous shape were sprayed on the surfaces thereof. The sealing agent 223 was then applied to the periphery portions of the paired glass substrates 216 and 217 on which the projections 218 and 219 were respectively formed. Then, the paired glass substrates 216 and 217 were stuck to each other so that a display cell was constituted while equalizing its thicknesses which are the distances between the alignment films 220 and 221 on the glass substrates 216 and 217. The photomask 229 used in Example 20 and shown in FIG. 28 was placed on the produced display cell in such a manner that the center positions of the photomask respectively coincide with projections 273, 274, 282 and 284 corresponding to the light-shield portions 271, 272, 281 and 283 of the radial or grid-like photomasks 270 and 280.

In the display cell, 0.1 g of R-684 (a product of NIPPON KAYAKU CO., LTD.), 0.05 g of styrene, 0.85 g of isobornyl methacrylate, 4 g of a liquid crystal material, ZLI-4792 (a product of Merck & Co., Inc. containing 0.4 wt % of S-811), and 0.0025 g of a photo-initiator, Irugacure 651 were mixed. The mixture in a transparent state (35° C.) was injected into the display cell. While maintaining the display cell at the same temperature, then, a cycle (ultraviolet rays are irradiated for 1 second and irradiation is halted for 30 seconds) was conducted 20 times. The light intensity at a position of the cell was 10 mW/cm². A high pressure mercury lamp was used as a light source for producing parallel rays and the irradiation was performed from the side of the dot patterns of the photomasks 270 and 280. Thereafter, ultraviolet rays were irradiated for 10 minutes, and ultraviolet rays were further irradiated for 10 minutes after removing the photomask 229, thereby curing the photocurable resin material in the mixture to produce the liquid crystal display element.

FIG. 40 is a plan view of the liquid crystal display element of Example 23, and FIG. 41 is a plan view of the liquid crystal display element of Example 24. The liquid crystal display elements produced in Examples 23 and 24 were observed under a polarizing microscope. As a result, it was confirmed that liquid crystal domains 275 are formed at the regularity which is the same as the regularity of the light-shield portions 271, 272, 281 and 283 of the photomasks 270 and 280, i.e., the regularity of the pixels 226. Furthermore, it was observed that disclination lines 276 are formed at portions corresponding to the projections 273, 274, 282 and 284 formed on the glass substrates 216 and 217.

Figure 43:
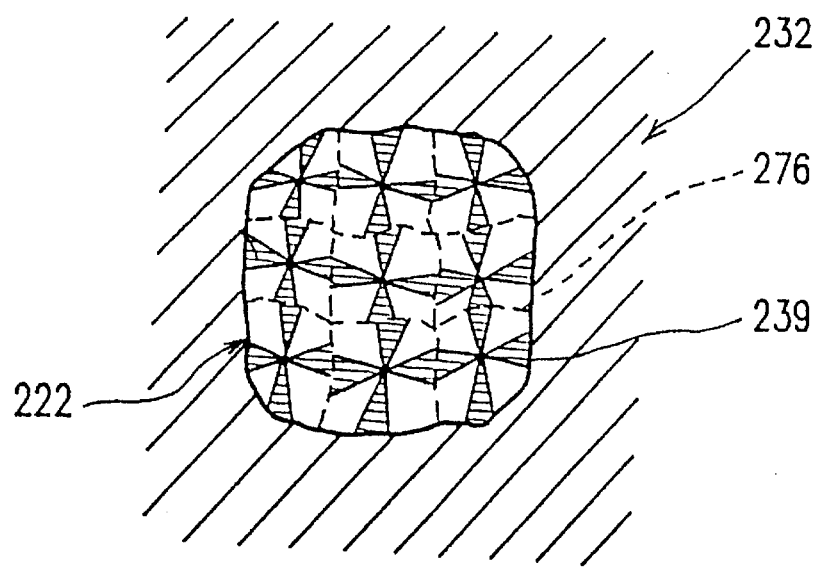
FIG. 43 is a plan view of a liquid crystal region in Example 24.

It was confirmed that, in Example 23, the liquid crystal domains 275 are arranged in a radial manner, and, in Example 24, the liquid crystal domains 275 are arranged in a grid-like or concentric manner. Moreover, in the liquid crystal domains 275, an alignment pattern shown in FIG. 43 was observed. From the alignment pattern, it is considered that liquid crystal molecules are aligned concentrically. FIG. 43 is a view schematically showing an image obtained when the liquid crystal display element of Example 24 was observed under a polarizing microscope.

Two polarizing plates which have polarizing axes crossing each other perpendicularly were respectively stuck to both sides of the liquid crystal display elements produced in Examples 23 and 24. Specifically, in Example 23, the paired polarizing plates respectively having the polarization axes 277 and 278 which cross perpendicularly with each other were stuck in such a manner that the directions along which the projections 273 and 274 extend coincide with the polarization axes 277 and 278 as shown in FIG. 40, and the liquid crystal display element in which the liquid crystal region 222 is surrounded by the polymer walls 232 as shown in FIG. 23 was produced. In Example 24, the paired polarizing plates respectively having the polarization axis 277a and 278a which cross perpendicularly to each other were stuck in such a manner that the directions along which the projections 282 and 284 extend coincide with the polarization axes 277a and 278a as shown in FIG. 41, and the liquid crystal display element in which the liquid crystal region 222 is surrounded by the polymer walls 232 as shown in FIG. 23 was produced.

Figure 44:
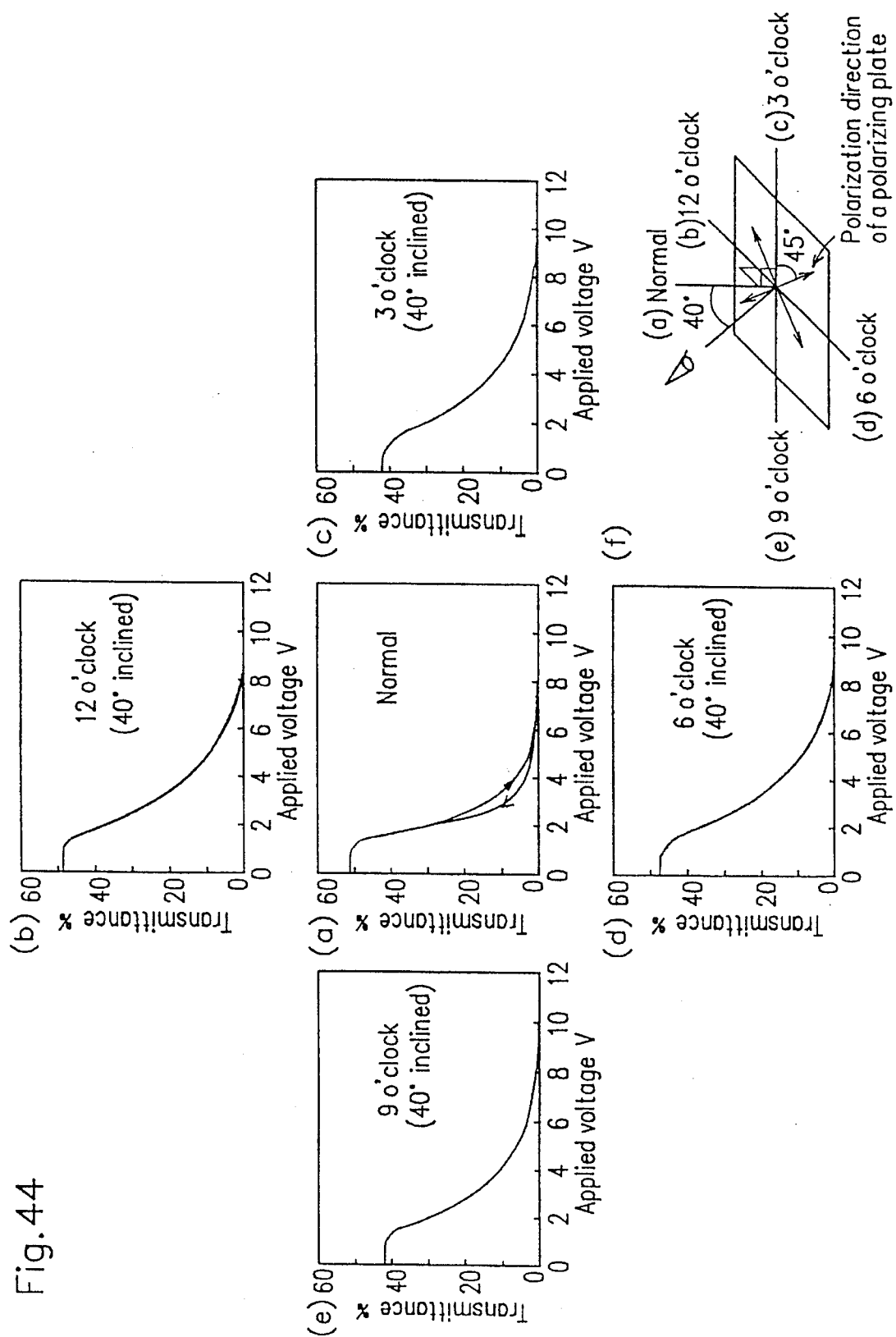
FIGS. 44(a) to 44(e) are graphs showing the viewing angle characteristic of a liquid crystal display element of Examples 23 and 24 and FIG. 44(f) is a perspective view illustrating the measuring configuration.

Among results obtained in measurements of the electrooptic characteristics of the produced liquid crystal display element, the light transmittance in the voltage-off period, and the existence of the inversion in a half-tone display are shown in Table 11 below, and the viewing angle characteristic is shown in FIG. 44. FIGS. 44(a), (b), (c), (d), and (e) are graphs showing relationships between the applied voltage and the light transmittance obtained when the liquid crystal display element 211 was viewed from the directions of the normal line, 12 o'clock, 3 o'clock, 6 o'clock, and 9 o'clock. FIG. 44(f) is a perspective view illustrating the measuring configuration of the light transmittance.

In the column of the inversion in a half tone display of Table 11, the mark ◯ indicates a state where the inversion does not occur, the mark X indicates a state where the inversion can easily be observed, and the mark Δ indicates a state where the inversion is hardly observed. The light transmittance was measured while setting the value obtained when the two polarizing plates are arranged in such a manner that their polarization axes are parallel to each other, as 100%.

TABLE 11

|  | Example 23 | Example 24 | Example 25 | Comparative example 10 | Comparative example 11 |
| --- | --- | --- | --- | --- | --- |
| Light transmittance in OFF-state (%) | 52 | 50 | 49 | 87 | 50 |
| Light transmittance at 7V application (%) | ≦0.5 | ≦0.5 | 0.8 | ≦0.5 | 2.1 |
| Inversion in half-tone display | ◯ | ◯ | ◯ | X | ◯ |

From Table 11, it will be seen that, in the liquid crystal display elements of Examples 23 and 24, the inversion of a display which is seen in a conventional TN type liquid crystal display element (Comparative Example 10 described below) having the viewing angle characteristic shown in FIG. 45 does not occur, and the increase of the transmittance in a high viewing angle at the voltage saturation is not observed.

COMPARATIVE EXAMPLE 10

On glass substrates on which the electrodes and 225 were formed in the same manner as Example 20, and the alignment films (SE150, a product of Nissan Chemical Industries, Ltd.) the same as those of Example were formed. Thereafter, a rubbing process using a nylon cloth was conducted. In the same manner as Example 20, a pair of glass substrates which underwent the rubbing process were stuck to each other in such a manner that the alignment directions of the glass substrates are perpendicular to each other, thereby constituting a display cell. Into the produced display cell, in the same manner as Example 20, a liquid crystal material, ZLI-4792 (containing 0.4 wt % of S-811) was injected. A pair of polarizing plates which have polarizing axes crossing each other perpendicularly were stuck to both sides of the display cell into which the liquid crystal material was injected, thereby constituting a conventional TN type liquid crystal display element. Comparative Example 10 was found to have the same disadvantages same as those of Comparative Examples 8 and 9 described above.

Figure 45:
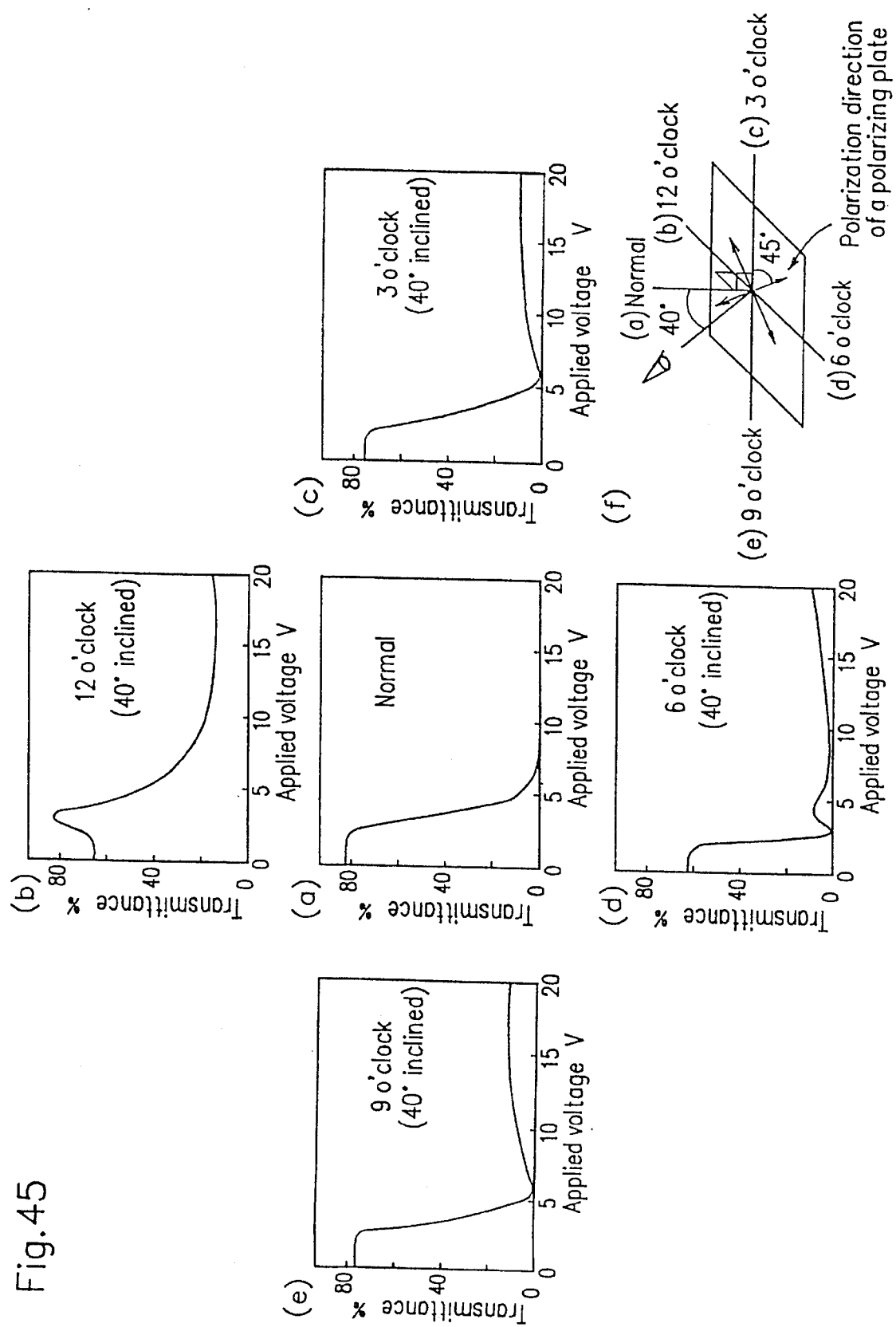
FIGS. 45(a) to 45(e) are a graphs showing the viewing angle characteristic of a liquid crystal display element of Comparative Example 10 and FIG. 45(f) is a perspective view illustrating the measuring configuration.

The electrooptic characteristics of the conventional produced liquid crystal display element are shown in Table 11 above, and the viewing angle characteristic is shown in FIG. 45 described above.

EXAMPLE 25 AND COMPARATIVE EXAMPLE 11

Figure 42:
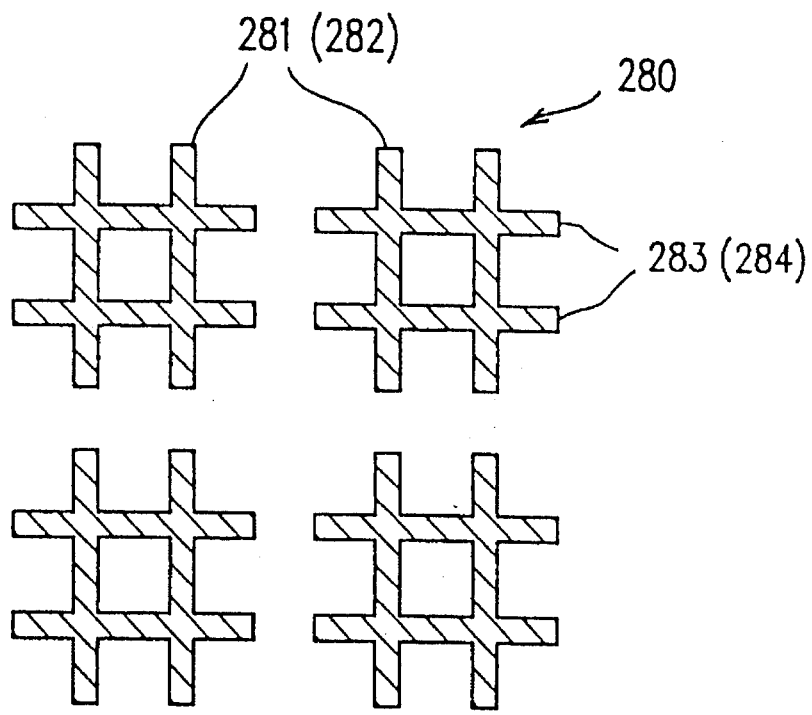
FIG. 42 is a plan view of the projections used in Example 24.

Hereinafter, Example 25 of the invention will be described. The example is similar to the above-described Example 24, and portions which are similar or corresponding to those of the Example 24 are indicated by the same reference numerals. In the example, using two glass substrates 216 and 217 shown in FIG. 23 on which the pixel electrodes 225 and the common electrodes 224 are respectively formed in the same manner as Example 24, a grid-like projection consisting of the projections 282 and 284 shown in FIG. 42 is formed on the glass substrates 216 and 217 in the same manner as Example 24, and a display cell was produced using the same processes as those conducted in Example 24. The mixture of the same composition as that in Example 24 was used in the display cell to produce the liquid crystal a display element having the liquid crystal region 222 which is surrounded by the polymer walls 232 as shown in FIG. 23.

Two polarizing plates which have polarizing axes crossing each other perpendicularly are stuck to the produced liquid crystal display element. More specifically, the two polarizing plates are stuck to the liquid crystal display element in such a manner that the angle formed by the polarization axis 277a of one of the polarizing plates shown in FIG. 41, and the projection 282 or 284 of the grid-like projection and extending in a predetermined direction is in the range of ±30°, for example 25° (Example 25) or 35° Comparative Example 11). The electrooptic characteristics of the produced liquid crystal display element are shown in Table 11 above.

Accordingly, the liquid crystal display element of Example 25 can attain the same effects as those described in the foregoing examples.

The reason why such excellent electrooptic characteristics can be attained by setting the angle formed by the polarization axis 277a of one of the polarizing plates, and the projection 282 or 284 of the grid-like projection and elongating in a predetermined direction to be in the range of ±30° will be described below.

Figure 46:
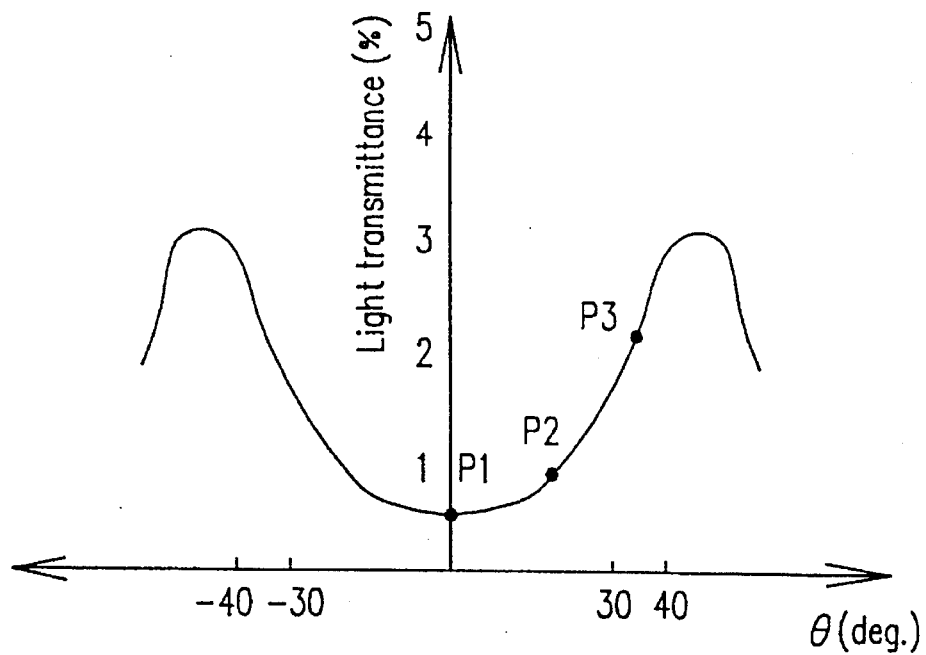
FIG. 46 is a graph showing the relationship between an angle formed by a disclination line and the polarization axis, and the light transmittance.

FIG. 46 is a graph showing the relationship between an angle θ (deg.) formed by the polarization axis 277a and the projection 282 or 284 parallel to the disclination lines, and the light transmittance T obtained when a voltage of, for example, 7 V is applied to the liquid crystal display element. Points P1, P2 and P3 indicate the cases of Examples 23 and 24, and Comparative Example 11, respectively. As seen from FIG. 46, the light transmittance has the minimum value when angle e formed by the polarization axis and a disclination line is within the range of +30 deg. to −30 deg. as described above. The light transmittance is maximum when the angle is 45 deg. which is half of the angle formed by the polarization axes of a pair of polarizing plates in the state of crossed Nicols.

In this way, the phenomenon shown in FIG. 46 corresponds to the phenomenon in which disclination lines are hardly visible in the vicinity of the angle θ=0°. When the angle θ is within the range of +30° to −30° including this angle of 0°, disclination lines can be made hardly visible during an actual display.

EXAMPLE 26

In the examples described above, the projections for producing disclination lines, such as the projections 273, 274 and 282 shown in FIGS. 39 and 42 are formed into a radial form, a grid-like form or the like, or along plural directions which cross each other. In Example 26, the projections for producing disclination lines are formed so as to extend in parallel with one predetermined direction. The direction of the polarization axis of a polarizing plate attached to the liquid crystal display element of the example is made coincident with the direction along which the projections extend. It was also confirmed that the liquid crystal display element formed in this way can attain the same effects as those described in the foregoing examples.

Hereinafter, a process of manufacturing the liquid crystal display element of Example 26 will be described.

Figure 47:
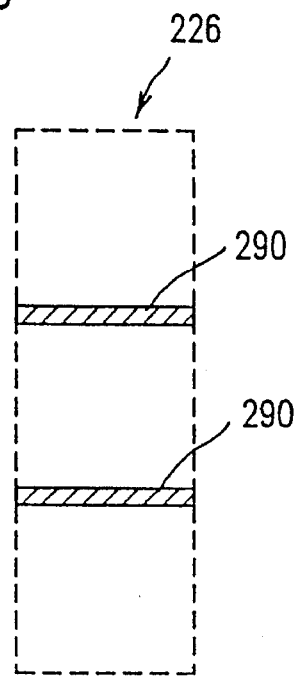
FIG. 47 is a plan view of projections of Example 26.

In the same manufacturing process as that of the liquid crystal display element of Example 24, rectangular pixels 226 are positioned on a glass substrate, and, for each pixel 226, linear projections 290 which are parallel to each other as shown in FIG. 47 are formed at positions where the respective pixel 226 is divided into, for example, three equal portions in the longitudinal direction. A pair of glass substrates on which the projections 290 are formed are combined in the same manner as Example 24 to produce a display cell. The same mixture as that used in Example 24 is injected into the display cell.

Figure 48:
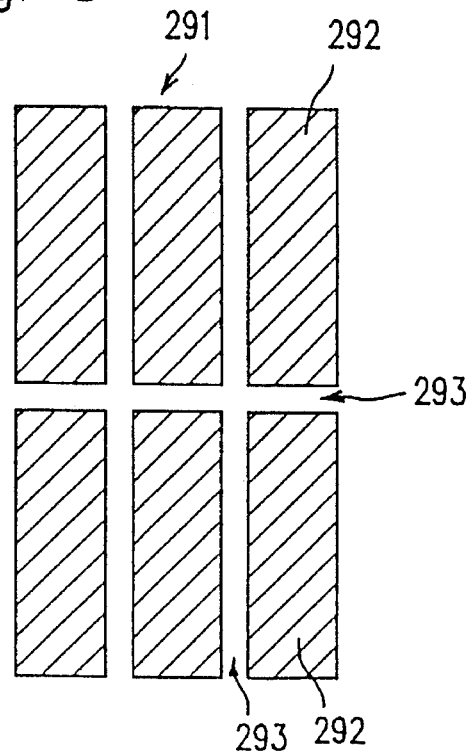
FIG. 48 is a plan view of a photomask used in Example 26.

A photomask 291 shown in FIG. 48 is attached to the display cell into which the mixture has been injected. The photomask 291 has a configuration in which light-shield portions 292 disposed for each of the pixels 226 and corresponding in shape to the pixels 226 are arranged in a matrix form. A transparent portion 293 is formed between the light-shield portions 292 into a grid-like shape. In the same manner as Example 24, the display cell was irradiated with ultraviolet rays from the side of the dot patterns of the photomasks 291, thereby producing a liquid crystal display element in which the liquid crystal region 222 surrounded by the polymer walls 232 as shown in FIG. 23 is formed for each pixel 226.

Figure 49:
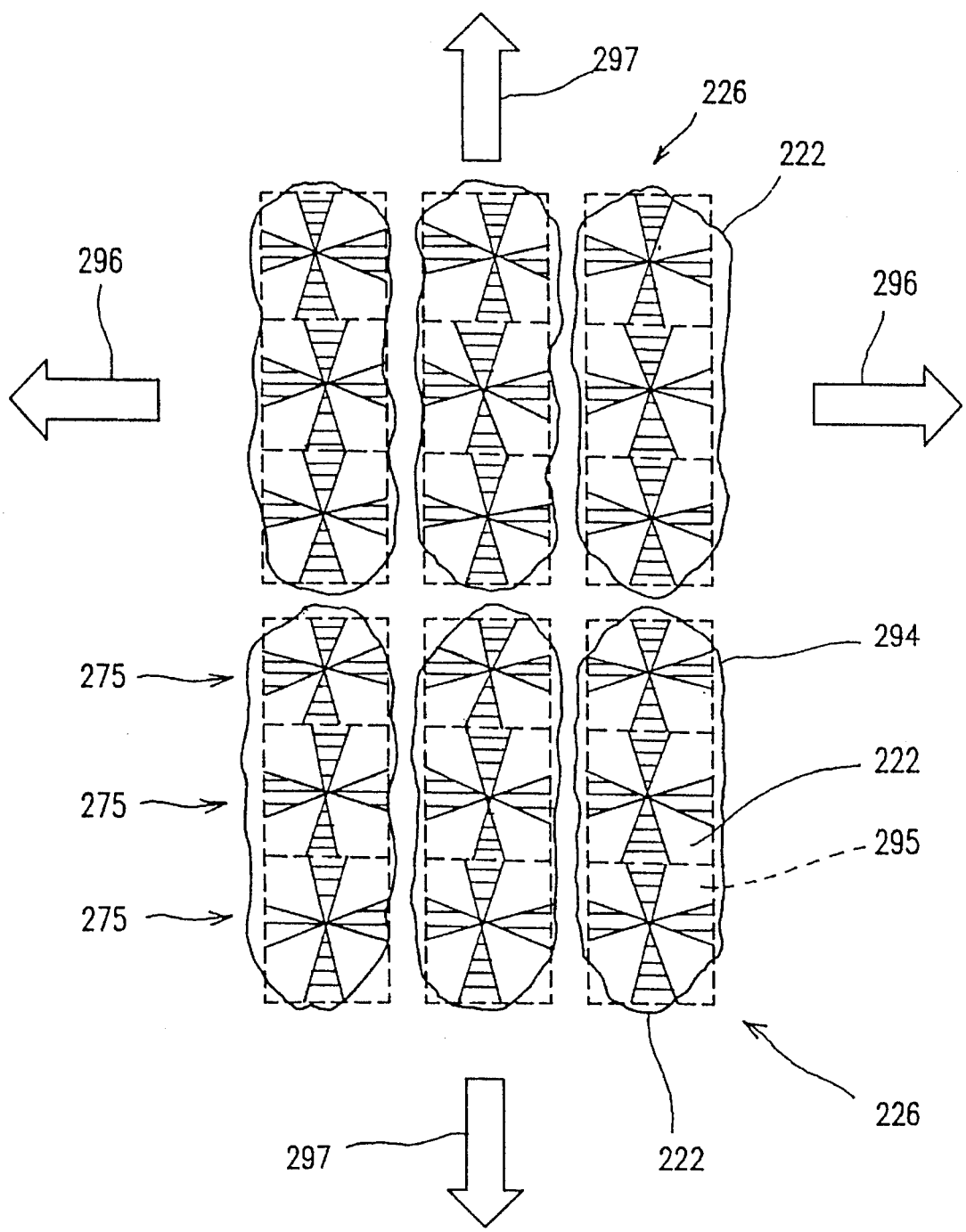
FIG. 49 is a plan view showing a configuration for a pixel of Example 26.

When the produced liquid crystal display element was observed under a polarizing microscope, it was confirmed that, as shown in FIG. 49, liquid crystal regions 222 are formed at the regions corresponding to pixels 226 and each of the pixels 226 consists of three liquid crystal domains 275. Also, it was confirmed that each liquid crystal domain 275 has an extinction pattern 294 indicating that liquid crystal molecules in each liquid crystal domain 275 are radially aligned. The extinction patterns 294 were confirmed to be formed for each liquid crystal domain 275 into a cross pattern in which the center coincides with the center of the respective pixel 226. Also, it was confirmed that, in each pixel 226, disclination lines 295 are formed between the liquid crystal domains 275 so as to be parallel to each other.

A pair of polarizing plates are stuck to the produced liquid crystal display element in such a manner that one of the polarization axis 296 or 297 of the polarizing plates shown in FIG. 49 is parallel to the disclination lines 295. The electrooptic characteristics of the produced liquid crystal display element were measured in the same manner as Example 23. The measurement results of the electrooptic characteristics are shown in Table 12 below.

TABLE 12

|  | Example 26 |
| --- | --- |
| Light transmittance in OFF-state (%) | 54 |
| Light transmittance at 7V application (%) | ≤0.5 |
| Inversion in half-tone display | O |

Utilizing the wide viewing angle, the liquid crystal display element of the invention can be used specifically in a flat display device, for example, a personal computer, a word processor, an amusement device, or a television receiver. Utilizing the shutter effect, the present liquid crystal display element can be used in various display boards, a window, a wall, etc.

Since liquid crystal microcells surrounded by many polymer walls exist in a cell, the liquid crystal display element of the example has a feature that it can endure a large external force. Therefore, the element can be used as a liquid crystal display element for a pen input element.

Hereinafter, modifications of the invention will be described.

Ruggedness of a Substrate

The shape of the ruggedness (projection, ridge or the like) is an important factor determining the arrangement of liquid crystal domains. When a horizontal arrangement is adopted, a pixel is preferably partitioned into 3 to 20 sections which are arranged in a radial manner starting from the center portion of the pixel. When a pixel is used as it is or partitioned into 2 sections, liquid crystal domains are not stable, and disclination lines are also formed at portions other than the ruggedness, with the result that the control of disclination lines cannot be conducted sufficiently. When a pixel is partitioned into 21 or more sections, lines are concentrated at the center portion, causing a problem in a working process. In this case, moreover, the number of disclination lines is increased so that the black level at the saturation voltage is lowered.

As a method for making disclination lines hardly visible during the application of a voltage, the projections for each pixel are arranged in the range of ±30° with respect to the polarization axes of the polarizing plates, whereby the disclination lines formed along the projections are formed in the range of ±30° with respect to the polarization axes of the polarizing plates in the same manner as the projections. This can cause the disclination lines to substantially disappear entirely during the application of a voltage, so that the black level during the application of a voltage is improved and the contrast of the image is improved.

The heights of the projections are preferably set so that, even when added with the height of the projections of the paired glass substrates, they are smaller than the cell thickness. When the heights of the projections are equal to or greater than the cell thickness, the projections form walls or columns made of the polymer material. This produces a state which is identical with that wherein the polymer material enters the pixels, so that the light transmittance in the voltage-off period is lowered. More preferably, the heights are 30% or less of the cell thickness. The film thicknesses of the projections are not required to be uniform. Projections in one pixel may be formed into a conical shape as described above. This configuration is more preferable because liquid crystal molecules are radially aligned in one pixel with a pretilt angle, so that the viewing angle characteristic of the liquid crystal display element is further improved.

Figure 50:
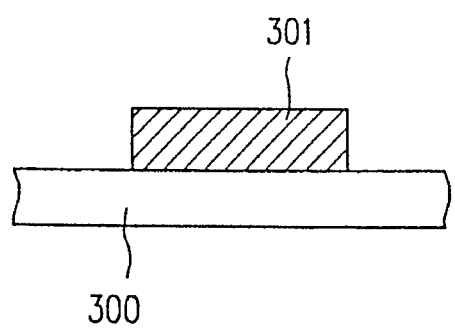
FIGS. 50(a) to 50(c) are section views showing a modification of the section shape of projections used in the invention.
Figure 50:
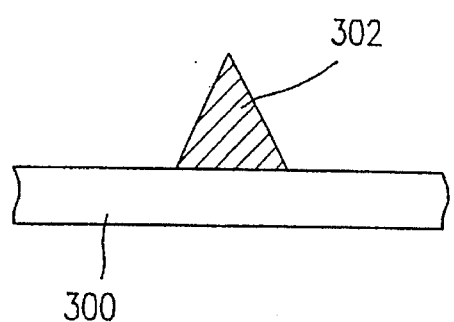
Figure 50:
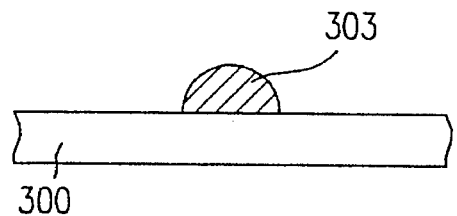
Figure 51A:
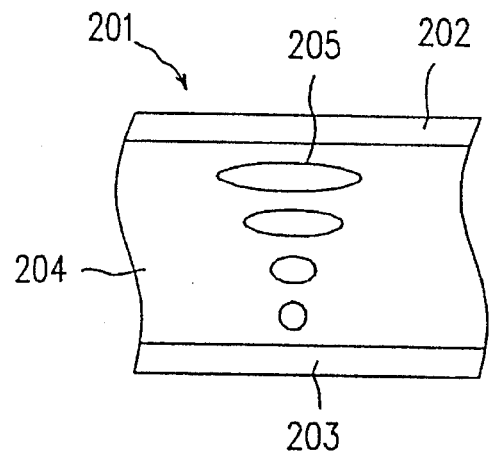
FIGS. 51(a) to 51(c) are section views of a conventional liquid crystal display element.
Figure 51B:
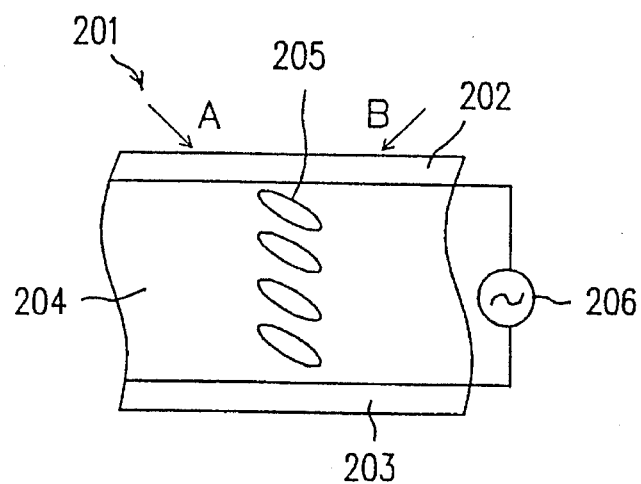
Figure 51C:
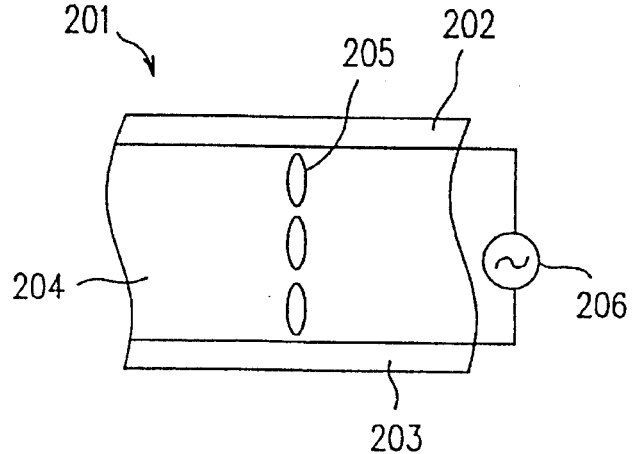
Figure 52A:
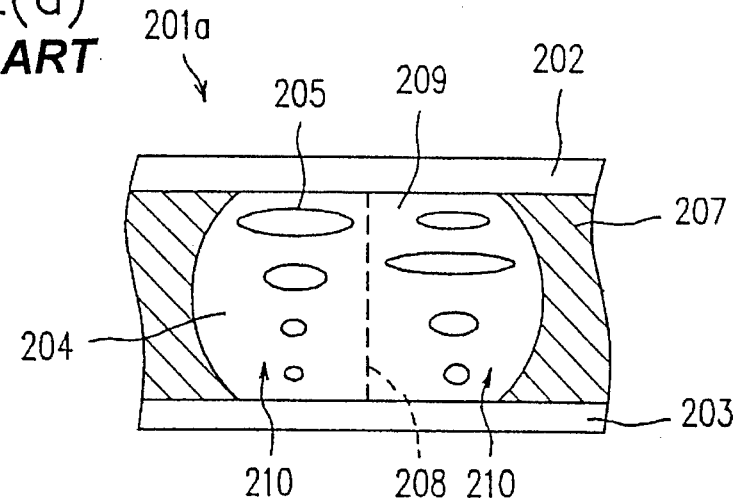
FIGS. 52(a) to 52(c) are section views of another conventional liquid crystal display element.
Figure 52B:
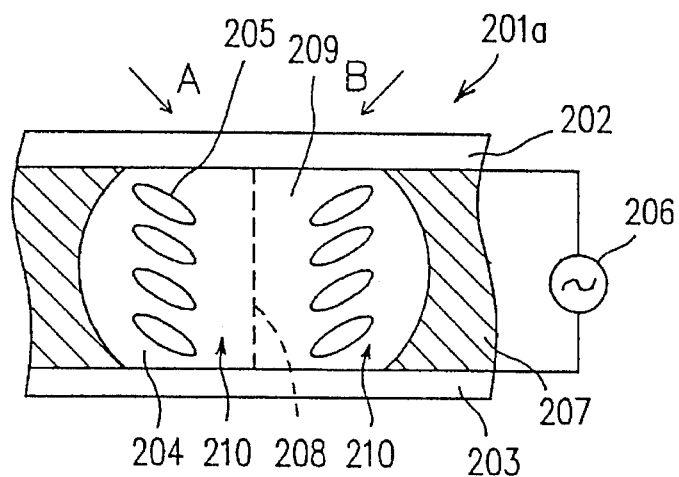
Figure 52C:
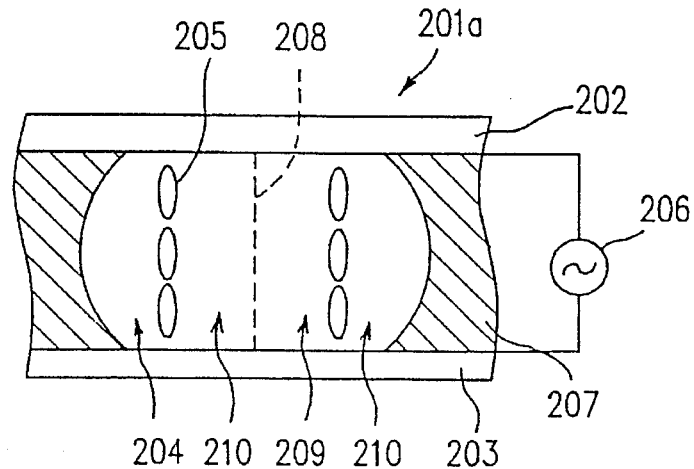

In the invention, the section shape of a projection is not limited to the shapes employed in the above-described examples. As shown in FIG. 50(a), a rectangular plate-like projection 301 may be formed on a glass substrate 300, or, as shown in FIG. 50(b), a triangular projection 302 may be formed on the glass substrate 300. As shown in FIG. 50(c), a semicircular projection 303 may be formed on the glass substrate 300. A groove may be used which is formed by partly removing the surface of the glass substrate 300 by the etching technique or the like.

In the invention, the positions and directions of disclination lines are controlled by preferably locally reducing the cell thickness and producing the surface energy difference between the substrate and the projections. The above-mentioned various effects can be attained by the control of the positions and directions of disclination lines. Therefore, the domain control means in the invention may be realized by the above-mentioned projections or grooves. In both cases of projections and grooves, the section shape is not limited to a certain one.

As the material of the projections, it is preferable to use a transparent material such as a polymer material. Since a patterning must be conducted, it is particularly preferable to use a photosensitive resin such as a photoresist, and photosensitive polyamide. A method may be employed in which a polymer material diluted with a solvent is printed onto a substrate. In this case, a polymer material such as polyimide, polystyrene, polycarbonate, or PMMA (polymethyl methacrylate) may be used.

Thin Film having Polycrystals

A thin film of a crystalline polymer material such as nylon (nylon 6, nylon 66, nylon 12 or the like), polyethylene terephtalate, polyoxymethylene, or a copolymer of polyvinyl alcohol, or an inorganic material having grain boundaries, such as polysilicon may be used.

All of these materials have a crystal arrangement, and a polymer is formed on the surface along the arrangement. Therefore, these materials exhibit the same effects as those of the above-mentioned ruggedness.

Photocurable Resin

A useful polymer material is a photocurable resin. Examples of a photocurable resin are acrylic acid and acrylic ester having C3 or more long-chain alkyl groups or benzene rings, more specifically, isobutyl acrylate, stearyl acrylate, lauryl acrylate, isoamyl acrylate, n-butyl methacrylate, n-lauryl methacrylate, tridecyl methacrylate, 2-ethylhexyl acrylate, n-stearyl methacrylate, cyclohexyl methacrylate, benzyl methacrylate, 2-phenoxyetyl methacrylate, isobornyl acrylate, and isobornyl metacrylate; multifunctional resins having two or more functional groups in order to enhance the physical strength of a polymer, such as R-684 (a product of NIPPON KAYAKU CO., LTD.), bisphenol A dimethacrylate, bisphenol A diacrylate, 1,4-butanediol dimethacrylate, 1,6-hexanediol dimethacrylate, trimethylolpropane trimethacrylate, trimethylolpropane triacrylate, tetramethylolmethane tetraacrylate, and neopentyl diacrylate; and more preferably, a resin obtained by halogenating, for example, chlorinating, or fluorinating these monomers, for example, 2,2,3,4,4,4-hexafluorobuthyl methacrylate, 2,2,3,4,4,4-hexachlorobuthyl methacrylate, 2,2,3,3-tetrafluoropropyl methacrylate, 2,2,3,3-tetrachloropropyl methacrylate, perfluorooctylethyl methacrylate, perchlorooctylethyl methacrylate, perfluorooctylethyl acrylate, and perchlorooctylethyl acrylate.

Photopolymerization Inhibitor

In order to increase the size of a liquid crystal region, a compound for inhibiting the polymerization is preferably added to such a resin material. Examples of the inhibitor are monomers or compounds which, after radicals are generated, may stabilize the radicals in a resonance system. Specifically, styrene, p-chlorstyrene, p-methylstyrene, p-phenylstyrene, and nitrobenzene are preferably used.

Photo-initiator

It is not required to add a photo-initiator. In order to efficiently conduct the photopolymerization, however, it is preferable to add a photo-initiator. A useful photo-initiator includes a conventional photo-initiator such as Irugacure 651, 184, 907, or Darocure 1173, 1116, 2956. In order to improve the retention of liquid crystal regions due to the polymer walls, a sensitizing agent for allowing a resin to be polymerized by irradiation of visible light may be used.

The addition amount of the photo-initiator varies depending on the reactivity of the respective compound. Although not particularly limited in the invention, the amount added is preferably 5 to 0.01% of a mixture of liquid crystal and a photocurable resin (including a liquid crystalline photocurable resin). When the added amount of the photo-initiator is not less than 5% of the mixture, the rate of the phase separation of a liquid crystal and a polymer film formed by the polymerization is so high that it is difficult to control the size of the liquid crystal region to a predetermined value. This causes the liquid crystal region to be small in size, with the result that the driving voltage becomes high and the proportion of liquid crystal regions in a pixel is lowered. When a photomask is used in a process for manufacturing liquid crystal regions, liquid crystal regions are formed in a region between pixels of a liquid crystal display element, thereby reducing the contrast. When the added amount of the photo-initiator is not greater than 0.01%, the photocurable resin cannot sufficiently be cured.

Liquid Crystal Material

A liquid crystal material useful in the liquid crystal display element of the invention is an organic mixture which is in the liquid crystal state in the vicinity of ordinary temperature, such as a nematic liquid crystal (a liquid crystal for two-frequency driving, including a liquid crystal having the dielectric anisotropy $\Delta\epsilon<0$), a cholesteric liquid crystal (particularly a liquid crystal which exhibits the selective reflection property against visible light), a smectic liquid crystal, a ferroelectric liquid crystal, or a discotic liquid crystal. These liquid crystal materials may be used in combination. From the view point of the characteristics of a liquid crystal display element, a nematic liquid crystal, and a nematic liquid crystal to which a cholesteric liquid crystal (chiral agent) is added are particularly preferable.

Since the photopolymerization is conducted in a working process, moreover, it is preferable to use a liquid crystal having excellent resistance to chemical reaction. Specifically, such a liquid crystal includes a liquid crystal having a functional group such as a fluorine atom in a compound, for example, ZLI-4801-000, ZLI-4801-001, or ZLI-4792 (all are products of Merck & Co., Inc.).

Polymerizable Liquid Crystal Material

In order to produce domains along ruggedness, optical curing is preferably conducted in a liquid crystal state (aligned state). In order to obtain a mixture of a liquid crystal and a photocurable resin which has a liquid crystal state, it is preferable to use a polymerizable liquid crystal material which has the characteristics of both the substances (a photocurable resin and a liquid crystal). When the liquid crystal material, and a liquid crystalline compound such as the polymerizable liquid crystal material having a polymerizable functional group in a molecule are selected, it is preferable that their portions for showing the liquid crystallinity are similar to each other, from the view point of compatibility. When an F or Cl containing liquid crystal material having unique chemical properties is used, it is preferable to use an F or Cl containing liquid crystal material also as the liquid crystalline compound having a polymerizable functional group. Also when a ferroelectric liquid crystal is used, in order to produce a stable smectic phase, it is preferable to use a polymerizable compound having a ferroelectric liquid crystal in its molecule.

Although not particularly limited in the invention, a compound having a polymerizable functional group in its molecule, i.e., the polymerizable liquid crystal material which is useful in the invention is a compound indicated by following Formula 1, etc., or a compound which hardly disturbs the liquid crystallinity of the host liquid crystal molecules.

A—B—LC [Formula 1]

where A indicates a polymerizable functional group, or indicates a functional group having an unsaturated bond, or a distorted hetero ring structure such as , $CH_2=CH-COO-$, $CH_2=CH-COO-$, or

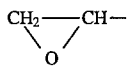 [Formula 2]

In Formula 1, B indicates a connection group for connecting a polymerizable functional group with a liquid crystal compound, specifically, an alkyl chain ($-(CH_2)_n-$), an ester bond (—COO—), an ether bond (—O—), a polyethylene glycol chain ($-CH_2CH_2O-$), or a bonding group in which these bonding groups are combined. It is preferable to use a mixture which exhibits liquid crystallinity when a polymerizable liquid crystal material is mixed with a liquid crystal material. Therefore, a connection group having a length of 6 or more bonds in a range from a polymerizable functional group to a stiff portion of a liquid crystal molecule is particularly preferable.

In Formula 1 above, LC indicates a liquid crystal compound, specifically, a compound represented by the following Formula 3, a cholesterol ring, a derivative thereof, or the like.

D—E—G [Formula 3]

where G indicates a polar group for exhibiting the dielectric anisotropy of the liquid crystal, such as a benzene ring, a cyclhexane ring, a paradiphenyl ring, or a phenylcyclohexane ring having a functional group such as —CN, —OCH3, —F, —Cl, $-OCF_3$, $-OCCl_3$, —H, or —R (R: alkyl group). E indicates a functional group for connecting D with G, such as a single bond, $-CH_2-$, $-CH_2CH_2-$, —O—, , —CH=CH— or the like. D indicates a functional group which is to be bonded to B of Formula 1 and which is a portion affecting the degree of the dielectric anisotropy and the refractive index anisotropy of the liquid crystal, specifically, a paraphenyl ring, a 1,10-diphenyl ring, a 1,4-cyclohexane ring, a 1,10-phenylcyclohexane ring, or the like.

Mixing Ratio of a Liquid Crystal and a Polymerizable Compound

When a liquid crystal is to be mixed with a polymerizable compound, the weight ratio (liquid crystal:polymerizable compound) is preferably from 50:50 to 97:3, more preferably, from 70:30 to 90:10. When a liquid crystal material is lower than 50%, the effect of polymer walls is enhanced so that the driving voltage of a cell is extremely high, whereby the practicability is lost. When a liquid crystal material exceeds 97%, the physical strength of polymer walls is lowered so that stable characteristics cannot be obtained.

Method of Configuring a UV (Ultraviolet) Irradiation Distribution

In order to maintain the shape of a liquid crystal region corresponding to that of a photomask, the method of configuring a UV irradiation distribution on a mixture sandwiched by the pair of substrates plays an important role. Specifically, it is preferable to constitute a regular distribution of UV irradiation on the mixture using a photomask, a microlens, an interference plate, or the like. The photomask may be positioned in either of the outside or the inside of the liquid crystal cell as far as it can produce an intensity distribution in UV rays. When the photomask is separated from the liquid crystal cell, the optical image formed on the liquid crystal cell by the mask is unfocused so that the liquid crystal regions cannot be formed precisely, thereby impairing the effects of the invention. Therefore, it is preferable to position the photomask as close as possible to the mixture of the liquid crystal and the photocurable resin. Preferably, rays emitted from a UV light source are parallel as much as possible.

According to studies conducted by the inventors, it is preferable to use a photomask having an irradiation unevenness (a weak irradiation region including light-shield regions) which is equal to or greater than 30% of the pixel area. When a photomask having an irradiation unevenness which is smaller than 30% of the pixel area is used, the alignment restriction force for each pixel is weakened so that the uniformity of a display is impaired. Accordingly, it is preferable to use a photomask having a weak irradiation region whose area is greater than the pixel area. Preferably, a photomask or the like is used so that UV rays irradiate only a portion other than pixels.

The weak irradiation region which is formed by light-shield regions of a photomask or the like is shaped so as to cover 30% or more of the pixel area and locally reduce the intensity of UV rays. In the invention, the shape of the weak irradiation region is not particularly limited. The weak irradiation region may be shaped into, for example, a circle, a square, a trapezoid, a rectangle, a hexagon, a rhombus, a character shape, a pattern defined by curved and straight lines, a pattern obtained by partly cutting one of these patterns, a pattern obtained by combining two or more of these patterns, or an assembly of these small patterns. A photomask or the like in which a portion corresponding to a pixel of a liquid crystal display element is a weak irradiation region is more preferable from the view points of reducing the intensity of scattered light in the pixel and improving the contrast of the liquid crystal display element.

When the invention is to be executed, one or more patterns may be selected from these patterns. In order to improve the uniformity of liquid crystal regions, it is preferable to select only one pattern so as to make the shape uniform.

A feature of the invention is to regularly arrange liquid crystal regions in a direction parallel to the substrate, or to arrange liquid crystal regions in accordance with the alignment state of pixels. Specifically, the arrangement of weak irradiation regions in the liquid crystal display element is important. The arrangement of weak irradiation regions is preferably coincident with the pitch of pixels, and it is preferable to dispose one weak irradiation region in one pixel.

A weak irradiation region may be disposed over several pixels. A weak irradiation region may be disposed for each row or column of plural pixels which are arranged in a matrix form. Alternatively, a weak irradiation region for a whole of a liquid crystal display element may be disposed for each set of plural pixels adjoining to each other.

When the shapes of the liquid crystal regions in the sample were to be measured, the liquid crystal cell was split into two substrates, liquid crystal molecules were removed by a solvent, and local shapes of a polymer matrix constituted by polymer films remaining on the substrates were measured by using a polarizing microscope. Since some of the liquid crystal regions were damaged during the process of preparing a sample, 20 liquid crystal regions which were most excellent in regularity in the sample were selected, and the observation of the polymer matrix was conducted on these selected regions. The photomask is required to have the same regularity as that of the alignment of weak irradiation regions of the liquid crystal display element. It is not necessary for the weak irradiation regions to be independent of each other. Each weak irradiation region may be connected at its periphery to adjacent weak irradiation regions, as far as those regions for most effectively blocking UV rays have the above-mentioned shape and alignment.

According to the invention as described above, a liquid crystal display element can have a large display screen and be made into a film shape. When a liquid crystal display element is to be made into a film shape, a film may be used in place of a glass plate, as a substrate material.

Driving Method

The produced cell may be driven by a driving method such as the simple matrix driving method, or an active matrix method using switching elements such as a TFT (thin film transistor), or MIM (transistor having a configuration of metal-insulator-metal). In the invention, the method of driving the liquid crystal display element is not particularly limited.

The invention relates to an element having an alignment film for allowing liquid crystal molecules to be aligned in various directions in one pixel. Since liquid crystal molecules are omnidirectionally aligned, a sudden change of contrast according to the viewing angle which is a problem of a conventional liquid crystal display element can be solved. Particularly in a pixel in which a polymer film is prevented as much as possible from entering the pixel and liquid crystal domains are radially aligned, the viewing angle characteristic is improved, and also the light transmittance during the voltage-off period is improved. When disclination lines between liquid crystal domains are directed within a predetermined angle range with respect to the polarization axes of polarizing plates, the disclination lines can be made hardly visible during the application of a voltage, whereby the black level is improved and the contrast of a display image is improved.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. A liquid crystal display element comprising two opposing electrodes, and a liquid crystal layer disposed between said electrodes, wherein
alignment means for aligning a liquid crystal of said liquid crystal layer in at least three different directions is disposed above a side of said liquid crystal layer of at least one of said electrodes, wherein said element comprises a plurality of pixels for a display, and each of said pixels has said alignment means, and wherein said alignment means radially aligns said liquid crystal.

2. A liquid crystal display element according to claim 1, wherein said alignment means consists of an organic film having spherulites.

3. A liquid crystal display element according to claim 2, wherein said organic film contains crystalline polyamide.

4. A liquid crystal display element according to claim 3, wherein said crystalline polyamide has a glass transition temperature which is equal to or lower than 200° C.

5. A liquid crystal display element according to claim 2, wherein said spherulites have a diameter in a range of 1 to 200 μm.

6. A liquid crystal display element according to claim 5, wherein said organic film contains particles of a diameter of 1 μm or less, whereby said spherulites have a diameter in a range of 1 to 200 μm.

7. A liquid crystal display element according to claim 6, wherein said particles are selected from a group consisting of polymer particles and inorganic particles.

8. A liquid crystal display element according to claim 5, wherein said organic film having a rugged surface on a side of said electrode above which said organic film is formed, whereby said spherulites have a diameter in a range of 1 to 200 μm.

9. A liquid crystal display element according to claim 8, wherein a foundation layer having a rugged surface is disposed above at least one of said electrodes, and said organic film is formed on said foundation layer, whereby said rugged surface of said organic film is obtained.

10. A liquid crystal display element according to claim 8, wherein at least one of said electrodes have a rugged surface, and said organic film is formed on said electrode, whereby said rugged surface of said organic film is obtained.

11. A liquid crystal display element according to claim 8, wherein a roughness of said rugged surface is within a range of 1.48 to 2.8 nm.

12. A liquid crystal display element comprising two opposing electrodes, and a liquid crystal layer disposed between said electrodes, wherein
alignment means for aligning a liquid crystal of said liquid crystal layer in at least three different directions is disposed above a side of said liquid crystal layer of at least one of said electrodes, wherein said element comprises a plurality of pixels for a display, and each of said pixels has said alignment means, and wherein said alignment means concentrically aligns said liquid crystal.

13. A liquid crystal display element comprising two opposing electrodes, and a liquid crystal layer disposed between said electrodes, wherein
alignment means for aligning a liquid crystal of said liquid crystal layer in at least three different directions is disposed above a side of said liquid crystal layer of at least one of said electrodes, wherein said liquid crystal layer comprises a plurality of liquid crystal domains, and a liquid crystal in each of said liquid crystal domains is aligned in at least three different directions.

14. A liquid crystal display element according to claim 13, wherein said plurality of liquid crystal domains are radially arranged.

15. A liquid crystal display element according to claim 13, wherein said plurality of liquid crystal domains are arranged in a form of a grid.

16. A liquid crystal display element according to claim 13, wherein said plurality of liquid crystal domains are randomly arranged.

17. A liquid crystal display element according to claim 13, wherein said liquid crystal layer comprises for each pixel a liquid crystal region surrounded by polymer walls, said liquid crystal region consisting of said plurality of liquid crystal domains.

18. A liquid crystal display element according to claim 17, wherein said alignment means for arranging said liquid crystal domains consists of materials which includes polycrystals.

19. A liquid crystal display element according to claim 17, wherein said element further comprises at least one polarizing plate, and angles formed by disclination lines formed at boundaries of said plurality of liquid crystal domains and a polarization axis of said polarizing plate are equal to or smaller than 30 deg.

20. A liquid crystal display element according to claim 17, wherein said alignment means comprises a projection extending in a form of a grid, and said liquid crystal domains are arranged in a form of a grid by said alignment means.

21. A liquid crystal display element according to claim 20, wherein said alignment means comprises a projection which radially extends from a center of said pixel, and said liquid crystal domains are radially arranged by said alignment means.

22. A liquid crystal display element according to claim 21, wherein said element further comprises at least one polarizing plate, and angles formed by said projection which radially extends from a center of said pixel and a polarization axis of said polarizing plate are equal to or smaller than 30 deg.

23. A liquid crystal display element comprising two opposing electrodes, and a liquid crystal layer disposed between said electrodes, wherein
alignment means for aligning a liquid crystal of said liquid crystal layer in at least three different directions is disposed above a side of said liquid crystal layer of at least one of said electrodes, wherein said element comprises a plurality of pixels for a display, and each of said pixels has said alignment means, and wherein said alignment means consists of a photosensitive polymer having a projection extending in at least three different directions.

24. A liquid crystal display element comprising two opposing electrodes, and a liquid crystal layer disposed between said electrodes, wherein
alignment means for aligning a liquid crystal of said liquid crystal layer in at least three different directions is disposed above a side of said liquid crystal layer of at least one of said electrodes, wherein said element comprises a plurality of pixels for a display, and each of said pixels has said alignment means, and wherein said alignment means consists of a liquid crystalline polymer aligned in at least three different directions.

25. A liquid crystal display element comprising two opposing electrodes, and a liquid crystal layer disposed between said electrodes, wherein
alignment means for aligning a liquid crystal of said liquid crystal layer in at least three different directions is disposed above a side of said liquid crystal layer of at least one of said electrodes, wherein said element comprises a plurality of pixels for a display, and each of said pixels has said alignment means, and wherein said alignment means consists of an organic film having a projection extending in at least three different directions formed by pushing a projection against said organic film.

26. A method of manufacturing a liquid crystal display element comprising two opposing electrodes, and a liquid crystal layer disposed between said electrodes, said method comprising the step of forming an alignment means for aligning a liquid crystal of said liquid crystal layer in at least three different directions, above at least one of said electrodes, by forming an organic film having a projection extending in at least three different directions by pushing a projection against said organic film.

27. A liquid crystal display element comprising two opposing electrodes, and a liquid crystal layer disposed between said electrodes, wherein alignment means for alighting a liquid crystal of said liquid crystal layer in at least three different directions is disposed above a side of said liquid crystal layer of at least one of said electrodes, wherein said element comprises a plurality of pixels for a display, and each of said pixels has said alignment means, and wherein said element further comprises at least two polarizing plates, polarization axes of said polarizing plates perpendicularly crossing each other, said two opposing electrodes are disposed between said two polarizing plates, said liquid crystal layer consists of a nematic liquid crystal containing a chiral dopant, and a twist angle of said liquid crystal layer, and a product of a refractive index anisotropy of said nematic liquid crystal and a thickness of said liquid crystal layer are set so that a light transmittance has a substantially maximal value.

28. A liquid crystal display element according to claim 27, wherein said twist angle is in a range of 45 to 150 deg., and said product of a refractive index anisotropy of said nematic liquid crystal and a thickness of said liquid crystal layer is in a range of 300 to 650 nm.

29. A liquid crystal display element according to claim 27, wherein said twist angle is in a range of 45 to 150 deg., and said product of a refractive index anisotropy of said nematic liquid crystal and a thickness of said liquid crystal layer is in a range of 1,000 to 1,400 nm.

30. A liquid crystal display element according to claim 27, wherein said twist angle is in a range of 240 to 300 deg., and said product of a refractive index anisotropy of said nematic liquid crystal and a thickness of said liquid crystal layer is in a range of 550 to 800 nm.

31. A method of manufacturing a liquid crystal display element comprising two opposing electrodes, and a liquid crystal layer disposed between said electrodes, comprising a step of forming alignment means for aligning a liquid crystal of said liquid crystal layer in at least three different directions, by forming an organic film having spherulites above at least one of said electrodes.

32. A manufacturing method according to claim 31, wherein said alignment means forming step comprises a step of cooling said organic film from a melt state, and said cooling step comprises a step of adjusting a cooling rate to control diameters of spherulites in said organic film in a range of 1 to 200 μm.

33. A manufacturing method according to claim 32, wherein said cooling rate a is not lower than 0.1° C./min and not higher than 3.5° C./min.

34. A manufacturing method according to claim 32, wherein said organic film consists of a material including at least two kinds of polymers which have different melting points.

35. A manufacturing method according to claim 32, wherein said organic film consists of a material including crystalline polyamide which has a glass transition temperature equal to or lower than 200° C.

36. A manufacturing method according to claim 32, wherein said cooling step comprises a step of adjusting said cooling rate so that a temperature of said organic film is lowered in accordance with a linear function with respect to time.

37. A manufacturing method according to claim 36, wherein an initial temperature of said organic film in said cooling step is equal to or higher than a temperature at which the highest crystallization rate of said organic film is obtained, and equal to or lower than a melting point of said organic film.

38. A manufacturing method according to claim 36, wherein a terminal temperature of said organic film in said cooling step is equal to or higher than a glass transition temperature of said organic film.

39. A manufacturing method according to claim 31, wherein said alignment means forming step comprises a step of forming a photosensitive polymer having a projection extending in at least three different directions by using a photolithograph technique.

40. A manufacturing method according to claim 31, wherein said method further comprises a step of depositing particles on at least one of said electrodes to obtain a rugged surface, whereby adjusting a roughness of said rugged surface to control diameters of spherulites in said organic film in a range of 1 to 200 μm.

41. A manufacturing method according to claim 31, wherein said alignment means forming step comprises a step of dispersing particles in said organic film to control diameters of spherulites in said organic film in a range of 1 to 200 μm.

42. A manufacturing method according to claim 31, wherein said method further comprises a step of forming a foundation layer having a rugged surface above at least one of said electrodes, whereby adjusting a roughness of said rugged surface to control diameters of spherulites in said organic film in a range of 1 to 200 μm.

43. A manufacturing method according to claim 42, wherein said foundation layer forming step comprises a step for etching a surface of said foundation layer.

44. A method of manufacturing a liquid crystal display element comprising two opposing electrodes, a liquid crystal layer disposed between the electrodes, and a plurality of pixels for a display, said liquid crystal layer comprising at least one liquid crystal domain for each pixel, the method comprising the step of forming an alignment means for aligning a liquid crystal of said liquid crystal layer in at least three different directions above at least one of said electrodes, wherein said method comprising the steps of:

forming an alignment means for aligning a liquid crystal of said liquid crystal layer in at least three different directions, above at least one of said electrodes;

supplying a mixture containing a liquid crystal, a photocurable resin, and a photo-initiator, between said two opposing electrodes; and irradiating said mixture with light having a regular intensity distribution.

45. A manufacturing method according to claim 44, wherein said liquid crystal layer comprises for each pixel a liquid crystal region surrounded by polymer walls, said liquid crystal region consisting of said plurality of liquid crystal domains.

46. A manufacturing method according to claim 45, wherein said alignment means forming step further comprises a step of, before said mixture supplying step, forming an organic film above at least one of said electrodes.

47. A manufacturing method according to claim 46, wherein said liquid crystal domains are radially arranged by said organic film.

48. A manufacturing method according to claim 46, wherein said liquid crystal domains are arranged in a form of a grid by said organic film.

49. A manufacturing method according to claim 44, wherein a content of said photocurable resin in said mixture of said liquid crystal and said photocurable resin is in a range of 10 to 0.1 wt %.

50. A manufacturing method according to claim 44, wherein said alignment means comprises at least one projection formed above at least one of said electrodes for each pixel.

* * * * *